United States Patent
Oishi et al.

(10) Patent No.: US 10,717,866 B2
(45) Date of Patent: Jul. 21, 2020

(54) ORGANIC-INORGANIC HYBRID COMPOSITION, AND ARTICLE AND OPTICAL COMPONENT INCLUDING THE SAME

(71) Applicant: Samsung Electronics Co., Ltd., Suwon-si, Gyeonggi-do (KR)

(72) Inventors: Yoshiyuki Oishi, Iwate (JP); Hiroshi Miyao, Yokohama (JP); Tomoyuki Kikuchi, Yokohama (JP); Yukika Yamada, Yokohama (JP); Ryosuke Kamitani, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 16 days.

(21) Appl. No.: 15/903,562

(22) Filed: Feb. 23, 2018

(65) Prior Publication Data

US 2018/0244915 A1 Aug. 30, 2018

(30) Foreign Application Priority Data

Feb. 24, 2017 (JP) ................. 2017-032989
Feb. 24, 2017 (JP) ................. 2017-032990
Feb. 24, 2017 (JP) ................. 2017-032992
Feb. 24, 2017 (JP) ................. 2017-032993

(51) Int. Cl.
| | |
|---|---|
| C08L 69/00 | (2006.01) |
| G02B 1/04 | (2006.01) |
| C08K 5/524 | (2006.01) |
| C08L 101/12 | (2006.01) |
| C08G 83/00 | (2006.01) |
| C08G 64/04 | (2006.01) |
| C08G 75/0222 | (2016.01) |
| C08K 3/22 | (2006.01) |
| C08G 64/08 | (2006.01) |
| C08G 64/12 | (2006.01) |

(52) U.S. Cl.
CPC ............ *C08L 69/00* (2013.01); *C08G 64/04* (2013.01); *C08G 64/083* (2013.01); *C08G 64/12* (2013.01); *C08G 75/0222* (2013.01); *C08G 83/001* (2013.01); *C08K 3/22* (2013.01); *C08K 5/524* (2013.01); *C08L 101/12* (2013.01); *G02B 1/041* (2013.01)

(58) Field of Classification Search
CPC ....... C08L 69/00; C08L 101/12; C08G 64/04; C08G 64/083; C08G 64/12; C08G 75/0222; C08G 83/001; C08K 3/22; C08K 5/524; G02B 1/041
USPC ....................................................... 359/642
See application file for complete search history.

(56) References Cited

U.S. PATENT DOCUMENTS

2009/0027586 A1* 1/2009 Kumai ................ C08L 69/00
349/58

FOREIGN PATENT DOCUMENTS

| JP | 2000/313812 A | 11/2000 |
|---|---|---|
| JP | 2005/099675 A | 4/2005 |
| JP | 2006/335974 A | 12/2006 |
| JP | 2007/204739 A | 8/2007 |
| JP | 2007/217628 A | 8/2007 |
| JP | 2008/056873 A | 3/2008 |
| JP | 2008/106129 A | 5/2008 |
| JP | 2008/201634 A | 9/2008 |
| JP | 2009/001658 A | 1/2009 |
| JP | 2009/029939 A | 2/2009 |
| JP | 2011/178841 A | 9/2011 |
| JP | 2011-213505 A | 10/2011 |
| JP | 2012-180241 A | 9/2012 |
| JP | 2013/007815 A | 1/2013 |
| JP | 2013/209490 A | 10/2013 |
| JP | 2014/098101 A | 5/2014 |
| JP | 2014/162829 A | 9/2014 |
| JP | 2014-162830 A | 9/2014 |
| JP | 2014/169464 A | 9/2014 |
| JP | 2014162830 A * | 9/2014 |
| JP | 2014/221865 A | 11/2014 |

(Continued)

*Primary Examiner* — James R Greece
(74) *Attorney, Agent, or Firm* — Harness, Dickey & Pierce, P.L.C.

(57) ABSTRACT

Disclosed an organic-inorganic hybrid composition including a polymer (A) including a triazine ring structure represented by General Formula (1) in a polymer main chain structure;

[General Formula (1)]

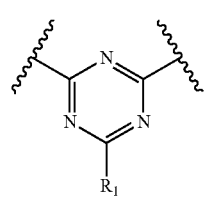

(1)

wherein, in the formula, R1 is a substituted or unsubstituted alkyl group, aryl group, aralkyl group, amino group, arylamino group, alkylthio group, or arylthio group, an inorganic particulate (B); and a surface-treatment agent (C) including an acidic functional group wherein the polymer (A) is a thermoplastic polymer having a glass transition temperature (Tg) and a number median diameter (Dn50) of the inorganic particulate (B) is greater than or equal to about 1 nm and less (Continued)

than or equal to about 20 nm, and an article and an optical component including the organic-inorganic hybrid composition.

12 Claims, No Drawings

(56) References Cited

FOREIGN PATENT DOCUMENTS

| | | |
|---|---|---|
| JP | 2015/227392 A | 12/2015 |
| JP | 2016/033230 A | 3/2016 |
| WO | WO-2011/162293 A1 | 12/2011 |
| WO | WO-2013/094663 A1 | 6/2013 |
| WO | WO-2013/168788 A1 | 11/2013 |

* cited by examiner

ORGANIC-INORGANIC HYBRID COMPOSITION, AND ARTICLE AND OPTICAL COMPONENT INCLUDING THE SAME

CROSS-REFERENCE TO RELATED APPLICATION

This application claims priority to and the benefit of Japanese Patent Application No. 2017-032990 filed in the Japanese Intellectual Property Office on Feb. 24, 2017; Japanese Patent Application No. 2017-032989 filed in the Japanese Intellectual Property Office on Feb. 24, 2017; Japanese Patent Application No. 2017-032992 filed in the Japanese Intellectual Property Office on Feb. 24, 2017; and Japanese Patent Application No. 2017-032993 filed in the Japanese Intellectual Property Office on Feb. 24, 2017, the entire contents of each of which are incorporated herein by reference.

BACKGROUND

1. Field

An organic-inorganic hybrid composition and an article and an optical component including the same are disclosed.

2. Description of the Related Art

As recent research on an optical material has been actively made, development of an optical material having a high refractive index and simultaneously excellent heat resistance, light transparency, and formability used for an optical lens for an optical system various cameras such as a camera, a video camera, and the like, a smart phone, or the like is required. Compared with glass lens, resin lens are light and not easily breakable, have a low material cost, and are processed into various shapes through injection molding, which is appropriate for forming lens. However, development of a material itself having a high refractive index is required in response to a requirement of a thinner product or a camera having a higher pixel number/density.

In order to develop a polymer having a high refractive index as a resin material, an attempt to introduce an aromatic ring, a halogen atom, and a sulfur atom is being made. Specifically, a sulfur atom may be introduced to obtain an episulfide polymer compound and a thio urethane polymer, and the episulfide polymer compound and the thio urethane polymer have a refractive index of greater than or equal to about 1.7 but no plasticity and thus are limited in terms of a practical use. On the other hand, a triazine ring-containing polymer as a high refractive index resin having plasticity has been examined including a triazine ring-containing polymer having a repeating unit structure having a triazine ring. The triazine ring-containing polymer alone is known to accomplish high heat resistance, high transparency, and a high refractive index.

SUMMARY

However, in the triazine ring-containing polymer, a refractive index of greater than or equal to about 1.7 is accomplished by a resin material alone, but there is a problem of increasing a glass transition temperature and deteriorating formability, as the refractive index is increased.

On the other hand, an attempt to preparing an organic-inorganic hybrid composition by dispersing an inorganic material having a high refractive index in a resin is being made. However, in order to transparently disperse the inorganic material such as an inorganic oxide particulate in a composition, deterioration of transmissive light needs to be suppressed by Rayleigh scattering, and particulates having a nanometer size in a primary particle state needs to be uniformly dispersed in the resin. However, since the inorganic particulate may be more easily agglomerated as a particle size is smaller, the inorganic particulate is difficult to uniformly disperse. When the inorganic particulate is simply mixed with the resin, they may cause a phase-separation and make a composition opaque.

Accordingly, the present disclosure provides an organic-inorganic hybrid composition having a high refractive index and being desirable for a molding process, such as injection molding.

An organic-inorganic hybrid composition according to an example embodiment includes a polymer (A) including a triazine ring structure represented by General Formula (1) in a polymer main chain structure;

[General Formula (1)]

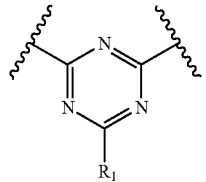

(1)

(wherein, in the formula, $R_1$ is a substituted or unsubstituted alkyl group, aryl group, aralkyl group, amino group, arylamino group, alkylthio group, or arylthio group), an inorganic particulate (B); and a surface-treatment agent (C) including an acidic functional group, wherein the polymer (A) is a thermoplastic polymer having a glass transition temperature (Tg) and a number median diameter (Dn50) of the inorganic particulate (B) is greater than or equal to about 1 nm and less than or equal to about 20 nm.

The glass transition temperature (Tg) of the polymer (A) may be greater than or equal to about 80° C. and less than or equal to about 200° C.

The triazine ring structure may be represented by General Formula (2).

[General Formula (2)]

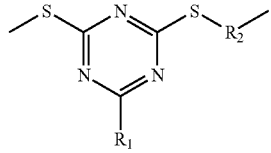

(2)

(wherein, in the formula, $R_2$ is independently a divalent group having an aromatic ring)

The $R_1$ may include a carboxyl group.

The $R_2$ may be represented by the following formula.

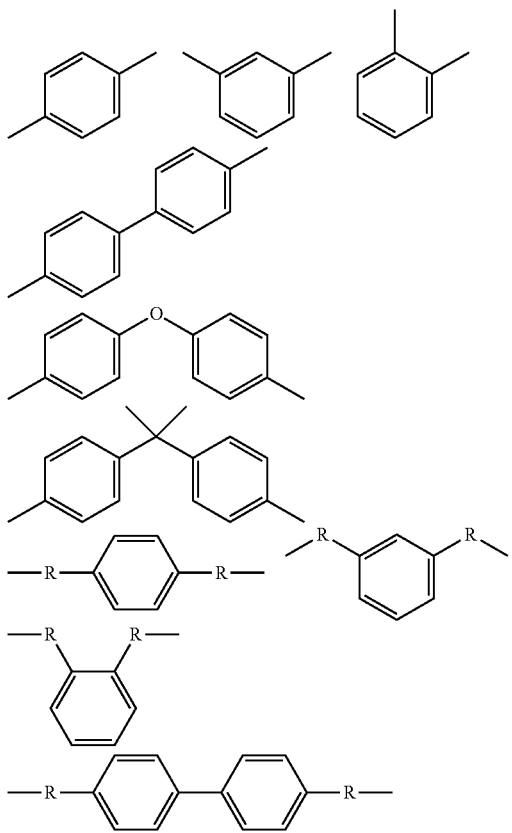

(wherein in formula, R is independently a substituted or unsubstituted alkylene group)

The acidic functional group of the surface-treatment agent (C) may be a carboxyl group.

A refractive index of the inorganic particulate (B) may be greater than or equal to about 1.8 and less than or equal to about 3.0.

The inorganic particulate (B) may include at least one particle selected from zirconium oxide, titanium oxide, barium titanate, strontium titanate, and zinc oxide.

A sum amount of the inorganic particulate (B) and the surface-treatment agent (C) may be greater than or equal to about 5 wt % and less than 80 wt % based on a sum amount, 100 wt % of the polymer (A), the inorganic particulate (B) and the surface-treatment agent (C).

A refractive index (nd) (587.6 nm) of the organic-inorganic hybrid composition may be greater than or equal to about 1.7.

According to another example embodiment, an article and an optical component including the organic-inorganic hybrid composition is provided.

The organic-inorganic hybrid composition has a high refractive index and is desirable for a molding process such as injection molding.

DETAILED DESCRIPTION

Hereinafter, example embodiments of the present disclosure will be described in detail so that a person skilled in the art would understand the same. This disclosure may, however, be embodied in many different forms and is not construed as limited to the example embodiments set forth herein.

As used herein, when a definition is not otherwise provided, 'substituted' refers to replacement of a hydrogen atom of a compound by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroaryl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

An example embodiment provides an organic-inorganic hybrid composition including Component (A), Component (B), and/or Component (C). As used herein, the "organic-inorganic hybrid composition including Component (A), Component (B), and Component (C)" is simply referred to as "a composition according to an example embodiment."

(1) Component (A): a polymer including a triazine ring structure represented by General Formula (1) in a polymer main chain structure;

[General Formula (1)]

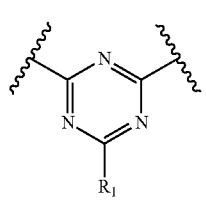

(1)

wherein, in the formula, $R_1$ is a substituted or unsubstituted alkyl group, aryl group, aralkyl group, amino group, arylamino group, alkylthio group, or arylthio group.

(2) Component (B): an inorganic particulate; and (3) Component (C): a surface-treatment agent including an acidic functional group.

Herein, the polymer (A) is a thermoplastic polymer having a glass transition temperature (Tg) and a number median diameter (Dn50) of the inorganic particulate (B) is greater than or equal to about 1 nm and less than or equal to about 20 nm.

The organic-inorganic hybrid composition according to an example embodiment has a high refractive index. Even though a technical scope of the present disclosure is not limited, such an effect may be obtained through the following mechanism.

The composition according to the present disclosure includes a polymer having a triazine ring structure in the polymer main chain structure (hereinafter, referred to as a triazine ring-containing polymer) as Component (A). The triazine ring-containing polymer is thermoplastic but has improved heat resistance compared with a thermoplastic resin such as a vinyl polymer and a high refractive index of greater than or equal to about 1.7. In addition, the triazine ring-containing polymer has a triazine ring structure in the main chain structure and thus becomes thermoplastic and has a refractive index of greater than or equal to about 1.7 like the episulfide polymer compound and the thio urethane polymer obtained by introducing a sulfur atom but may be easily processed through injection molding and the like compared with a material having no plasticity.

Herein, a polymer simplex comprising a polymer alone has a problem that a glass transition temperature increases as a refractive index increases, but a composition according to the present disclosure further includes an inorganic particulate as Component (B) in addition to a triazine ring-containing polymer having a high refractive index and thus has a higher refractive index and may be more appropriate for injection molding.

Herein, in order to transparently disperse the inorganic particulate, deterioration of transmissive light due to Rayleigh scattering may be suppressed, and in order to maintain colorless transparency within a visible light range, the inorganic particulate needs to maintain a particle size of greater than or equal to about 1 nm and less than or equal to about 20 nm and be uniformly dispersed in a primary particle state in a resin. However, as the particle size is smaller, the particulate may be more easily agglomerated and thus are more difficult to uniformly disperse. The present disclosure is to modify the surface of the inorganic particulate such as an inorganic oxide nano particle and the like by using a surface-treatment agent including an acidic functional group. Accordingly, since a hydroxy group and the like on the surface of the inorganic particulate, which is mostly prepared as water dispersion, are coated with the surface-treatment agent, dispersibility of the inorganic particulate in an organic resin may be improved. As a result, since the inorganic particulate is uniformly dispersed in the resin, the inorganic particulate may rarely be phase-separated from the resin. Resultantly, high transparency and simultaneously, a high refractive index according to a refractive index of the polymer and the inorganic particulate may be obtained.

Hereinafter, an example embodiment is described. However, the present disclosure is not limited to the following example embodiments.

As used herein, when particular description is not otherwise provided, operations and measurement of properties are performed under the conditions of room temperature (about 20° C. to about 25° C.)/relative humidity of 40% RH to 50% RH.

<Component (A)>

Component (A) is a polymer including a triazine ring structure represented by General Formula (1) in the polymer main chain structure;

[General Formula (1)]

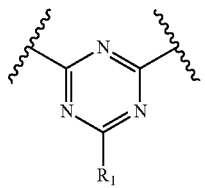

(1)

wherein, in General Formula (1), $R_1$ is independently a substituted or unsubstituted alkyl group, aryl group, aralkyl group, an amino group, aryl amino group, alkylthiol group, or arylthiol group.

In an example embodiment, $R_1$ may independently be a group selected from a C1 to C10 alkyl group, a C6 to C14 aryl group, a C7 to C20 aralkyl group, an amino group, a C6 to C14 aryl amino group, a C1 to C10 alkyl thiol group, and a C6 to C14 aryl thiol group which may have a substituent. Such a substituent may be a halogen atom (for example, a fluorine atom, a chlorine atom, a bromine atom, or a urea atom), a hydroxy group, an amino group, a C1 to C3 alkyl group (for example, a methyl group, an ethyl group, a n-propyl group, or an isopropyl group), a carboxyl group, a sulfone group [—SO$_3$H], a sulfino group, a sulfinyl group, a phosphonic acid group [—PO(OH)$_2$], a phosphoryl group, a phosphinyl group, a phosphono group, a thiol group, a phosphonyl group, and a sulfonyl group.

The alkyl group may be a linear or branched alkyl group, and specifically a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a n-octyl group, a n-decyl group, and the like. In some embodiments, a C1 to C6 alkyl group or a C1 to C4 alkyl group may be desirable.

The aryl group may be a C6 to C14 aryl group, for example a phenyl group, a naphthyl group, an anthracenyl group, a biphenyl group, an indenyl group, and the like. In some example embodiments, a C6 to C12 aryl group may be desirable.

The aralkyl group may be a C7 to C20 aralkyl group, for example a C6 to C14 aryl-C1 to C6 alkyl group, or a C6 to C12 aryl-C1 to C6 alkyl group. The C6 to C14 aryl group may be the above-mentioned aryl group. Specific examples of the C6 to C14 aryl-C1 to C6 alkyl group may be a benzyl group, a phenethyl group, a phenyl propyl group, a naphthylmethyl group, a naphthyl ethyl group, and the like. The aryl amino group (aromatic amino group) may be an anilino group, a p-carboxyl anilino group, a diphenyl amino group, ditolylamino group, and the like.

The alkyl thiol group may be a methylthiol group, an ethyl thiol group, a t-butylthiol group, a di-tert-butylthiol group, a 2-methyl-1-ethyl thiol group, a 2-butyl-1-methylthiol group, and the like.

The aryl thiol group (aromatic thiol group) may be a phenyl thiol group, a naphthyl thiol group, and the like.

In some example embodiments, $R_1$ may include an acidic functional group. That is, $R_1$ may be an alkyl group, an aryl group, aralkyl group, an amino group, an aryl amino group, an alkyl thiol group, or an aryl thiol group which is substituted with an acidic functional group. Thereby, binding properties with a surface of an inorganic particulate are improved and dispersibility of an inorganic particulate in a resin may be improved. In some example embodiments, $R_1$ may include a carboxyl group. The inorganic particulate may be more uniformly dispersed in the triazine ring-containing polymer without phase-separation by including a carboxyl group in a part of $R_1$.

In some example embodiments, Component (A) is a polymer including the triazine ring structure represented by General Formula (2). In the polymer represented by General Formula (2), a bond between the triazine ring and $R_2$ is a thio ether group.

[General Formula (2)]

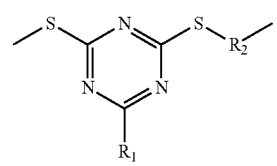

(2)

In the formula, $R_1$ is the same as defined above and $R_2$ is a divalent group having an aromatic ring (a divalent aromatic group).

As shown in General Formula (2), the polymer has a thio ether structure by binding a triazine ring with $R_2$ and thus may have a higher refractive index and a glass transition temperature in a range of greater than or equal to about 80° C. and less than or equal to about 200° C. When the glass transition temperature is controlled within the range, injection molding properties may be improved. In addition, a divalent group having an aromatic ring may be introduced as $R_2$ to much promote a molecular interaction and thus obtain a high refractive index.

The divalent group having the aromatic ring may be for example a C6 to C30 aromatic group and $R_2$ may be an aromatic group such as a phenylene group, a naphthylene group, a biphenylene group, a divalent group derived from a diphenyl ether or diphenyl sulfide, a divalent group derived from bisphenol, and the like. An alkylene group may be bound to these aromatic groups. These groups may have a substituent. Such a substituent may be a halogen atom (for example, a fluorine atom, a chlorine atom, a bromine atom, or a urea atom), a hydroxy group, an amino group, a C1 to C3 alkyl group (for example, a methyl group, an ethyl group, a n-propyl group, or an isopropyl group), a carboxyl group, a sulfone group [—$SO_3H$], a sulfino group, a sulfinyl group, a phosphonic acid group [—$PO(OH)_2$], a phosphoryl group, a phosphinyl group, a phosphono group, a thiol group, a phosphonyl group, and a sulfonyl group.

In some example embodiments, $R_2$ includes at least one represented by the following formulae.

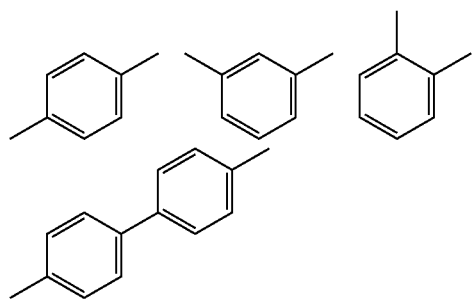

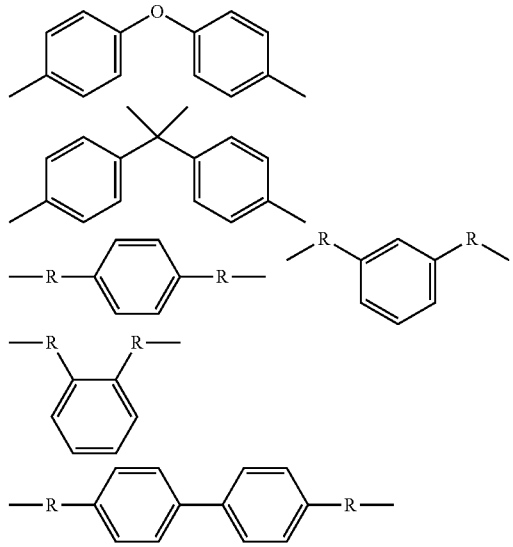

In the formulae, R is independently a substituted or unsubstituted alkylene group. The alkylene group may be a C1 to C10 alkylene group and the alkylene group may be for example a methylene group, an ethylene group, a trimethylene group, a propylene group, a tetramethylene group, a 1,2-dimethyl ethylene group, and the like. These groups may have a substituent and the substituent may be the above-mentioned group.

When $R_2$ is the above groups in the triazine ring-containing polymer, higher refractive index may be obtained. In addition, while maintaining a high refractive index, a solubility in an organic solvent is improved and a glass transition temperature may be controlled within a range of greater than or equal to about 80° C. and less than or equal to about 200° C.

In some example embodiments, the organic-inorganic hybrid composition includes a triazine ring-containing polymer including one of the following repeating units in a part of the polymer.

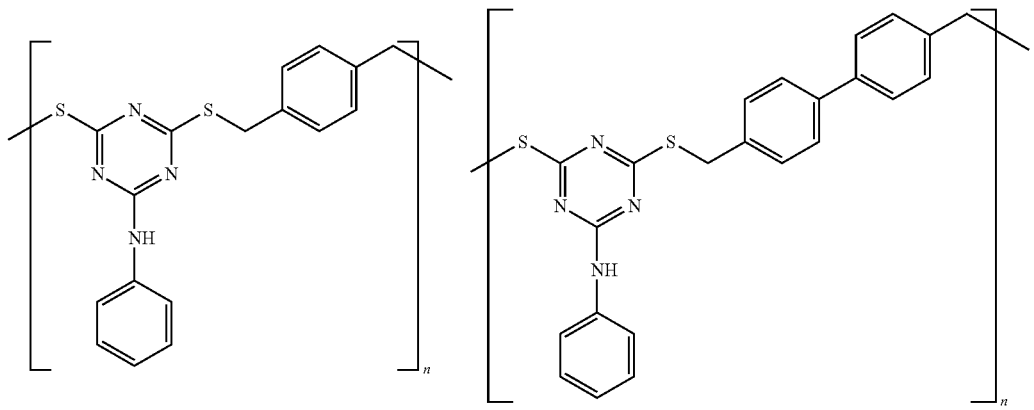

-continued

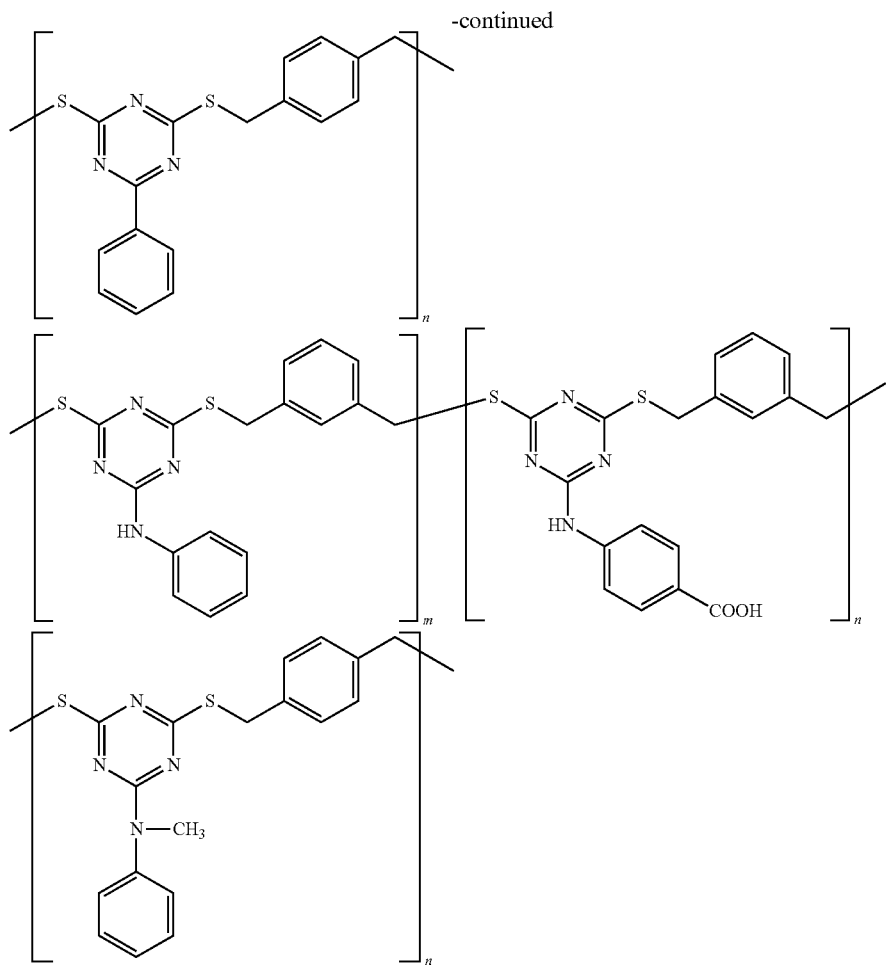

A number average molecular weight (Mn) of Component (A) may be for example greater than or equal to about 5000 and less than or equal to about 200000, greater than or equal to about 10000 and less than or equal to about 150000, or greater than or equal to about 20000 and less than or equal to about 100000. Within the numeral ranges, transmittance (transparency) or heat resistance of the composition is particularly improved, the composition is appropriate for a process (a molding process using a mold such as injection molding or compression) of obtaining an article from the composition, and a mechanical strength of the obtained article is improved. Meanwhile, as used herein, a number average molecular weight (Mn) of Component (A) is a value measured by a gel permeation chromatography (GPC) described in examples.

A weight average molecular weight (Mw) of Component (A) may be for example greater than or equal to about 10000 and less than or equal to about 400000, greater than or equal to about 20000 and less than or equal to about 300000, or greater than or equal to about 40000 and less than or equal to about 200000. Within the numeral ranges, transmittance (transparency) or heat resistance of the composition is particularly improved, the composition is appropriate for a process (a molding process using a mold such as injection molding or compression) of obtaining an article from the composition, and a mechanical strength of the obtained article is improved. Meanwhile, as used herein, a weight average molecular weight (Mw) of Component (A) is a value measured by a gel permeation chromatography (GPC) described in examples.

A refractive index (nd) of Component (A) may be greater than or equal to about 1.65, for example greater than or equal to about 1.7. Within the range, an organic-inorganic hybrid composition having a high refractive index may be obtained. The organic-inorganic hybrid composition may have much higher refractive index due to a triazine ring-containing polymer, for example, a structure having a triazine ring linked with —S— as shown in General Formula (2). A high refractive index resin linked with a triazine ring and having a —NH-structure has been reported but may not be applied to a process of obtaining an article at a glass transition temperature of greater than about 200° C. (a molding process using a mold such as injection molding, compression molding, or the like). In addition, a divalent group having an aromatic ring as $R_2$ may be introduced to much promote a molecular interaction and obtain a high refractive index.

Abbe number (vd) of Component (A) may be for example greater than or equal to about 15, for example greater than or equal to about 18. Meanwhile, in the present specification, a refractive index and Abbe number of Component (A) are values measured according to the method described in examples.

Component (A) has a glass transition temperature. In other word, Component (A) exhibits an inflection point in a differential thermal curve that is measured by increasing a temperature up to 300° C. at a temperature increase rate of 10° C./min, maintaining samples for 10 minutes, cooling the samples to 25° C. at a temperature decrease rate of 10° C./min, maintaining the samples for 10 minutes, and increasing the temperature up to 300° C. at a temperature increase rate of 10° C./min using a differential scanning calorimeter (DSC). The resin having a glass transition temperature has thermoplasticity and may be subject to injection molding. A glass transition temperature (Tg) of Component (A) may be for example greater than or equal to about 80° C. and less than or equal to about 250° C., and considering handling during an injection molding and heat resistance of the composition, Tg of Component (A) may be greater than or equal to about 80° C. and less than or equal to about 200° C. Tg of Component (A) may be adjusted by controlling a structure of $R_1$ and $R_2$ of General Formula (2) and the like, for example, increased by increasing a ratio of introducing a structure having a large volume or a rigid structure into a $R_1$ region of a triazine dithiol compound used as a raw material for a synthesis. Meanwhile, as used herein, the glass transition temperature (Tg) of Component (A) is a value measured using a differential scanning calorimeter (DSC) described in examples.

Each repeating unit of Component (A) may have any type, for example, a block type or a random type.

Component (A) is not particularly limited and may be prepared by a known method. For example, a triazine ring-containing polymer having a structure represented by General Formula (2) as a repeating unit may be prepared by reacting a triazine dithiol compound with a dihalogenated aromatic compound in the presence of a phase-transfer catalyst.

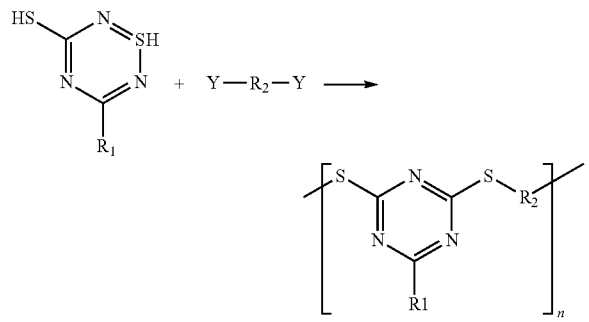

In the formula, Y is a halogen atom, $R_1$ is a substituted or unsubstituted alkyl group, aryl group, aralkyl group, an amino group, aromatic amino group, alkyl thiol group, or aromatic thiol group; and $R_2$ is a divalent group having an aromatic ring) wherein the halogen atom of Y may be a fluorine atom, a chlorine atom, a bromine atom, or a urea atom.

The triazine dithiol compound is not particularly limited but may be for example 2-anilino-1,3,5-triazine-4,6-dithiol, 2-(p-carboxyl)anilino-1,3,5-triazine-4,6-dithiol, 2-phenyl-1,3,5-triazine-4,6-dithiol, and the like. The dihalogenated aromatic compound may be for example dibromop-xylene, dibromoo-xylene, dibromom-xylene, 4,4'-bis(bromomethyl)biphenyl, and the like. These may be used alone or in a combination of two or more.

The phase-transfer catalyst used for a reaction of the triazine dithiol compound and the dihalogenated aromatic compound may be a long-chain alkyl quaternary ammonium salt and crown ether which may be used for interfacial polymerization, for example hexadecyltrimethyl ammonium bromide.

The reaction system may include a two-phase system of water and an organic solvent, for example a two-phase system of an organic solvent such as chloroform, dichloro methane, benzonitrile, nitrobenzene, and the like and water. When the reaction starts, a base such as sodium hydroxide, potassium hydroxide, and the like is added and reaction is performed at about −10° C. to about 100° C. for about 2 hours to about 120 hours.

The obtained triazine ring-containing polymer may be purified by a general purifying method of a reprecipitation method, a dialysis method, an ultrafiltration method, an extraction method, and the like.

<Component (B)>

Component (B), the inorganic particulate may be a metal oxide, a metal sulfide, a metal selenide, a metal telluride, and the like.

The metal oxide is not particularly limited but may be for example zirconium oxide, yttrium oxide-addition zirconium oxide, lead zircornate, strontium titanate, tin titanate, tin oxide, bismuth oxide, niobium oxide, tantalum oxide, potassium tantalate, tungsten oxide, cerium oxide, lanthanum oxide, gallium oxide, silica, titanium oxide, barium titanate, and the like.

In some example embodiments, when the organic-inorganic hybrid composition is used for an optical use, an inorganic particulate having a high refractive index is desirable and an inorganic particulate having a refractive index of greater than or equal to about 1.8 may be desirably used. Specifically, in some example embodiments, the inorganic particulate may be desirably titanium oxide, barium titanate (a refractive index=about 2.4), zirconium oxide (a refractive index=about 2.1), strontium titanate, or zinc oxide. That is, in some example embodiments, the inorganic particulate may include at least one kinds of particles selected from zirconium oxide, titanium oxide, barium titanate, strontium titanate, and zinc oxide. In some example embodiments, the inorganic particulate may be more desirably selected from zirconium oxide, titanium oxide, and barium titanate. In some example embodiments, even though the titanium oxide mainly has two kinds of crystal structures of a rutile-type (a refractive index=about 2.7) and an anatase-type (a refractive index=about 2.5), the rutile-type titanium oxide may be desirable since the anatase-type titanium oxide has a high photocatalyst activity and is not desirable for an optical use. In addition, in order to reduce the photocatalyst activity of the titanium oxide, a titanium oxide particle coated with silica on the surface may be used.

The inorganic particulate may be used alone or in a combination of two or more.

On the surface of the inorganic particulate, a group including Group 16 element such as a hydroxy group, a mercapto group, and the like is generally present. As described later, since a composition according to the present disclosure includes a surface-treatment agent including an acidic functional group as a functional group forming a chemical bond with these groups, the surface of the inorganic particulate is modified by the surface-treatment agent, and dispersibility of the inorganic particulate is improved.

The number median diameter (Dn50) of inorganic particulate is greater than or equal to about 1 nm and less than or equal to about 20 nm. When the number median diameter of the inorganic particulate is greater than about 20 nm, transparency of the obtained composition may be decreased. Meanwhile, the number median diameter of the inorganic particulate is less than about 1 nm, secondary agglomeration of the inorganic particulate may easily be generated. In some example embodiments, the number median diameter of the inorganic particulate may be less than or equal to 15 nm or less than or equal to about 10 nm. Meanwhile, the number median diameter (Dn50) of the inorganic particulate is a number median diameter according to a dynamic light scattering method.

In some example embodiments, an inorganic particulate having a high refractive index is desirable and an inorganic particulate having a refractive index of greater than or equal to about 1.8, greater than or equal to about 1.9, or greater than or equal to about 2.0 may be desirably used. By using such an inorganic particulate, a resin composition having a high refractive index may be obtained. In some example embodiments, the higher the refractive index of the inorganic particulate is, the better, but it may be generally less than or equal to about 3.0. A desirable range of a refractive index of the inorganic particulate may be greater than or equal to about 1.8 and less than or equal to about 3.0, for example greater than or equal to about 1.9 and less than or equal to about 3.0.

The refractive index of the inorganic particulate may be for example calculated by measuring a refractive index difference of inorganic particulate dispersions having a different concentration from each other.

The inorganic particulate may be prepared using known methods.

In addition, the inorganic particulate may be commercial products which may be solvent dispersion. These commercial products may be SZR-W, SZR-CW, SZR-M, SZR-CM (zirconium oxide dispersion, Sakai Chemical Industry Co., Ltd.); Thai Nok (registered trademark) RA-6, NRA-10M (a titanium oxide dispersion, Taki Chemical Co., Ltd.), and the like.

<Component (C)>

The Component (C), the surface-treatment agent (a surface-modifying agent) may be used for modifying a surface of the inorganic particulate. In some example embodiments, the surface-treatment agent is a compound having at least one acidic functional group.

The acidic functional group of the surface-treatment agent may be an oxo acid compound, for example, a functional group having a hydroxy group such as a carboxyl group, a sulfone group [—SO$_3$H], a sulfino group, a phosphonic acid group [—PO(OH)$_2$], a phosphinic acid group, a phosphoric acid group, and the like; and salts thereof. In some example embodiments, the acidic functional group may be desirably a carboxyl group, a phosphinic acid group, or a sulfone group and more desirably a carboxyl group. When the surface-treatment agent having the carboxyl group is used, corrosion of a mold may rarely occur during injection molding and mold releasing properties may be improved.

Specifically, the surface-treatment agent may be acetic acid or a compound represented by General Formula (3).

[General Formula (3)]

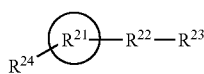

(3)

In General Formula (3), $R^{21}$ is selected from a phenyl group, a cyclopentyl group, a cyclohexyl group, thienyl group, a furyl group, a pyrrolyl group, and a pyridyl group; $R^{22}$ is a single bond, or a C1 to C6 alkylene group; $R^{23}$ is selected from functional groups having a hydroxy group such as a carboxyl group, a sulfone group [—SO$_3$H], a sulfino group, a phosphonic acid group [—PO(OH)$_2$], a phosphinic acid group, a phosphoric acid group, and the like; $R^{24}$ is selected from a hydrogen atom, a halogen atom, a C1 to C6 alkyl group, a C1 to C6 alkoxy group, and a C6 to C24 aryl group.

A single surface-treatment agent may be used alone or in a mixture of two or more surface-treatment agents.

In General Formula (3), $R^{21}$ may be selected form a phenyl group, a cyclopentyl group, a cyclohexyl group, a thienyl group, a furyl group, a pyrrolyl group, and a pyridyl group. In terms of dispersibility of the inorganic particulate, $R^{21}$ may be selected form a phenyl group, a thienyl group, and a furyl group. $R^{21}$ may be more desirably a phenyl group or a thienyl group.

In General Formula (3), $R^{22}$ may be a single bond, or a C1 to C6 alkylene group (for example, a linear or branched alkylene group such as a methylene group, an ethylene group, a trimethylene group, an isopropylene group, a tetramethylene group, a methyl trimethylene group, a pentylene group, a hexylene group, a heptylene group, and the like). In some example embodiments, $R^{22}$ may be selected from a single bond, a methylene group, an ethylene group, a trimethylene group, and an isopropylene group.

In General Formula (3), $R^{23}$ may be a group selected from functional groups having a hydroxy group such as a carboxyl group, a sulfone group, a sulfino group, a phosphonic acid group, a phosphinic acid group, a phosphoric acid group, and the like. In terms of improved mold formability (particularly, mold releasing properties), $R^{23}$ may be a carboxyl group.

In General Formula (3), $R^{24}$ may be a group selected from a hydrogen atom, a halogen atom (for example, a fluorine atom, a chlorine atom, a bromine atom, or a urea atom), a C1 to C6 alkyl group (for example, a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, a cyclohexyl group, etc.), a C1 to C6 alkoxy group (a methoxy group, an ethoxy group, a n-propoxy group, an isopropoxy group, a n-butoxy group, an iso butoxy group, a sec-butoxy group, a tert-butoxy group, a n-pentoxy group, an iso pentoxy group, a neo pentoxy group, a n-hexooxy group, a cyclohexyl oxy group, etc.), and a C6 to C24 aryl group (for example, a phenyl group, a naphthyl group, a biphenyl group, a fluorenyl group, an anthryl group, a pyrenyl group, an azulenyl group, an acenaphthylenyl group, a terphenyl group, an phenanthryl group, etc.). In some example embodiments, $R^{24}$ may be selected form a hydrogen atom, a halogen atom, a methyl group, an ethyl group, a n-propyl group, an isopropyl group, a phenyl group, a biphenyl group, and a fluorenyl group.

In some example embodiments, in General Formula (3), $R^{21}$ is selected from a phenyl group, a thienyl group, and a furyl group; $R^{22}$ is selected from a single bond, a methylene group, an ethylene group, a trimethylene group, and an isopropylene group; $R^{23}$ is selected from a carboxyl group, a sulfone group, a phosphonic acid group, and a thiol group; and $R^{24}$ is selected from a hydrogen atom, a halogen atom, a C1 to C6 alkyl group, a C1 to C6 alkoxy group, and a C6 to C24 aryl group. In some example embodiments, in General Formula (3), $R^{21}$ is selected from a phenyl group and a thienyl group; $R^{22}$ is selected from a single bond, a methylene group, an ethylene group, a trimethylene group, and an isopropylene group; $R^{23}$ is a carboxyl group; and $R^{24}$ is a hydrogen atom.

In some example embodiments, desirable surface-treatment agents may be acetic acid, 2-thiophene carbonic acid, 3-thiophene carbonic acid, 2-furan carbonic acid, benzoic acid, biphenyl 4-carbonic acid, 4-methyl benzoic acid, pico phosphoric acid, cyclohexane carbonic acid, 2-thiophene thiol, 2-thiophene ethanethiol, benzene thiol, benzenemethanethiol, 4-methylbenzenemethane thiol, phenylethane thiol, cyclohexane thiol, cyclohexanemethane thiol, 2-pyridine thiol, phenylphosphonic acid, diphenyl phosphinic acid, and the like.

In some example embodiments, in terms of improved balance of transparency, a refractive index, and transmittance and improved mold formability, the surface-treatment agent may be desirably at least one selected from acetic acid, 2-thiophene carbonic acid, 3-thiophene carbonic acid, phenylphosphonic acid, and benzoic acid.

A method of surface-modifying the inorganic particulate with a surface-treatment agent is not particularly limited and may be for example a wet method or a dry method. In terms of modifying the inorganic particulate more efficiently and inhibiting secondary agglomeration of the inorganic particulate, a wet method may be desirable. When the inorganic particulate is modified with a wet method, for example, the organic surface-modifying agent is added to dispersion of the inorganic particulate and then stirred and thereby the surface of the inorganic particulate may be modified. A mixture of the surface-treatment agent and the inorganic particulate prepared by such a method may be mixed with Component (A).

A solvent used in the dispersion of the inorganic particulate is not particularly limited but in terms of dispersing the inorganic particulate uniformly, water; alcohols such as methanol, ethanol, propanol, isopropanol, and the like; and a mixture thereof may be desirable. In addition, in order to stabilize the dispersion, for example, other components acid such as formic acid, acetic acid, hydrochloric acid, nitric acid, and the like or alkali and the like may be added to the dispersion. These components may be removed through washing or drying before mixing it with the Component (A).

An amount of the surface-modifying agent may be determined so as to obtain an appropriate surface-modification, but a ratio of the surface-treatment agent:inorganic particulate may be as follows: about 1 part by weight to about 100 parts by weight, for example about 5 parts by weight to about 20 parts of the inorganic particulate relative to 1 part by weight of the surface-treatment agent.

A reaction time to modify the inorganic particulate with the modifying agent is not particularly limited, but may be generally greater than or equal to about 1 hour and less than or equal to about 48 hours, for example, greater than or equal to about 2 hours and less than or equal to about 24 hours. In addition, a reaction temperature is not particularly limited, but may be greater than or equal to about 10° C. and less than or equal to about 100° C., for example greater than or equal to about 10° C. and less than or equal to about 60° C., for another example greater than or equal to about 10° C. and less than or equal to about 40° C.

After the reaction, the obtained dispersion may be concentrated. In addition, an excessive modifying agent or other components may be removed by washing or filtering.

<Method of Preparing Composition>

The composition according to the present disclosure may be obtained by mixing Component (A), Component (B), and Component (C) simultaneously, but in terms of an effective modification of the inorganic particulate with the surface-modifying agent, as described above, a mixture of the Component (B) and Component (C) is prepared and then the mixture and the Component (A) are mixed. During preparation of the composition, a solvent such as chloroform, dichloro methane, diethylether, tetrahydrofuran, ethyl acetate, acetone, acetonitrile, N,N-dimethyl formamide (DMF), N-methyl-2-pyrrolidone (NMP), and the like may be used.

An amount of each component in the composition is not particularly limited but a sum of the inorganic particulate and the surface-treatment agent may be greater than or equal to about 1 wt % and less than or equal to about 99 wt % based on 100 wt % of a sum of the polymer, the inorganic particulate, and the surface-treatment agent. In terms of improved refractive index of an article obtained from the composition, a sum of the inorganic particulate and the surface-treatment agent may be greater than or equal to about 5 wt % and less than or equal to about 80 wt % or greater than or equal to about 5 wt % and less than or equal to about 70 wt %. In terms of improved transmittance and mechanical strength of the article, a sum of the inorganic particulate and the surface-treatment agent may be greater than or equal to about 10 wt % and less than or equal to about 50 wt.

In an example embodiment, an amount of the polymer may be greater than or equal to about 1 wt % and less than or equal to about 99 wt % based on a total amount of the composition. In another example embodiment, an amount of the polymer may be greater than about 20 wt % and less than or equal to about 95 wt % based on a total amount of the composition.

In an example embodiment, a sum of the inorganic particulate and the surface-treatment agent may be greater than or equal to about 1 wt % and less than or equal to about 99 wt % based on a total amount of the composition. In another example embodiment, the sum of the inorganic particulate and the surface-treatment agent may be greater than about 5 wt % and less than or equal to about 80 wt % based on a total amount of the composition.

The composition according to the present disclosure may include optionally an additive such as an antioxidant, an ultraviolet (UV) absorber, an anti-light stabilizer, a heat stabilizer, a plasticizer, colorant, a blowing agent, a flame retardant, a flame-retardant aid, a release agent, a plasticizer, an impact resistance improving agent, a reinforcing agent, a dispersing agent, an antistatic agent, a forming agent, an antibacterial agent, other resins, an elastomer, and the like.

The organic-inorganic hybrid composition according to the present disclosure has a refractive index (nd) of greater than or equal to about 1.70, for example greater than or equal to about 1.75. The refractive index of the organic-inorganic hybrid composition may be controlled by selecting refractive indexes of the triazine ring-containing polymer and the inorganic particulate and a mixing ratio. In addition, Abbe number (vd) of the organic-inorganic hybrid composition according to the present disclosure may be greater than or equal to about 20, for example greater than or equal to about 25. The refractive index and Abbe number of the organic-inorganic hybrid composition are values measured according to the method described in examples.

[Regarding Organic-Inorganic Hybrid Composition Having High Heat Resistance]

According to another example embodiment, an organic-inorganic hybrid composition has a high refractive index, improved light transmittance and heat resistance, and simultaneously properties appropriate for injection molding (difficult gelation and improved mold releasing properties).

The organic-inorganic hybrid composition according to an example embodiment includes Component (A-1), Component (B-1), and Component (C-1).

(1) Component (A-1): polycarbonate including a repeating unit $Y^1$ selected from General Formulae (1-3) and (1-4).

At least one part of the polycarbonate includes a repeating unit $X^1$ selected from General Formulae (1-1) and (1-2) and a ratio of a total mole number, m of the repeating unit, $X^1$ and total mole number, n of the repeating unit, $Y^1$ in the organic-inorganic hybrid composition satisfies $0<(m/n)\leq 0.12$;

[General Formulae (1-1) and (1-2)]

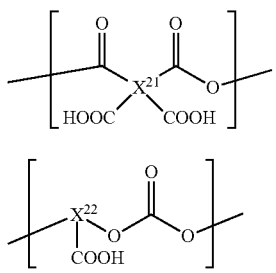

wherein, in General Formulae (1-1) and (1-2), $X^{21}$ and $X^{22}$ are independently a group selected from a substituted or unsubstituted C1 to C30 aliphatic group, C4 to C30 alicyclic group, C6 to C30 aromatic group, and heterocyclic group;

[General Formulae (1-3) and (1-4)]

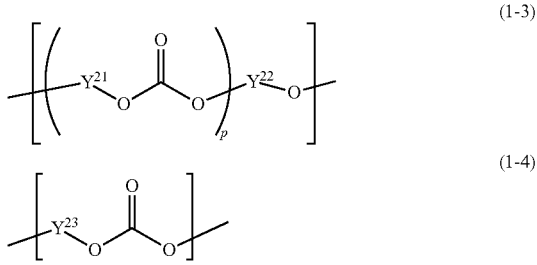

wherein, in General Formulae (1-3) and (1-4), $Y^{21}$, $Y^{22}$, and $Y^{23}$ are independently a substituted or unsubstituted aromatic group; p is an integer satisfying a relationship of $1 \leq p < n$;

(2) Component (B-1): inorganic particulate;

(3) Component (C-1): surface-treatment agent represented by General Formula (3)

[General Formula (3)]

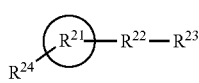

In General Formula (3), $R^{21}$ is selected from a phenyl group, a cyclopentyl group, a cyclohexyl group, thienyl group, a furyl group, a pyrrolyl group, and a pyridyl group; $R^{22}$ is a single bond, or a C1 to C6 alkylene group; $R^{23}$ is selected from functional groups having a hydroxy group such as a carboxyl group, a sulfone group [—$SO_3H$], a sulfino group, a phosphonic acid group [—$PO(OH)_2$], a phosphinic acid group, a phosphoric acid group, and the like; $R^{24}$ is selected from a hydrogen atom, a halogen atom, a C1 to C6 alkyl group, a C1 to C6 alkoxy group, and a C6 to C24 aryl group.

The composition according to an example embodiment may be an organic-inorganic hybrid composition having a high refractive index, improved light transmittance and heat resistance, and simultaneously properties appropriate for injection molding (difficult gelation and improved mold releasing properties). A mechanism to obtain such an effect may be supposed as follows.

A composition according to an example embodiment includes polycarbonate as Component (A-1).

The polycarbonate has improved heat resistance compared with a thermoplastic resin such as a vinyl polymer and a high refractive index.

A composition according to an example embodiment includes an inorganic particulate as Component (B-1) in addition to polycarbonate having a high refractive index and thus has a much higher refractive index.

In addition, since polycarbonate of Component (A-1) is a carboxyl group-containing polycarbonate having a carboxyl group at a side chain as shown in General Formulae (1-1) and (1-2), dispersibility of the inorganic particulate in the composition is improved, and light transmittance is expected to be satisfactory. Furthermore, since an acid group included in a side chain of polycarbonate is a carboxyl group, there may be neither a mold corrosion which occurs when a sulfuric acid group is used nor deterioration of mold releasing properties which occurs when a phosphoric acid group is used. On the other hand, dispersibility of the inorganic particulate is expected to be improved by increasing the number of the carboxyl group included in the side chain of polycarbonate, but when the number of the carboxyl group is excessively increased, there may be a problem of gelating polycarbonate. In order to solve this problem, when the number of carboxyl group included in the side chain of polycarbonate is controlled within a predetermined range, and a surface-treatment agent represented by General Formula (3) is used as Component (C-1), excellent dispersibility of the inorganic particulate may not only be accomplished, but gelation of the polycarbonate also may be suppressed. Specifically, this effect may be obtained by adjusting relationship between a total mol (m) of a repeating unit $X^1$ and a total mol (n) of a repeating unit $Y^1$ of polycarbonate in a range of $0<(m/n)\leq 0.12$. Component (C-1) does not include an interaction point with the inorganic particulate as $R^{23}$ or a sulfuric acid group or a phosphoric acid group as $R^{24}$ and thus may prevent the mold corrosion or the deterioration of mold releasing properties.

In addition, in a composition including polycarbonate, an inorganic particulate, and a surface-treatment agent, much excellent heat resistance may be obtained by using carboxyl group-containing polycarbonate compared with polycarbonate including no carboxyl group at a side chain, since carboxyl group-containing polycarbonate has an equivalent glass transition temperature to that of polycarbonate. The reason may be that the carboxyl group even in a small amount is present and thus forms a three dimensional cross-linking structure.

<Component (A-1)>

Component (A-1) is polycarbonate including a repeating unit, $Y^1$ selected from the General Formulae (1-3) and (1-4). At least one part of the polycarbonate including such a repeating unit, $Y^1$ includes a repeating unit, $X^1$ selected from General Formulae (1-1) and (1-2). That is, the composition according to an example embodiment may include polycarbonate of (1) a copolymer including the repeating unit, $X^1$ and the repeating unit $Y^1$, (2) a mixture of a polymer including the repeating unit, $Y^1$ and a copolymer including the repeating unit, $X^1$ and the repeating unit, $Y^1$ mixture. In addition, in the organic-inorganic hybrid composition according to an example embodiment, a ratio of a total mole number, m of the repeating unit, $X^1$ (i.e., a total mole number of constituting units represented by General Formulae (1-1) and (1-2)) and a total mole number, n of the repeating unit, $Y^1$ (i.e., a total mole number of constituting units represented by General Formulae (1-3) and (1-4)) of the polycarbonate of the composition may satisfy $0<(m/n)\leq0.12$. When the (m/n) is greater than about 0, dispersibility of the inorganic particulate is improved and heat resistance of the composition becomes better. When the (m/n) is greater than about 0.12, gelation of the polycarbonate may easily occur. In terms of satisfying $0.005\leq(m/n)\leq0.1$ and suppressing gelation to improve mold releasing properties, the m and n may satisfy $0.01<(m/n)\leq0.08$. Meanwhile, (m/n) may be controlled by a mixing ratio (mole ratio) of a raw monomer of $X^1$ and a raw monomer of $Y^1$.

$X^1$ is a repeating unit selected from General Formulae (1-1) and (1-2). In terms of a balance of dispersibility of inorganic particulate, heat resistance of the composition, and gelation suppression of the polycarbonate, a ratio of $X^1$ in the polycarbonate of the composition may be greater than about 0 mol % and greater than about 12 mol %, for example greater than or equal to about 0.5 mol % and less than or equal to about 10 mol %, greater than about 1 mol % and less than or equal to about 8 mol % based on 100 mol %, a sum of $X^1$ and $Y^1$ of the composition in an example embodiment.

In General Formulae (1-1) and (1-2), $X^{21}$ and $X^{22}$ are independently a group selected from a C1 to C30 aliphatic group, a C4 to C30 alicyclic group, a C6 to C30 aromatic group, and a heterocyclic group, and these groups may have a substituent. The substituent may be a halogen atom (for example, a fluorine atom, a chlorine atom, a bromine atom, or a urea atom), a hydroxy group, an amino group, a C1 to C20 alkyl group (for example, a methyl group, an ethyl group, an n-propyl group, an isopropyl group), a C1 to C20 alkoxy group, and the like.

The C1 to C30 aliphatic group may be for example a linear or branched aliphatic group of a methylene group, an ethylene group, a trimethylene group, an isopropylene group, a tetramethylene group, a methyl trimethylene group, a pentylene group, a hexylene group, a heptylene group, an octylene group, a nonylene group, a decylene group, and the like which are 2-substituted with a carboxyl group as $X^{21}$. For example, the C1 to C30 aliphatic group may be for example a linear or branched aliphatic group of a methylene group, an ethylene group, a trimethylene group, an isopropylene group, a tetramethylene group, a methyl trimethylene group, a pentylene group, a hexylene group, a heptylene group, an octylene group, a nonylene group, a decylene group, and the like which are 1-substituted with a carboxyl group as $X^{22}$.

The C4 to C30 alicyclic group may be for example an alicyclic group of a cyclobutylene group, a cyclohexylene group, a cyclooctylene group, and the like which are 2-substituted with a carboxyl group as $X^{21}$. For example, the C4 to C30 alicyclic group may be for example an alicyclic group of a cyclohexylene group, a cyclooctylene group, and the like which are 1-substituted with a carboxyl group as $X^{22}$.

The C6 to C30 aromatic group may be for example an aromatic group of a phenylene group, a naphthylene group, and the like which are 2-substituted with a carboxyl group as $X^{21}$. In addition, for example, the C6 to C30 aromatic group may be for example an aromatic group of a phenylene group, a naphthylene group, and the like which are 1-substituted with a carboxyl group as $X^{22}$.

The heterocyclic group may be for example a 6-membered to 30-membered cyclic group including 1 to 3 hetero atoms selected from an oxygen atom, a sulfur atom, and a nitrogen atom as a ring constituting atom. More specifically, for example, $X^{21}$ may be a heterocyclic group of a pyridylene group, a quinolylene group, an isoquinolylene group, a pyradinylene group, a quinoxalinylene group, a pyrimidinylene group, an indolylene group, an isoindolylene group, a benzoimidazolylene group, a benzofurylene group, a benzothienylene group, a carbazolylene group, and the like which are 2-substituted with a carboxyl group. In addition, for example, $X^{22}$ may be a heterocyclic group of a pyridylene group, a quinolylene group, an isoquinolylene group, a pyradinylene group, a quinoxalinylene group, pyrimidinylene group, an indolylene group, an isoindolylene group, a benzoimidazolylene group, a benzofurylene group, a benzothienylene group, a carbazolylene group, and the like which are 1-substituted with a carboxyl group.

In some example embodiments, $X^{21}$ may be a C6 to C30 alicyclic group or aromatic group which is 2-substituted with a carboxyl group or unsubstituted. $X^{22}$ may be a C4 to C30 alicyclic group or C6 to C30 aromatic group carboxyl group which is 1-substituted with a carboxyl group or unsubstituted.

In terms of a balance of dispersibility of inorganic particulate, heat resistance of the composition, and gelation suppression of the polycarbonate, General Formula (1-1) may be selected from groups represented by Formulae (1-1a), (1-1b), (1-1c), and (1-1d), and in some example embodiments, it may be a group represented by Formula (1-1a):

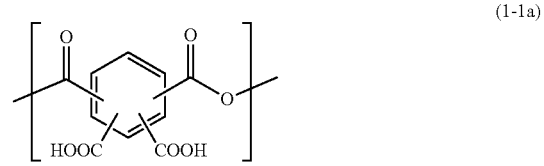

(1-1a)

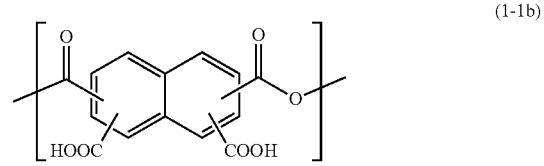

(1-1b)

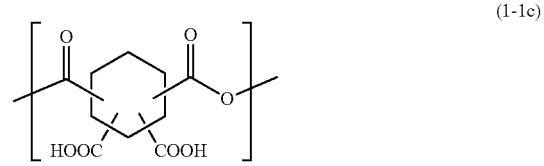

(1-1c)

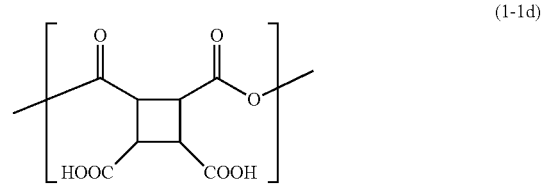

(1-1d)

In terms of a balance of dispersibility of inorganic particulate, heat resistance of the composition, and gelation suppression of the polycarbonate, General Formula (1-2) may be selected from groups represented by the formulae (1-2a), (1-2b), and (1-2c), and in some example embodiments, a group represented by formula (1-2a):

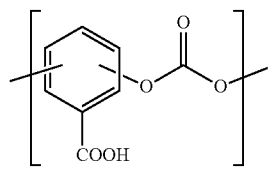
(1-2a)

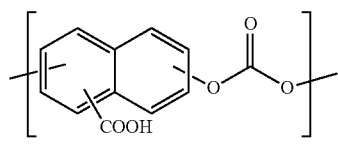
(1-2b)

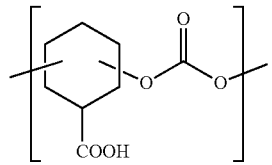
(1-2c)

$Y^1$ is a repeating unit selected from General Formulae (1-3) and (1-4). In terms of a balance of dispersibility of inorganic particulate, heat resistance of the composition, and gelation suppression of the polycarbonate, a ratio of $Y^1$ in the polycarbonate of the composition may be greater than or equal to about 88 mol % and less than about 100 mol %, for example greater than or equal to about 90 mol % and less than or equal to about 99.5 mol %, or greater than or equal to about 92 mol % and less than about 99 mol % based on 100 mol %, a sum of $X^1$ and $Y^1$ of the composition in an example embodiment.

Of precursor units of the polycarbonate included in the composition, a sum of $X^1$ and $Y^1$ may be for example greater than or equal to about 50 mol %, greater than or equal to about 80 mol %, greater than or equal to about 90 mol %, or 100 mol %.

In an example embodiment, a constituting unit of the polycarbonate included in the composition may include greater than about 0 mol % and less than or equal to about 12 mol % of $X^1$ and greater than or equal to about 88 mol % less than or equal to about 100 mol % of $Y^1$ (provided that, a sum of $X^1$ and $Y^1$ is 100 mol %). In some example embodiments, the constituting unit of the polycarbonate included in the composition may include greater than or equal to about 0.5 mol % and less than or equal to about 10 mol % of $X^1$ and greater than or equal to about 90 mol % and less than or equal to about 99.5 mol % of $Y^1$ (provided that, a sum of $X^1$ and $Y^1$ is 100 mol %). In some example embodiments, the constituting unit of the polycarbonate included in the composition may include greater than about 1 mol % and less than or equal to about 8 mol % of $X^1$ and greater than or equal to about 92 mol % and less than about 99 mol % of $Y^1$ (provided that, a sum of $X^1$ and $Y^1$ is 100 mol %).

In General Formulae (1-3) and (1-4), $Y^{21}$, $Y^{22}$, and $Y^{23}$ may independently represented by an aromatic group and the aromatic group may have a substituent. The substituent may be for example a C1 to C20 alkyl group (for example, a methyl group, a trimethylene group, an isopropyl group, a tetramethylene group, an isobutyl group, a s-butyl group, a t-butyl group, a tertiary amyl group, a hexyl group, an octyl group, a nonyl group, a dodecyl group, a pentadecyl group, an eicosanyl group, etc.), a C1 to C20 alkoxy group (for example, a methoxy group, an ethoxy group, a pentyl oxy group, a hexyloxy group, etc.), a C6 to C20 cycloalkyl group (for example, a cyclohexyl group, a cyclooctyl group, etc.), a C6 to C20 aryl group (for example, a phenyl group, a methylphenyl group, an ethylphenyl group, a tertiary butylphenyl group, a naphthyl group, a tolyl group, etc.), a C6 to C20 cyclo alkoxy group (for example, a cyclohexyl oxy group, etc.), and a C6 to C20 aryl oxy group (for example, a phenoxy group, a naphthyl oxy group, etc.).

$Y^{21}$, $Y^{22}$, and $Y^{23}$ may be for example a structure including an aromatic linking group such as a phenylene group, a naphthylene group, an anthracenylene group, a phenanthrenylene group, a biphenylene group, a terphenylene group, a fluoranthenylene group, a fluorenylene group, a 9,9-dimethylfluorenylene group, a 9,9-diphenylfluorenylene group, a 9,9'-spirobifluorene group, and the like. In some example embodiments, $Y^{21}$, $Y^{22}$, and $Y^{23}$ are independently an aromatic group represented by General Formula (4). Accordingly, a refractive index of polycarbonate alone may be improved and birefringence may be reduced, and thus it may be desirably used as a lens.

[General Formula (4)]

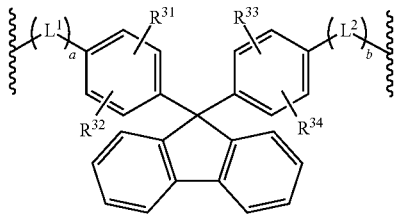
(4)

In General Formula (4), $L^1$ and $L^2$ are independently selected from a C1 to C6 alkylene group (for example, a methylene group, an ethylene group, a trimethylene group, an isopropylene group, a tetramethylene group, a methyl trimethylene group, a pentylene group, a hexylene group, etc.), a C1 to C6 alkyleneoxy group (i.e., a group represented by $-(CH_2)_{1-6}-O-$* (* indicates a linking portion with a diphenyl fluorene backbone), and more specifically a methyleneoxy group, an ethyleneoxy group, a trimethyleneoxy group, an isopropyleneoxy group, a tetramethyleneoxy group, a methyltrimethyleneoxy group, a pentyleneoxy group, a hexyleneoxy group, etc.), a C3 to C12 cyclo alkylene group (for example, a cyclopropylene group, a cyclobutylene group, a cyclohexylene group, a cyclooctylene group, etc.), and a C6 to C20 arylene group (for example, a phenylene group, a naphthylene group, etc.); $R^{31}$, $R^{32}$, $R^{33}$, and $R^{34}$ are independently a group selected from a hydrogen atom, a C1 to C20 alkyl group, a C1 to C20 alkoxy group, a C6 to C20 cycloalkyl group, a C6 to C20 aryl group, a C6 to C20 cycloalkoxy group, and a C6 to C20 aryl oxy group; and a and b are independently an integer of greater than or equal to 0 and less than or equal to 3.

In some example embodiments, in General Formula (4), $L^1$ and $L^2$ are independently selected from a methylene group, an ethylene group, a trimethylene group, an isopropylene group, a methyleneoxy group, an ethyleneoxy group, a trimethyleneoxy group, and an isopropyleneoxy group; $R^{31}$, $R^{32}$, $R^{33}$, and $R^{34}$ are independently a group selected from a hydrogen atom, a methyl group, a trimethylene group, an isopropyl group, a tetramethylene group, an isobutyl group, a s-butyl group, a t-butyl group, a methoxy group, and a cyclohexyl group; and a and b are independently an integer of greater than or equal to 0 and less than or equal to 2.

In some example embodiments, in General Formula (4), $L^1$ and $L^2$ are independently selected from a methylene group, an ethylene group, a trimethylene group, an isopropylene group, a methyleneoxy group, an ethyleneoxy group, a trimethyleneoxy group, and an isopropyleneoxy group; $R^{31}$, $R^{32}$, $R^{33}$, and $R^{34}$ are a hydrogen atom; a and b are independently 0 or 1.

In some example embodiments, the composition includes polycarbonate including a repeating unit wherein $X^1$ is represented by General Formula (1-1) and simultaneously $Y^1$ is represented by General Formula (1-3) and/or polycarbonate including a repeating unit wherein $X^1$ is represented by General Formula (1-2) and simultaneously $Y^1$ is represented by General Formula (1-4). Component (A-1) may have a number average molecular weight (Mn) of greater than or equal to about 4,000 and less than or equal to about 200,000, greater than or equal to about 6,000 and less than or equal to about 100,000, or greater than or equal to about 10,000 and less than or equal to about 50,000. Within the numeral ranges, transmittance (transparency) of the composition is particularly improved and a mechanical strength of an article obtained from the composition is improved.

Component (A-1) may have a weight average molecular weight (Mw) of greater than or equal to about 10,000 and less than or equal to about 500,000, for example greater than or equal to about 15,000 and less than or equal to about 200,000 or greater than or equal to about 20,000 and less than or equal to about 100,000. Within the numeral ranges, transmittance (transparency) of the composition is particularly improved and a mechanical strength of an article obtained from the composition is improved.

The refractive index of Component (A-1) may be for example greater than or equal to about 1.5 and less than or equal to about 2.0, and considering a balance with Abbe number the refractive index of the polycarbonate may be greater than or equal to about 1.6 and less than or equal to about 1.8, or greater than about 1.6 and less than or equal to about 1.7. The refractive index of Component (A-1) may be for example adjusted by controlling a mixing ratio of tetracarbonic dianhydride (for example, pyromellitic anhydride and the like) used as a raw monomer for a synthesis or a or b in General Formula (4) and specifically, increased by decreasing the mixing ratio of tetracarbonic dianhydride (for example, pyromellitic anhydride and the like) used as a raw monomer for a synthesis or a or b in General Formula (4).

A glass transition temperature (Tg) of Component (A-1) may be, for example, in a range of greater than about 100° C. and less than or equal to about 250° C., and with a consideration to handling during injection molding and heat resistance of a composition, Tg of polycarbonate may be in a range of greater than or equal to about 110° C. and less than or equal to about 180° C. Considering mechanical strength of an article obtained from the composition, Tg of polycarbonate may be in a range of greater than or equal to about 155° C. and less than or equal to about 180° C. Tg of Component (A-1) may be for example adjusted by controlling a mixing ratio of tetracarbonic dianhydride (for example, pyromellitic anhydride and the like) used as a raw monomer for a synthesis or a or b in General Formula (4) and specifically, increased by increasing a mixing ratio of tetracarbonic dianhydride (for example, pyromellitic anhydride, etc.) used a raw monomer for a synthesis or decreasing a or b in General Formula (4). As used herein, the glass transition temperature (Tg) of Component (A-1) is a value measured using a differential scanning calorimeter (DSC) described in examples. Each repeating unit of the Component (A-1) may have any type, for example, a block type or a random type.

Polycarbonate including a repeating unit represented by General Formula (1-1) and a repeating unit represented by General Formula (1-3) may be prepared by reacting a polycarbonate precursor that is a reaction product of an aromatic diol component and a carbonate raw material with tetracarbonic dianhydride.

The aromatic diol component is not particularly limited but may be for example an aromatic diol component represented by General Formula (4a) (for example, 9,9-bis(4-(2-hydroxy ethoxy)phenyl)fluorene, 9,9-bis-4-hydroxyphenylfluorene, 9,9-bis(4-hydroxy-3-methylphenyl)fluorene and the like fluorene compound), 4,4'-dihydroxydiphenylether, 4,4'-ethylenebisphenol, 4,4'-methylenebis(2,6-dimethylphenol), 2,2-bis(4-hydroxyphenyl)propane, 2,2-bis(4-hydroxy-3-methylphenyl)propane, 4,4'-dihydroxybenzophenone, 1,1-bis(4-hydroxyphenyl)cyclohexane, 4,4'-dihydroxytetraphenylmethane, 4,4'-(α-methylbenzylidene)bisphenol, and the like. The aromatic diol component may be used alone or in a mixture of two or more. In terms of a refractive index and a glass transition temperature, the aromatic diol component represented by General Formula (4a) may be exemplified.

[General Formula (4a)]

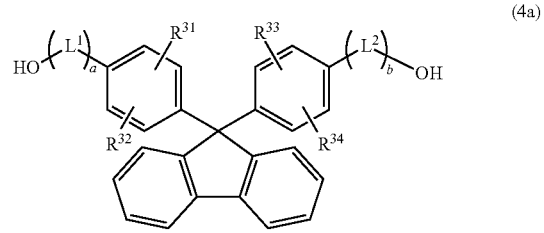

(4a)

In General Formula (4a), $L^1$, $L^2$, $R^{31}$, $R^{32}$, $R^{33}$, $R^{34}$, a, and b are the same as in General Formula (4) and descriptions of General Formula (4) may be desirably applied.

If the purpose and effect of the present disclosure is not inhibited, other diol components in addition to the aromatic diol component may be used for synthesis of Component (A-1). The other diol component may be for example, aliphatic diol such as ethylene glycol, propanediol, butanediol, pentanediol, hexanediol, and the like; alicyclic diol such as cyclohexane-1,4-dimethanol, decane-2,6-dimethanol, norobornanedimethanol, pentacyclopentadecanedimethanol, cyclopentane-1,3-dimethanol, spiro glycol, and the like.

The carbonate raw material is not particularly limited but may be for example, diarylcarbonate such as diphenylcarbonate, ditolylcarbonate, bis(chlorophenyl)carbonate, dinaphthylcarbonate, and the like, dialkylcarbonate such as dimethylcarbonate, diethylcarbonate, and the like, carbonyl halide such as phosgene, bromine phosgene, and the like, haloformate such as dihaloformate of divalent phenol, and the like. The carbonate raw material may be used alone or in a combination of two or more.

A polycarbonate precursor may be synthesized in a conventionally well-known method such as an interfacial polymerization method, an ester exchange method, and the like, for example, through a polymerization reaction of the aromatic diol component and a carbonate raw material under presence of a polymerization catalyst if necessary. The reaction temperature is particularly not limited but, in the ester exchange method, may be for example in a range of greater than or equal to about 130° C. and less than or equal to about 350° C. and specifically, greater than or equal to about 160° C. and less than or equal to about 300° C. The reaction may be performed under an inert gas atmosphere such as a nitrogen gas or an argon gas and under reduced pressure as needed. The polymerization catalyst may be a zinc compound such as zinc oxide, zinc acetate, and the like, a titanium compound such as tetraisopropoxy titanium, tetra-n-butoxy titanium, and the like, a tin compound such as tin oxide, di-n-butyl tin laurate, di-n-butyl tin oxide, dibutyl tin acetate, and the like, a germanium compound such as germanium oxide, and the like. At least a part of the obtained polycarbonate precursor is supplied for an esterification reaction with tetracarbonic dianhydride.

The esterification of a hydroxy group of the polycarbonate precursor with an acid anhydride group of the tetracarbonic dianhydride may provide polycarbonate including a repeating unit represented by General Formula (1-1) and a repeating unit represented by General Formula (1-3). In the esterification reaction, an injection ratio (a mole ratio) of tetracarbonic dianhydride with the polycarbonate precursor may be in a range of greater than about 0/100 and less than or equal to about 12/88 (tetracarbonic dianhydride/polycarbonate precursor). Accordingly, (m/n) may be 0<(m/n)≤0.12. In terms of balancing between dispersibility of inorganic particulate and heat resistance of a composition and gelation suppression of polycarbonate, the mole ratio for the esterification reaction may be greater than or equal to about 0.5/99.5 and less than or equal to about 10/90 (tetracarbonic dianhydride/polycarbonate precursor) in another example embodiment. In another example embodiment, the mole ratio for the esterification reaction may be greater than about 1/99 and less than or equal to about 8/92 (tetracarbonic dianhydride/polycarbonate precursor).

The tetracarbonic dianhydride is not particularly limited but may be for example tetracarbonic dianhydride represented by Formula (1-1e). The tetracarbonic dianhydride may be used alone or in a combination of two or more.

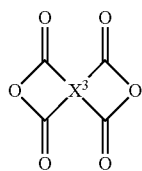

(1-1e)

In Formula (1-1e), $X^3$ is a group selected from a C1 to C30 aliphatic group, a C6 to C30 alicyclic group, a C6 to C30 aromatic group, and a heterocyclic group and these groups may have a substituent that is described in General Formula (1-1). $X^3$ may be a substituted or unsubstituted C6 to C30 alicyclic group or aromatic group. In some example embodiments, $X^3$ may be selected from the following groups.

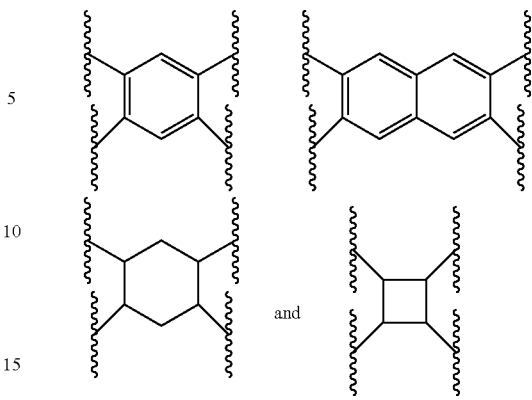

More specifically, the tetracarbonic dianhydride may be for example, pyromellitic anhydride, 1,2,5,6-naphthalene tetracarbonic dianhydride, 2,3,6,7-naphthalenetetracarbonic dianhydride, 1,2,4,5-naphthalenetetracarbonic dianhydride, 1,4,5,8-naphthalenetetracarbonic dianhydride, 3,4,9,10-perylenetetracarbonic dianhydride, pyrazine-2,3,5,6-tetracarbonic dianhydride, 1,2,3,4-cyclobutanetetracarbonic dianhydride, 1,2,3,4-cyclopentanetetracarbonic dianhydride, 1,2,4,5-cyclohexanetetracarbonic dianhydride, 1,2,3,4-butanetetracarbonic dianhydride, 5-(2,5-dioxotetrahydropuryl)-3-methyl-3-cyclohexene-1,2-dicarbonic anhydride, and the like.

The esterification reaction of the tetracarbonic dianhydride and the polycarbonate precursor may be performed at about 70° C. to about 150° C., for example about 80° C. to about 130° C. A reaction time is not particularly limited but may be for example about 1 hour to about 20 hours, for example about 3 hours to about 12 hours. A reaction solvent may be toluene, xylene, ethyl benzene, nitrobenzene, cyclohexane, isophorone, diethylene glycoldimethylether, triethylene glycol dimethylether, ethylene glycol diethylether, propylene glycol methylether acetate, propylene glycol ethyletheracetate, dipropylene glycol methyletheracetate, diethylene glycol ethyletheracetate, methoxy pyropionic acid methyl, methoxy pyropionic acid ethyl, ethoxy methyl pyropionate, ethoxy ethyl pyropionate, ethyl acetate, n-butyl acetate, iso amyl acetate, ethyl lactate, acetone, methylethylketone, cyclo hexanone, γ-butyrolactone, dimethyl sulfoxide, chloroform, and methylene chloride, and the like, but is not limited thereto. An esterification reaction catalyst may be amine (for example, triethylamine, benzyldimethylamine, etc.), pyridine (for example, 4-dimethylaminopyridine, etc.), a quaternary ammonium salt, imidazole, amide, phosphine (triphenylphosphine, etc.), an organic metal salt, and the like.

The polycarbonate including a repeating unit represented by General Formula (1-2) and a repeating unit represented by General Formula (1-4) may be prepared by a polymerization reaction of a mono carbonic acid diol component, an aromatic diol component, and a carbonate raw material. In the polymerization reaction, an injection ratio of the mono carbonic acid diol component and the aromatic diol component may be greater than about 0/100 and less than or equal to about 12/88 (mono carbonic acid diol component/aromatic diol component). Accordingly, (m/n) may be in a range of about 0<(m/n)≤0.12. In terms of balancing of dispersibility of inorganic particulate and heat resistance of a composition with gelation suppression of polycarbonate, a mixing ratio (a mole ratio) for the esterification reaction is greater than or equal to about 0.5/99.5 and less than or equal to about 10/90 (mono carbonic acid diol component/aromatic diol component) in another example embodiment. In another example embodiment, the mixing ratio (mole ratio) for the esterification reaction may be greater than about 1/99 and less than or equal to about 8/92 (mono carbonic acid diol component/aromatic diol component).

The mono carbonic acid diol component may be for example a diol component having a carboxyl group such as 2,2-dimethylol acetic acid, 2,2-dimethylol lactic acid, 2,2-dimethylol propionic acid, 2,2-dimethylol butanoic acid, 2,2-dimethylol heptanoic acid, 2,2-dimethylol nonanoic acid, 2,2-dimethylol butyric acid, 2,2-dimethylol valeric acid, 2,4-dihydroxy benzoic acid, 2,5-dihydroxy benzoic acid, 1,4-dihydroxy-2-naphthoic acid, 3,7-dihydroxy-2-naphthoic acid, 2,4-dihydroxy cyclohexane carbonic acid, 3,4-dihydroxy cyclohexane carbonic acid, and the like. The mono carbonic acid diol component may be used alone or in a combination of two or more.

The aromatic diol component and the carbonate raw material used for a synthesis of polycarbonate including the repeating unit represented by General Formula (1-2) and the repeating unit represented by General Formula (1-4) is the same as illustrated in the polycarbonate precursor. In addition, as for a polymerization reaction of corresponding polycarbonate, the aforementioned polymerization method may be appropriately applied thereto according to the aforementioned illustration of the polycarbonate precursor.

The obtained polycarbonate may be purified by a general purifying method of a reprecipitation method, a dialysis method, an ultrafiltration method, an extraction method, and the like.

<Component (B-1)>

Component (B-1), the inorganic particulate may be a metal oxide, a metal sulfide, a metal selenide, a metal telluride, and the like.

The metal oxide is not particularly limited but may be for example zirconium oxide, yttrium oxide-addition zirconium oxide, lead zircornate, strontium titanate, tin titanate, tin oxide, bismuth oxide, niobium oxide, tantalum oxide, potassium tantalate, tungsten oxide, cerium oxide, lanthanum oxide, gallium oxide, silica, titanium oxide, barium titanate, and the like.

In some example embodiments, when the organic-inorganic hybrid composition is used for an optical use, an inorganic particulate having a high refractive index is desirable and an inorganic particulate having a refractive index of greater than or equal to about 1.8 may be desirably used. In some example embodiments, the inorganic particulate may be desirably titanium oxide, barium titanate (a refractive index=about 2.4), zirconium oxide (a refractive index=about 2.1). That is, in an example embodiment, the inorganic particulate may include at least one kind of a particle selected from zirconium oxide, titanium oxide, and barium titanate. In some example embodiments, the inorganic particulate may be selected from zirconium oxide, titanium oxide, and barium titanate. In some example embodiments, even though the titanium oxide mainly has two kinds of crystal structures of a rutile-type (a refractive index=about 2.7) and an anatase-type (a refractive index=about 2.5), the rutile-type titanium oxide may be desirable since the anatase-type titanium oxide has a high photocatalyst activity and is not desirable for an optical use. In addition, in order to reduce the photocatalyst activity of the titanium oxide, a titanium oxide particle coated with silica on the surface may be used.

The inorganic particulate may be used alone or in a combination of two or more.

A hydroxy group or a group including a Group 16 element such as a mercapto group exists on the surface of the inorganic particulate. As illustrated later, since a composition according to an example embodiment includes a surface-modifying agent having a functional group (specifically, selected from a group including a carboxyl group and a thiol group) capable of forming a chemical bond with these groups, the surface-modifying agent modifies the surface of the inorganic particulate and improves dispersibility of the inorganic particulate.

The inorganic particulate may have a median diameter of less than or equal to about 15 nm and specifically, less than or equal to about 10 nm. When the inorganic particulate has a median diameter of less than or equal to about 15 nm, transparency of a composition due to a small particle diameter is increased. On the other hand, the median diameter of the inorganic particulate may be greater than or equal to about 1 nm and specifically, greater than or equal to about 3 nm. When the inorganic particulate having a median diameter of greater than or equal to about 1 nm is used, crystallinity is increased, and a refractive index becomes closed to a bulk state. On the other hand, the median diameter of the inorganic particulate may be obtained as a number median diameter based on a dynamic light scattering method. The inorganic particulate may have a median diameter of greater than or equal to about 1 nm and less than or equal to about 15 nm and specifically, greater than or equal to about 3 nm and less than or equal to about 10 nm.

In some example embodiments, an inorganic particulate having a high refractive index is desirable and an inorganic particulate having a refractive index of greater than or equal to about 1.8, greater than or equal to about 1.9, or greater than or equal to about 2.0 may be desirably used. A resin composition having a high refractive index may be obtained by using such an inorganic particulate. In some example embodiments, the higher the refractive index of the inorganic particulate is, the better, but it may be generally less than or equal to about 3.0. The desirable range of the refractive index of the inorganic particulate may be greater than or equal to about 1.8 and less than or equal to about 3.0, for example greater than or equal to about 1.9 and less than or equal to about 3.0, considering a balance with Abbe number.

The refractive index of the inorganic particulate may be for example calculated by measuring a refractive index difference of inorganic particulate dispersions having a different concentration from each other.

The inorganic particulate may be prepared using known methods.

In addition, the inorganic particulate may be commercial products which may be solvent dispersion. These commercial products may be SZR-W, SZR-CW, SZR-M, SZR-CM (zirconium oxide dispersion, Sakai Chemical Industry Co., Ltd.); Thai Nok (registered trademark) RA-6, NRA-10M (titanium oxide dispersion, Taki Chemical Co., Ltd.), and the like.

<Component (C-1)>

Component (C-1), the surface-modifying agent (Hereinafter, simply referred to as "modifying agent") may be used in order to modify the inorganic particulate. In some example embodiments, the surface-modifying agent is a compound represented by General Formula (3).

The surface-treatment agent may be used alone or in a mixture of two or more.

Descriptions for General Formula (3) are the same as in the above descriptions for General Formula (3), and thus are omitted herein.

In an example embodiment, desirable surface-modifying agents may be specifically 2-thiophene carbonic acid, 3-thiophene carbonic acid, 2-furan carbonic acid, benzoic acid, biphenyl4-carbonic acid, 4-methyl benzoic acid, picolinic acid, cyclohexane carbonic acid, 2-thiophene thiol, 2-thiophene ethanethiol, benzene thiol, benzenemethanethiol, 4-methylbenzenemethanethiol, phenylethanethiol, cyclohexane thiol, cyclohexanemethanethiol, 2-pyridine thiol, and the like.

In some example embodiments, in terms of improved balance of transparency, refractive index, and transmittance, the surface-modifying agent may be selected from 3-thiophene carbonic acid, benzoic acid, and phenylethanethiol.

The surface modification method of the inorganic particulate by using the surface-modifying agent has no particular limit but includes, for example, a wet method or a dry method. In terms of modifying the inorganic particulate more efficiently and inhibiting secondary agglomeration of the inorganic particulate, a wet method may be desirable. When the inorganic particulate is modified with a wet method, for example, the organic surface-modifying agent is added to dispersion of the inorganic particulate and then stirred and thereby the surface of the inorganic particulate may be modified. The mixture of the surface-modifying agent with the inorganic particulate may be mixed with Component (A-1).

A solvent used in the dispersion of the inorganic particulate is not particularly limited but in terms of dispersing the inorganic particulate uniformly, water; alcohols such as methanol, ethanol, propanol, isopropanol, and the like; and a mixture thereof may be desirable. In addition, in order to stabilize the dispersion, for example, other components acid such as formic acid, acetic acid, hydrochloric acid, nitric acid, and the like or alkali and the like may be added to the dispersion. These components may be removed through washing or drying before mixing it with the Component (A-1).

An amount of the surface-modifying agent may be determined so as to obtain an appropriate surface-modification, but the surface-modifying agent:the inorganic particulate may be about 1:(about 1 to about 100) (a weight ratio), for example about 1:(about 2 to about 20) (a weight ratio).

A reaction time to modify the inorganic particulate with the modifying agent is not particularly limited, but may be generally greater than or equal to about 1 hour and less than or equal to about 48 hours, for example, greater than or equal to about 2 hours and less than or equal to about 24 hours. In addition, a reaction temperature is not particularly limited, but may be greater than or equal to about 10° C. and less than or equal to about 100° C., for example greater than or equal to about 10° C. and less than or equal to about 60° C., for another example greater than or equal to about 10° C. and less than or equal to about 40° C.

After the reaction, the obtained dispersion may be concentrated. In addition, an excessive modifying agent or other components may be removed by washing or filtering.

<Method of Preparing Composition>

The composition according to example embodiments may be obtained by mixing Component (A-1), Component (B-1), and Component (C-1) simultaneously, but in terms of an effective modification of the inorganic particulate with the surface-modifying agent, as described above, a mixture of the Component (B-1) and Component (C-1) is prepared and then the mixture and the Component (A-1) are mixed.

During preparation of the composition, a solvent such as chloroform, dichloro methane, diethylether, tetrahydrofuran, ethyl acetate, acetone, acetonitrile, N,N-dimethyl formamide, N-methyl-2-pyrrolidone, and the like may be used.

An amount of each component in the composition is not particularly limited but for example, an amount of the inorganic particulate and the surface-modifying agent relative to an amount of the polycarbonate may be greater than or equal to about 1/99 and less than or equal to about 99/1 (a sum of the inorganic particulate and the surface-modifying agent/polycarbonate) as a weight ratio. In terms of an improved mechanical strength of an article obtained from the composition, the amount of the inorganic particulate and the surface-modifying agent relative to the amount of the polycarbonate may be greater than or equal to about 5/95 and less than 80/20, for example greater than or equal to about 5/95 (a sum of the inorganic particulate and the surface-modifying agent//polycarbonate) and less than or equal to about 70/30 (a sum of the inorganic particulate and the surface-modifying agent//polycarbonate) as a weight ratio. In terms of transmittance, an amount of the inorganic particulate and the surface-modifying agent relative to an amount of the polycarbonate may be greater than or equal to about 10/90 and less than or equal to about 45/55 (a sum of the inorganic particulate and the surface-modifying agent//polycarbonate) as a weight ratio.

In an example embodiment, the amount of the polycarbonate may be greater than or equal to about 1 wt % and less than or equal to about 99 wt % based on a total amount of the composition. In another example embodiment, the amount of the polycarbonate may be greater than about 20 wt % and less than or equal to about 95 wt % based on a total amount of the composition.

In an example embodiment, the sum of the inorganic particulate and the surface-modifying agent may be greater than or equal to about 1 wt % and less than or equal to about 99 wt % based on a total amount of the composition. In another example embodiment, the sum of the inorganic particulate and the surface-modifying agent may be greater than or equal to about 5 wt % and less than about 80 wt % based on a total amount of the composition.

The composition according to an example embodiment may include optionally an additive such as an antioxidant, an ultraviolet (UV) absorber, an anti-light stabilizer, a heat stabilizer, a plasticizer, colorant, a blowing agent, a flame retardant, a flame-retardant aid, a release agent, a plasticizer, an impact resistance improving agent, a reinforcing agent, a dispersing agent, an antistatic agent, a forming agent, an antibacterial agent, other resins, an elastomer, and the like.

[Regarding Organic-Inorganic Hybrid Composition Having Low Yellowing]

According to another example embodiment, an organic-inorganic hybrid composition having a high refractive index and high light transmittance and simultaneously, Low Yellowing even after a heating process may be provided.

An example embodiment provides an organic-inorganic hybrid composition including a thermoplastic resin and an inorganic particulate surface-modified by an organic surface-modifying agent, wherein the organic surface-modifying agent has pKa of greater than or equal to about 2.00 and less than or equal to about 6.00, and the organic-inorganic hybrid composition has an absolute value of less than or equal to about 4.00 as a solubility parameter difference between the thermoplastic resin and the organic surface-modifying agent. Hereinafter, the absolute value of the solubility parameter difference between the thermoplastic resin and the organic surface-modifying agent is simply a SP difference.

A detail mechanism of obtaining this effect is not clear but may be illustrated as follows. Dispersibility of the inorganic the particulate in the thermoplastic resin and transparency of the inorganic particulate is improved by using the inorganic particulate surface-modified by an organic surface-modifying agent having less than or equal to about 4 of a solubility parameter difference from the thermoplastic resin (for example, refer to Examples C1 to C5 and Comparative Examples C3 and C5 to C6). However, simple reduction of a SP difference of both may deteriorate haze and secure transparency but brings about a high total light transmittance after a heating process and specifically, fails in obtaining an article having total light transmittance of greater than or equal to about 80%. Accordingly, as a result of variously researching a surface-modifying agent of inorganic particulate, pKa of the surface-modifying agent of the inorganic particulate has a large influence on total light transmittance of a resin composition. Specifically, the total light transmittance of an article may be largely improved by adjusting pKa of the organic surface-modifying agent in a range of greater than or equal to about 2.00 and less than or equal to about 6.00. The reason is illustrated as follows. When pKa of the organic surface-modifying agent is greater than about 6.00, a decomposition temperature of organic surface-modifying agent may be lowered, and thus an article becomes yellowed due to decomposition of the compound during molding or heating at a high temperature. Accordingly, total light transmittance is lowered (refer to Comparative Example C1). In addition, when pKa is less than about 2.00, an equilibrium between the surface of the inorganic particulate and a functional group of a modifier may not be maintained, and thus dispersion stability is deteriorated (refer to Comparative Example C4). In addition, the modifier separated thereby is cross-linked with the thermoplastic resin and thus easily causes a gelation.

Hereinafter, materials of the organic-inorganic hybrid composition are described. Hereinafter, the organic-inorganic hybrid composition may be simply referred to a composition.

<Inorganic Particulate>

An inorganic compound constituting the inorganic particulate may be a metal oxide, a metal sulfide, a metal selenide, a metal telluride, and the like.

The metal oxide is not particularly limited but may be for example zirconium oxide, yttrium oxide-addition zirconium oxide, lead zircornate, strontium titanate, tin titanate, tin oxide, bismuth oxide, niobium oxide, tantalum oxide, potassium tantalate, tungsten oxide, cerium oxide, lanthanum oxide, gallium oxide, silica, alumina, titanium oxide, barium titanate, and the like.

In some example embodiments, when the organic-inorganic hybrid composition is used for an optical use, an inorganic particulate having a high refractive index is desirable and an inorganic particulate having a refractive index of greater than or equal to about 1.8 may be desirably used. Specifically, in some example embodiments, the inorganic particulate may be desirably at least one selected from zirconium oxide (a refractive index=about 2.1), titanium oxide and barium titanate (a refractive index=about 2.4). In some example embodiments, even though the titanium oxide mainly has two kinds of crystal structures of a rutile-type (a refractive index=about 2.7) and an anatase-type (a refractive index=about 2.5), the rutile-type titanium oxide may be desirable since the anatase-type titanium oxide has a high photocatalyst activity and is not desirable for an optical use. In addition, in order to reduce the photocatalyst activity of the titanium oxide, a titanium oxide particle coated with silica on the surface may be used.

The inorganic particulate may be used alone or in a combination of two or more.

On the surface of the inorganic particulate, a group including Group 16 element such as a hydroxy group, a mercapto group, and the like is present. As illustrated later, the organic surface-modifying agent may have a functional group (for example, a carboxyl group or a phosphinic acid group) forming a bond with these groups, and the surface of the inorganic particulate may be modified by contacting the organic surface-modifying agent having the functional group with the inorganic particulate.

The inorganic particulates may have a volume reference median diameter of less than or equal to about 30 nm, specifically, less than or equal to about 15 nm. When the inorganic particulate having a volume reference median diameter of less than or equal to about 30 nm is used, transparency of a resin composition may be increased due to a small particle diameter thereof. On the other hand, the inorganic particulate may have a volume reference median diameter of greater than or equal to about 1 nm and specifically greater than or equal to about 3 nm. The inorganic particulate having a volume reference median diameter of greater than or equal to about 1 nm may be prevented from a secondary agglomeration. On the other hand, the volume reference median diameter of the inorganic particulate is obtained in a dynamic light scattering method. The volume reference median diameter of the inorganic particulate may be in a range of greater than or equal to about 1 nm and less than or equal to about 30 nm.

In some example embodiments, an inorganic particulate having a high refractive index is desirable and an inorganic particulate having a refractive index of greater than or equal to about 1.8, greater than or equal to about 1.9, or greater than or equal to about 2.0 may be desirably used. By using such an inorganic particulate, a resin composition having a high refractive index may be obtained. In some example embodiments, the higher the refractive index of the inorganic particulate is, the better, but it may be generally less than or equal to about 3.0. The desirable range of the refractive index of the inorganic particulate may be greater than or equal to about 1.8 and less than or equal to about 3.0, for example greater than or equal to about 1.9 and less than or equal to about 3.0, considering a balance with Abbe number. The refractive index of the inorganic particulate may be for example calculated by measuring a refractive index difference of inorganic particulate dispersions having a different concentration from each other.

The inorganic particulate may be prepared using known methods.

In addition, the inorganic particulate may be commercial products which may be solvent dispersion. These commercial products may be SZR-W, SZR-CW, SZR-M, SZR-K (zirconium oxide dispersion, Sakai Chemical Industry Co., Ltd.); Thai Nok (registered trademark) RA-6, NRA-10M (titanium oxide dispersion, Taki Chemical Co., Ltd.), and the like.

<Organic Surface-Modifying Agent>

The organic surface-modifying agent may be used to modify a surface of the inorganic particulate. Hereinafter, the organic surface-modifying agent may be referred to as a surface-modifying agent or a modifying agent.

The surface-modifying agent may have pKa of greater than or equal to about 2.00 and less than or equal to about 6.00. When pKa is greater than about 6.00, the decomposition temperature of the organic surface-modifying agent may be lowered and thus yellowing occurs due to decomposition of the compound during molding or heating at a high temperature. Accordingly, total light transmittance is lowered (refer to Comparative Example C1). In addition, when pKa is less than about 2.00, dispersion of particles is not sufficient, and transparency is sharply deteriorated. pKa of the surface-modifying agent may be less than or equal to about 4.00, specifically, less than or equal to about 3.00, and more specifically, less than or equal to about 2.50 in terms of having a larger effect of reducing yellowing and increasing total light transmittance.

Herein, pKa indicates $pKa_1$, a dissociation index, a logarithmic number of a reciprocal number of a first acid dissociation constant when organic acid releases protons through multistep. In addition, pKa is obtained according to $pKa_1 = -\log_{10} Ka_1$ by using the acid dissociation constant $Ka_1$ obtained according to a Brønsted-Lowry acid-base theory. pKa of each material may be referred rather than consulting a constant list of acid dissociation constants in http://www-.chemicaldictionary.org or http://www.drjez.com/uco/ChemTools/Chem_Tools.htm. pKa may be calculated by thousandth and then, rounded off at the thousandth and thus obtained by hundredth.

In terms of high binding properties (affinity) with the inorganic particulate, the surface-modifying agent may have an acid functional group. The acid functional group may be a carboxyl group, a phosphoric acid group ($H_2PO_4$—), a phosphonic acid group ($P(=O)(OH)_2$—), a phosphinic acid group ($PR^5(=O)(OH)$—), or a sulfone group ($SO_3H$—). Herein, $R^5$ is the same as $R^5$ of the phosphonic acid compound. In some example embodiments, in terms of improved light transmittance, the organic surface-modifying agent may have a phosphinic acid group.

In some example embodiments, the surface-modifying agent having the phosphinic acid group may be a phosphinic acid compound as follows.

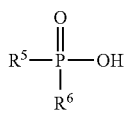

In the formula, $R^5$ and $R^6$ are independently a hydrogen atom, a C1 to C8 linear or branched alkyl group, or a C6 to C24 aryl group, provided that $R^5$ and $R^6$ are not simultaneously a hydrogen atom.

The C1 to C8 linear or branched alkyl group is not particularly limited but may be for example a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, a n-heptyl group, a n-octyl group, a 2-ethylhexyl group, and the like. In some example embodiments, the methyl group, ethyl group, n-propyl group, and isopropyl group may be desirable, the methyl group and ethyl group may be more desirable, and the methyl group may be even more desirable.

The C6 to C24 aryl group is not particularly limited but may be for example a phenyl group, a naphthyl group, a biphenyl group, a fluorenyl group, an anthryl group, a pyrenyl group, an azulenyl group, an acenaphthylenyl group, a terphenyl group, a phenanthryl group, and the like. In some example embodiments, the phenyl group, biphenyl group, and fluorenyl group may be desirable, the phenyl group and fluorenyl group may be more desirable, and the phenyl group may be even more desirable.

In addition, the organic surface-modifying agent may have a substituted or unsubstituted aromatic residual group. The aromatic residual group may improve a refractive index of the organic surface-modifying agent, and accordingly, a refractive index of the obtained composition may be further improved. In addition, since strength of a resin composition is improved by an interaction between a fluorene frame and an aromatic residual group by combining a thermoplastic resin having a constituting unit represented by General Formula (5) and the organic surface-modifying agent having the aromatic residual group, the thermoplastic resin having the constituting unit represented by General Formula (5) may be mixed with the organic surface-modifying agent having the aromatic residual group. The aromatic residual group is not particularly limited. Herein, "the aromatic residual group" refers to a group except one hydrogen atom from an aromatic ring such as an aromatic hydrocarbon ring, a heterocyclic aromatic ring, a condensed aromatic ring, and the like. For example, it may be a C6 to C24 aryl group or a C2 to C24 hetero aryl group.

The C6 to C24 aryl group is not particularly limited but may be for example a phenyl group, a naphthyl group, a biphenyl group, a fluorenyl group, an anthryl group, a pyrenyl group, an azulenyl group, an acenaphthylenyl group, a terphenyl group, a phenanthryl group, and the like.

The C2 to C24 hetero aryl group is not particularly limited but may be a pyrrolidinyl group, a piperidinyl group, a piperazinyl group, a morpholino group, thiomorpholino group, a homopiperidinyl group, a chromanyl group, iso chromanyl group, a chromenyl group, a pyrrolyl group, a furanyl group, a thienyl group, a pyrazolyl group, an imidazolyl group, a furanzanyl group, an oxazolyl group, an isoxazolyl group, a thiazolyl group, an isothiazolyl group, a pyridyl group, a pyridazinyl group, a pyrimidinyl group, a pyradinyl group, a pyranyl group, a indolyl group, an isoindolyl group, an indazolyl group, a purinyl group, an indolizinyl group, a quinolinyl group, an isoquinolinyl group, a quinazolinyl group, a pteridinyl group, a quinolizinyl group, a benzoxazinyl group, a carbazolyl group, a phenazinyl group, a phenothiazinyl group, a phenanthridinyl group, and the like. In some example embodiments, the thienyl group and imidazolyl group are desirable and the imidazolyl group is more desirable.

In some example embodiments, the aromatic residual group may be a C6 to C24 aryl group, may be desirably a phenyl group, a naphthyl group, or a biphenyl group, may be more desirably a phenyl group or a biphenyl group, and may be even more desirably a phenyl group.

Meanwhile, the organic surface-modifying agent may have a plurality of the aromatic residual groups, for example, two to three phenyl groups, or two phenyl groups.

The substituent bound to the aromatic residual group as needed may be a halogen atom, a C1 to C24 linear or branched alkyl group, a C1 to C18 hydroxy alkyl group, a C1 to C18 alkoxy group, a C1 to C32 acyl group, a C6 to C24 aryl group, a C2 to C32 alkenyl group, an amino group, and a C2 to C24 hetero aryl group.

In an example embodiment, examples of the surface-modifying agent may be as follows; phenylphosphonic acid (2.00), diphenyl phosphinic acid (2.30), benzoic acid (4.21), dimethyl phosphinic acid (2.30), biphenyl4-carbonic acid (4.19), 4-methyl benzoic acid (4.37), benzene sulfonic acid (2.55), acetic acid (4.76), thiophene carbonic acid (4.10), hydroxy benzoic acid (4.54), phenyl acetic acid (4.31), diphenyl acetic acid (3.81), triphenyl acetic acid (3.30), 4-tert-butyl benzoic acid (4.4), 3,5-dimethyl benzoic acid (4.34), 4-methyl benzoic acid (4.37), and the like. The values in the parentheses indicate pKa.

In an example embodiment, in terms of balance of transparency, a refractive index, and total light transmittance, the surface-modifying agent may be desirably phenylphosphonic acid, diphenyl phosphinic acid, or benzoic acid, and in an example embodiment, phenylphosphonic acid and diphenyl phosphinic acid may be more desirable.

The organic surface-modifying agent may be used alone or in a mixture of two or more. When a plurality of the organic surface-modifying agents is included, pKa of all organic surface-modifying agents may be greater than or equal to about 2.00 and less than or equal to about 6.00.

A molecular weight of the organic surface-modifying agent may be greater than or equal to about 80 and less than or equal to about 1000, for example greater than or equal to about 80 and less than or equal to about 500 due to a surface modification effect.

A refractive index of an organic the surface-modifying agent may be greater than or equal to about 1.35, for example greater than or equal to about 1.5 at a wavelength of 589 nm. A refractive index of the entire composition may be increased by using a modifier having a high refractive index. The higher the refractive index of organic surface-modifying agent is higher, the better, but the refractive index may be less than or equal to about 1.80. A refractive index n (a wavelength of 589 nm) of the modifier may be obtained according to Equation (B) using a Lorentz-Lorenz formula relating a refractive index and a chemical structure.

$$\frac{n^2-1}{n^2+2} = \frac{4\pi}{3}N\alpha \tag{B}$$

In Equation (B), N is the number of a molecule per a unit volume and a is an average polarizability of a molecule.

<Inorganic Particulate Surface-Modified by Organic Surface-Modifying Agent>

In an example embodiment, "surface-modified by an organic surface-modifying agent" indicates a state that the surface-modifying agent is present around the surface of the inorganic particulate by any bond through a chemical reaction of a hydroxy group on the surface of the inorganic particulate with a functional group of the surface-modifying agent; through an attractive interaction such as a hydrogen bond between the surface of the inorganic particulate and the surface-modifying agent and the like.

A solid content ratio in a composition of the inorganic particulate surface-modified by the organic surface-modifying agent may be less than or equal to about 25 vol % and specifically, less than or equal to about 20 vol % in order to secure strength of a resin composition during molding. The solid content ratio may be greater than or equal to about 2 vol % in terms of an effect of improving a refractive index due to addition of the inorganic particulate and greater than or equal to about 3 vol % and less than or equal to about 25 vol % in terms of strength and a high refractive index.

A surface modifying method of the inorganic particulate with the organic surface-modifying agent is not particularly limited but for example may be a wet method or a dry method. In terms of modifying the inorganic particulate more efficiently and inhibiting secondary agglomeration of the inorganic particulate, a wet method may be desirable.

When the inorganic particulate is modified with a wet method, for example, the organic surface-modifying agent is added to dispersion of the inorganic particulate and then stirred and thereby the surface of the inorganic particulate may be modified.

A solvent used in the dispersion of the inorganic particulate is not particularly limited but in terms of dispersing the inorganic particulate uniformly, water; alcohols such as methanol, ethanol, propanol, isopropanol, and the like; and a mixture thereof may be desirable. In addition, in order to stabilize the dispersion, for example, other components acid such as formic acid, acetic acid, hydrochloric acid, nitric acid, and the like or alkali and the like may be added to the dispersion. These components may be removed through washing or drying before mixing it with the thermoplastic resin.

An amount of the surface-modifying agent may be determined so as to obtain an appropriate surface-modification, but considering a modification effect of the surface-modifying agent and a refractive index, the inorganic particulate may be used in a ratio of greater than or equal to about 3 and less than or equal to about 40 (weight ratio), for example greater than or equal to about 5 and less than or equal to about 20 (weight ratio) relative to 1 of the surface-modifying agent.

A reaction time to modify the inorganic particulate with the modifying agent is not particularly limited, but may be generally greater than or equal to about 1 hour and less than or equal to about 48 hours, for example, greater than or equal to about 2 hours and less than or equal to about 24 hours. In addition, a reaction temperature is not particularly limited, but may be greater than or equal to about 10° C. and less than or equal to about 100° C., for example greater than or equal to about 10° C. and less than or equal to about 60° C., for another example greater than or equal to about 10° C. and less than or equal to about 40° C.

After the reaction, the obtained dispersion may be concentrated. In addition, an excessive modifying agent or other components may be removed by washing or filtering.

<Thermoplastic Resin>

The thermoplastic resin is not particularly limited, and may be an acrylic resin, a polycarbonate resin, an amorphous polyester resin, an amorphous polyolefin resin, a cyclo olefin resin, and the like. The thermoplastic resin may be used alone or in a mixture of two or more.

In an example embodiment, in terms of high heat resistance, the thermoplastic resin may be a polycarbonate resin and in terms of an increased refractive index, the thermoplastic resin may be an aromatic polycarbonate resin.

The aromatic polycarbonate is a polycarbonate having a constituting unit derived from an aromatic diol component. The aromatic diol component is not particularly limited, but may be for example aromatic diol component represented by General Formula (6), 4,4'-dihydroxydiphenylether, 4,4'-ethylidene bisphenol, 4,4'-methylene bis(2,6-dimethylphenol), 2,2-bis(4-hydroxyphenyl)propane, 2,2-bis(4-hydroxy-3-methylphenyl)propane, 4,4'-dihydroxybenzophenone, 1,1-bis(4-hydroxyphenyl)cyclohexane, 4,4'-dihydroxytetraphenylmethane, 4,4'-(α-methylbenzylidene)bisphenol, and the like. The aromatic diol component may be used alone or in a combination of two or more.

In addition, in terms of increasing a refractive index, the thermoplastic resin may have a constituting unit represented by General Formula (5).

[General Formula (5)]

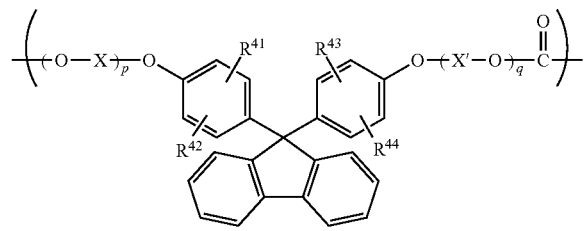

(5)

In Formula (5), $R^{41}$, $R^{42}$, $R^{43}$, and $R^{44}$ are independently a hydrogen atom, a C1 to C20 alkyl group, a C1 to C20 alkoxy group, a C6 to C20 cycloalkyl group, a C6 to C20 aryl group, a C6 to C20 cyclo alkoxy group, or a C6 to C20 aryl oxy group.

The C1 to C20 alkyl group may be a linear or branched alkyl group, for example, a methyl group, an ethyl group, a n-propyl group, an isopropyl group, a n-butyl group, an isobutyl group, a sec-butyl group, a tert-butyl group, a n-pentyl group, an isopentyl group, a tert-pentyl group, a neopentyl group, a 1,2-dimethyl propyl group, a n-hexyl group, an isohexyl group, a 1,3-dimethylbutyl group, a 1-isopropyl propyl group, a 1,2-dimethylbutyl group, a n-heptyl group, a 1,4-dimethyl pentyl group, a 3-ethyl pentyl group, a 2-methyl-1-isopropyl propyl group, a 1-ethyl-3-methyl butyl group, a n-octyl group, a 2-ethylhexyl group, a 3-methyl-1-isopropyl butyl group, a 2-methyl-1-isopropyl group, a 1-t-butyl-2-methyl propyl group, a n-nonyl group, a 3,5,5-trimethyl hexyl group, a n-decyl group, an iso decyl group, a n-undecyl group, a 1-methyldecyl group, a n-dodecyl group, a n-tridecyl group, a n-tetra decyl group, a n-penta decyl group, a n-hexa decyl group, a n-heptadecyl group, a n-octa decyl group, a n-nonadecyl group, a n-eicosyl group, and the like. The alkyl group may be a C1 to C8 alkyl group or a C1 to C4 alkyl group.

The C1 to C20 alkoxy group may be for example a methoxy group, an ethoxy group, a propoxy group, an isopropoxy group, a butoxy group, an iso butoxy group, a sec-butoxy group, a tert-butoxy group, a pentyl oxy group, an isopentyl oxy group, a hexyloxy group, a 2-ethylhexyl oxy group, an octyloxy group, a nonyloxy group, a decyloxy group, an undecyloxy group, a dodecyloxy group, a tridecyloxy group, a tetradecyloxy group, a pentadecyloxy group, a hexadecyloxy group, a heptadecyl oxy group, an octadecyloxy group, a n-nonadecyloxy group, a n-eicosyloxy group, and the like. The alkoxy group may be a C1 to C8 alkoxy group or a C1 to C4 alkoxy group.

The C6 to C20 cycloalkyl group may be a cyclohexyl group, a cycloheptyl group, a cyclooctyl group, and the like. The cycloalkyl group may be a C6 to C12 cycloalkyl group.

The C6 to C20 aryl group may be for example a phenyl group, a naphthyl group, a biphenyl group, a fluorenyl group, an anthryl group, a pyrenyl group, an azulenyl group, an acenaphthylenyl group, a terphenyl group, a phenanthryl group, and the like. The aryl group may be a C6 to C12 aryl group, for example a phenyl group.

The C6 to C20 cycloalkoxy group may be for example a cyclohexyl oxy group, and the like. The cycloalkoxy group may be a C6 to C12 cycloalkoxy group.

The C6 to C20 aryl oxy group may be for example a phenoxy group, a naphthyl oxy group, and the like. The aryl oxy group may be a C6 to C12 aryl oxy group, for example a phenoxy group.

$R^{41}$, $R^{42}$, $R^{43}$, and $R^{44}$ may independently be a hydrogen atom, a C1 to C20 alkyl group, a C1 to C20 alkoxy group, a C6 to C20 cycloalkyl group, a C6 to C20 aryl group, desirably a hydrogen atom or a C1 to C20 alkyl group, and more desirably a hydrogen atom.

In General Formula (5), X and X' are independently a C2 to C8 alkylene group, a C3 to C12 cyclo alkylene group, or a C6 to C20 arylene group.

The C2 to C8 alkylene group (alkanediyl) may be for example an ethylene group, ethane-1,1-diyl, propane-1,1-diyl, propane-1,2-diyl, propane-1,3-diyl, propane-2,2-diyl, butane-1,2-diyl, butane-1,3-diyl, butane-1,4-diyl, and the like.

The C3 to C12 cyclo alkylene group may be for example a cyclo pentylene group, a cyclohexylene group, a cyclo heptylene group, and the like.

The C6 to C20 arylene group may be an o-phenylene group, a m-phenylene group, a p-phenylene group, a naphthalenediyl, an anthracenediyl, naphtacenediyl, pyrenediyl, naphthylnaphthalenediyl, biphenyldiyl (for example, [1,1'-biphenyl]-4,4'-diyl, 3,3'-biphenyldiyl, 3,6-biphenyldiyl, etc.), terphenyldiyl, quaterphenyldiyl, quinquephenyldiyl, hexaphenyldiyl, and the like.

In an example embodiment, X and X' may independently be a C2 to C8 alkylene group, for example a C2 to C4 alkylene group or a C2 or C3 alkylene group.

The p and q in General Formula (5) may be independently an integer ranging from 0 to 10, for example 0 to 5, 0 to 3, 0 to 2, 0 or 1.

Meanwhile, the structure represented by General Formula (5) may include one kind or two or more kinds of different structures. When two or more kinds of the structure represented by General Formula (5) are present, a block copolymer or a random copolymer may be provided.

The thermoplastic resin may have an acid functional group at a terminal end of the polymer or a side chain and in some example embodiments, it may have an acid functional group at one terminal end or both terminal ends. The acid functional group improves dispersibility of the inorganic particulate in the resin through an interaction with the inorganic particulate and transparency of the resin composition may be further improved.

The acid functional group may be a carboxyl group, a phosphonic acid group ($P(=O)(OH)_2$—), a phosphinic acid group ($PR^5(=O)(OH)$—), or a sulfone group ($SO_3H$—), and the like. In some example embodiments, in term of a difference of adsorption forces due to acidity of the inorganic particulate, the phosphonic acid group, phosphinic acid group or carboxyl group may be desirable and the phosphonic acid group ($P(=O)(OH)_2$—) may be more desirable. The sulfone group has a high adsorption force for the inorganic particulate, thiol may cause coloring.

A method of manufacturing the thermoplastic resin having an acid functional group is not particularly limited but may include any well known method, for example, a method of copolymerizing a monomer having an acid functional group, a method of copolymerizing a monomer having an acid functional group precursor region (for example, ester and the like) and converting it into an acid functional group through hydrolysis and the like, a method of synthesizing a precursor resin having a reactivity region such as a hydroxy group, an amino group, an aromatic ring, and the like and introducing an acid functional group into the reactivity region, and the like. In addition, another method of introducing the acid functional group may be a method of treating a terminal end of phenol with a treatment, for example, as for a sulfone group, a method of treating it with a sulfone-oxidizing agent such as chlorosulfonic acid, anhydrous sulfuric acid, smoke lactic acid, and the like; as for a phosphonic acid group, a method of treating it with a phosphorus-oxidizing agent such as phosphorus oxychloride and the like.

The thermoplastic resin mainly includes a repeating unit of General Formula (5). Hereinafter, the polycarbonate resin mainly having the repeating unit of General Formula (5) is referred to as Resin (A-2). The resin (A-2) may include a repeating unit represented by General Formula (5) in an amount of greater than or equal to about 80 mol %, specifically, about 90 mol %, more specifically, about 95 mol %, and much more specifically, about 100 mol % among all the repeating units. Herein, the content of the repeating unit includes a constituting unit having a hydroxy group or an acid functional group at a terminal end.

The Resin (A-2) may have other constituting units. The other constituting units may be for example a constituting unit derived from aliphatic diol, alicyclic diol, aromatic diol in addition to aromatic diols represented by General Formula (6). Herein, the aliphatic diol may be for example ethylene glycol, propanediol, butanediol, pentanediol, hexanediol, and the like. The alicyclic diol may be cyclohexane-1,4-dimethanol, decane-2,6-dimethanol, norobornanedimethanol, pentacyclopentadecanedimethanol, cyclopentane-1,3-dimethanol, spiroglycol, and the like. The aromatic diol may be 4,4'-dihydroxydiphenylether, 4,4'-ethylidenebisphenol, 4,4'-methylenebis(2,6-dimethylphenol), 2,2-bis(4-hydroxyphenyl)propane (bisphenol A), 2,2-bis(4-hydroxy-3-methylphenyl)propane, 4,4'-dihydroxybenzophenone, 1,1-bis(4-hydroxyphenyl)cyclohexane, 4,4'-dihydroxytetraphenylmethane, 4,4'-(α-methylbenzylidene)bisphenol, and the like.

The Resin (A-2) may be prepared by a known method and may be prepared by reacting dihydric alcohols represented by General Formula (6) with carbonate raw materials.

[General Formula (6)]

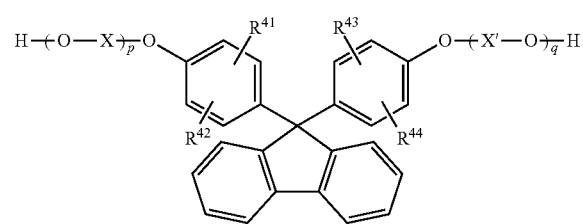

(6)

In General Formula (6), $R^{41}$, $R^{42}$, $R^{43}$, and $R^{44}$, X and X' and p and q are the same as in General Formula (5).

Specific compounds represented by General Formula (6) may be 9,9-bis(4-(2-hydroxy ethoxy)phenyl)fluorene, 9,9-bis-4-hydroxyphenylfluorene, 9,9-bis(4-hydroxy-3-methylphenyl)fluorene, 9,9-bis(4-(2-hydroxyethoxy)-3-methylphenyl) fluorene, 9,9-bis(4-(2-hydroxyethoxy)-3-isopropyl phenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexyl phenyl)fluorene, 9,9-bis(4-(2-hydroxyethoxy)-3-phenyl phenyl)fluorene, 9,9-bis(4-(2-hydroxyethoxy)-3,5-dimethyl phenyl)fluorene, 9,9-bis(4-(2-hydroxy ethoxy)-3-tert-butyl-6-methylphenyl)fluorine, and the like. These may be used alone or in a mixture of two or more.

The carbonate raw material is not particularly limited but may be for example diarylcarbonate such as diphenylcarbonate, ditolylcarbonate, bis(chlorophenyl)carbonate, dinaphthylcarbonate, and the like, dialkylcarbonate such as dimethylcarbonate, diethylcarbonate, and the like, carbonyl halide such as phosgene, bromine phosgene, and the like, haloformate such as dihaloformate of divalent phenol, and the like. The carbonate raw material may be used alone or in a combination of two or more.

The carbonate raw material needs to be appropriately selected according to a polymerization method of polycarbonate. For example, when polycarbonate is manufactured in the ester exchange method, diaryl carbonate and the like are used. The interface polymerization method may include carbonyl halide such as phosgene, bromine phosgene, and the like and so on. Among these methods, the ester exchange method using diphenyl carbonate may be usefully adopted. The ester exchange method using diphenyl carbonate is simple in terms of a cost or process.

A polymerization of dihydric alcohols represented by General Formula (6) with a carbonate raw material is performed by using a polymerization catalyst if necessary. A reaction temperature is not particularly limited, but the ester exchange method may be performed, for example, at greater than or equal to about 130° C. and less than or equal to about 350° C. and specifically, greater than or equal to about 160° C. and less than or equal to about 300° C. The reaction may be performed under an inert gas atmosphere such as a nitrogen gas or an argon gas and under reduced pressure as needed. The polymerization catalyst may be a zinc compound such as zinc oxide, zinc acetate, and the like, a titanium compound such as tetraisopropoxy titanium, tetra-n-butoxy titanium, and the like, a tin compound such as tin oxide, di-n-butyl tin laurate, di-n-butyl tin oxide, dibutyl tin acetate, and the like, a germanium compound such as germanium oxide, and the like.

The obtained Resin (A-2) may be purified by a general purifying method of a reprecipitation method, a dialysis method, an ultrafiltration method, an extraction method, and the like.

The thermoplastic resin may have a number average molecular weight (Mn) of greater than or equal to about 2,000 and less than or equal to about 100,000, for example greater than or equal to about 5,000 and less than or equal to about 80,000. Within the numeral ranges, transmittance (transparency) of the composition is particularly improved and a mechanical strength of an article obtained from the composition is improved. Meanwhile, as used herein, a number average molecular weight (Mn) of the thermoplastic resin is a value measured by a gel permeation chromatography (GPC) described in examples.

The thermoplastic resin may have a weight average molecular weight (Mw) of greater than or equal to about 10,000 and less than or equal to about 500,000, for example greater than or equal to about 15,000 and less than or equal to about 200,000. Within the numeral ranges, transmittance (transparency) of the composition is particularly improved and a mechanical strength of an article obtained from the composition is improved. Meanwhile, as used herein, a number average molecular weight (Mn) of Component (A) is a value measured by a gel permeation chromatography (GPC) described in examples.

The refractive index of the thermoplastic resin may be for example greater than or equal to about 1.5 and less than or equal to about 2.0, greater than or equal to about 1.6 and less than or equal to about 1.8, or greater than 1.6 and less than or equal to about 1.7. Herein, a refractive index of the thermoplastic resin is a value measured according to the method described in examples.

A glass transition temperature (Tg) of the thermoplastic resin may be, for example, in a range of greater than about 100° C. and less than or equal to about 250° C. and, considering handling and heat resistance of the composition, in a range of greater than or equal to about 110° C. and less than or equal to about 180° C. As used herein, the glass transition temperature (Tg) of the thermoplastic resin is a value measured using a differential scanning calorimeter (DSC) described in examples.

In an example embodiment, an amount of the thermoplastic resin may be greater than or equal to about 1 wt % and less than or equal to about 99 wt % based on a total amount of the composition. In another example embodiment, an amount of the thermoplastic resin may be greater than about 20 wt % and less than or equal to about 95 wt % based on a total amount of the composition.

<Solubility Parameter Difference Between Thermoplastic Resin and Organic Surface-Modifying Agent>

An absolute value of a solubility parameter (SP) difference between a thermoplastic resin and an organic surface-modifying agent is less than or equal to about 4. Accordingly, compatibility of the thermoplastic resin and the organic surface-modifying agent is increased, and dispersion of inorganic particulates in the thermoplastic resin is improved. Resultantly, transparency of the resin composition is increased. The smaller a lower limit of the SP difference is, the better, but the SP difference may be 0 but in general greater than or equal to about 0.5. The SP difference may be less than or equal to about 3, specifically, less than or equal to about 2.5, and more specifically, greater than or equal to about 1 and less than or equal to about 2.5.

Herein, the "solubility parameter (SP)" is obtained from an equation based on a Fedors method, expressed by a square root of molecular agglomeration energy, uses a unit of $(MPa)^{1/2}$, and obtained at 25° C. SP described in "Polymer Handbook (4th. edition)", VII/671 to VII/714 by J. Brandrup, E. H and the like may be used. In addition, when data are not provided, SP is calculated from the following equation described in Polymer Engineering and Science (Vol. 14, No. 2, P. 147 to 154, published in 1974).

$$SP=(\Delta Ev/V)^{1/2} \quad (A)$$

In the equation, ΔEv is a molar cohesion energy (the energy of vaporization at a given temperature) and V is a molar volume.

Herein, ΔEv and V are respectively expressed by ΔEv=ΣΔei and V=ΣΔvi, and ei and vi are described in Table 5 of Polymer Engineering and Science (Vol. 14, No. 2, P. 147 to 154, published in 1974).

SP of the organic surface-modifying agent may be in a range of greater than or equal to about 20 and less than or equal to about 35, specifically, greater than or equal to about 24 and less than or equal to about 31, and more specifically, greater than or equal to about 25 and less than or equal to about 28 in terms of dispersibility of inorganic particulates in the thermoplastic resin.

SP of the thermoplastic resin may be in a rage of greater than or equal to about 21 and less than or equal to about 34 and specifically, greater than or equal to about 22 and less than or equal to about 31 in terms of dispersibility of inorganic particulates. SP is mainly determined by a chemical structure, wherein a molecular weight or a kind of a functional group is particularly important. Each kind of a functional group causes a different molecular attraction and thus makes a SP difference.

<Refractive Index of Organic-Inorganic Hybrid Composition>

The organic-inorganic hybrid composition according to some example embodiments has a refractive index of greater than or equal to about 1.60. The organic-inorganic hybrid composition having a refractive index of greater than or equal to about 1.60 may be appropriately used for optical lens. A refractive index of the organic-inorganic hybrid composition is adjusted by a thermoplastic resin, an inorganic particulate, a kind of a surface-modifying agent, and a mixing ratio thereof. Particularly, since a surface-modifying agent in general has a lower refractive index than an inorganic particulate, their contents may be appropriately adjusted by considering a refractive index of a composition. Specifically, the aforementioned mixing ratio of the surface-modifying agent and the inorganic particulate may be used.

A refractive index of a composition is measured by forming a 0.5 mm-thick film and measuring a refractive index of the film at a wavelength of 589 nm with an Abbe refractometer (DR-M4, Atago Co., Ltd.).

<Method of Preparing Composition>

The composition according to an example embodiment may be obtained by mixing the thermoplastic resin, the organic surface-modifying agent, and the inorganic particulate simultaneously, but in terms of an effective modification of the inorganic particulate with the surface-modifying agent, a mixture of the organic surface-modifying agent and the inorganic particulate is prepared and then the mixture and the thermoplastic resin are mixed. During preparation of the composition, a solvent such as chloroform, dichloro methane, diethylether, tetrahydrofuran, ethyl acetate, acetone, acetonitrile, N,N-dimethyl formamide, N-methyl-2-pyrrolidone, and the like may be used.

An amount of each component in the composition is not particularly limited but for example, a mixing weight ratio of the thermoplastic resin relative to a sum of the surface cross-linking agent and the inorganic particulate may be greater than or equal to about 1/99 and less than or equal to about 99/1. In terms of an improved mechanical strength of an article obtained from the composition, mixing weight ratio of the thermoplastic resin relative to the sum of the surface cross-linking agent and the inorganic particulate may be greater than or equal to about 20/80 and less than or equal to about 90/10.

<Optional Component>

The composition according to an example embodiment may include optionally an additive such as an antioxidant, an ultraviolet (UV) absorber, an anti-light stabilizer, a heat stabilizer, a plasticizer, colorant, a blowing agent, a flame retardant, a flame-retardant aid, a release agent, a plasticizer, an impact resistance improving agent, a reinforcing agent, a dispersing agent, an antistatic agent, a forming agent, an antibacterial agent, other resins, an elastomer, and the like.

[Regarding Organic-Inorganic Hybrid Composition Having Formability and Optical Properties]

According to another example embodiment, an organic-inorganic hybrid composition having improved formability and optical properties is provided.

An example embodiment provides an organic-inorganic hybrid composition including the thermoplastic resin (A-3) and the inorganic particle (B-3) and satisfying the following (1) to (3):

(1) Within a melting point ranging from about +10° C. to about +30° C., the organic-inorganic hybrid composition has melt viscosity of greater than or equal to about 10 Pa's and less than or equal to about 1000 Pa's at a shear rate of about 1000 (1/s).

(2) In the range melting point of the thermoplastic resin (A-3) of about +10° C. to about +30° C., when relationship of the melt viscosity and the shear rate of the organic-inorganic hybrid composition is expressed as Equation (I), B obtained through a root approximation is greater than or equal to about −2 and less than about −0.1.

$$Y=AX^B \qquad (I)$$

(X is a shear rate (unit 1/s), Y is a melt viscosity (unit Pa·s), and A is an integer)

(3) Relationship of a number median diameter of the inorganic particle (B-3) and a volume content of the inorganic particle (B-3) of the organic-inorganic hybrid composition satisfies Equation (1).

$$V \leq 0.65 \times (D50)+12.1 \qquad (1)$$

(V is a volume content (unit %) of the inorganic particle (B) of the organic-inorganic hybrid composition and D50 is a number median diameter (unit nm) of the inorganic particle (B))

The organic-inorganic hybrid composition having such a structure according to the present disclosure has improved formability and optical properties.

[Requirement of (1)]

A composition of an example embodiment has melt viscosity of greater than or equal to about 10 Pa's and less than or equal to about 1000 Pa·s at about 1000 (1/s) of a shear rate of the organic-inorganic hybrid composition within a melting point range of the thermoplastic resin (A-3) from about +10° C. to about +30° C. When the melt viscosity is less than about 10 Pa·s, the compositing of the present disclosure may cause a molding defect such as burr/flash and the like. On the other hand, when the melt viscosity is greater than about 1000 Pa·s, molding is impossible. The melt viscosity may be in a range of greater than or equal to about 50 Pa's and less than or equal to about 600 Pa·s.

Meanwhile, in an example embodiment, melt viscosity of the composition at a shear rate 1000 (1/s) may be measured according to the method described in examples.

[Requirement of (2)]

As for a composition of the present disclosure, in the melting point range of the thermoplastic resin (A-3) ranging from about +10° C. to about +30° C., when relationship of the melt viscosity and the shear rate of the organic-inorganic hybrid composition is expressed through as Equation (I), B obtained through a root approximation is greater than or equal to about −2 and less than about −0.1.

When the composition including the thermoplastic resin is molded (particularly, injection-molded), a shear rate within a wide range is applied to the composition, and thus likewise, the composition uniformly moves within the range. Accordingly, the composition requires characteristics that melt viscosity does not almost change within the wide shear rate range. In the composition of an example embodiment, in the melting point range of the thermoplastic resin (A-3) from about +10° C. to about +30° C., when relationship of the melt viscosity and the shear rate of the organic-inorganic hybrid composition is expressed as Equation (I), B obtained as a root approximation is greater than or equal to about −2 and less than about −0.1. Accordingly, even though any shear rate is doubled, the composition of the present disclosure likewise approximately almost uniformly moves, and an article having a thin and fine shape and high precision may be obtained.

When B of Equation (I) is less than about −2, melt viscosity of a composition is extremely high at a low shear rate, the composition may not be molded (particularly, injection molded). On the other hand, when B of Equation (I) is greater than or equal to about −0.1, an effect of an example embodiment may not be obtained. B may be greater than or equal to about −1.5 and less than about −0.1.

B of Equation (I) may be calculated by measuring melt viscosity of the composition of an example embodiment in a method described in Examples, double log-plotting the melt viscosity (a vertical axis) relative to the shear rate (a horizontal axis), and obtaining a root approximation curve.

The (1) and (2) may be controlled by a kind and a molecular weight of the thermoplastic resin (A-3) and a kind of the inorganic particle (B-3), a particle diameter, an addition amount of the inorganic particle (B-3), and the like.

[Requirement of (3)]

The composition of an example embodiment includes the inorganic particle (B-3) having a number median diameter of greater than about 1 nm and less than about 20 nm, and relationship of the number median diameter and a volume content of the inorganic particle (B-3) in the organic-inorganic hybrid composition satisfies Equation 1.

In order to obtain a composition having excellent formability and optical properties, the thermoplastic resin (A-3) should not only satisfy these characteristics, but the inorganic particle (B-3) is also necessarily added thereto. Herein, as a result of examining an addition amount of the inorganic particle (B-3), a particular condition for a particle diameter and a volume content of the inorganic particle (B-3) should be satisfied in order to obtain the effect. Specifically, when relationship of the particle diameter and the volume content of the inorganic particle (B-3) is examined in terms of mechanical strength (reliability) and optical properties and thus satisfies Equation 1, an organic-inorganic hybrid composition having excellent optical properties and formability may be obtained.

A number median diameter (D50) of the inorganic particle (B-3) may be greater than about 1 nm and less than about 20 nm. When D50 is less than or equal to about 1 nm, the inorganic particle may be secondarily agglomerated. On the other hand, when D50 is greater than or equal to about 20 nm, transparency, total light transmittance, or the like of the composition is deteriorated, and thus optical properties are deteriorated. The inorganic particle (B-3) may have a number median diameter (D50) of greater than about 1 nm and less than or equal to about 15 nm and specifically, greater than or equal to about 3 nm and less than or equal to about 10 nm. On the other hand, the number median diameter (D50) of the inorganic particle (B-3) is a number median diameter of primary particles obtained in a dynamic light scattering method and specifically, in a method described in Examples.

In addition, the number median diameter (D50) of the inorganic particle (B-3) may be measured by dissolving the inorganic particle in a dichloro methane solution, diluting the solution with methanol, and using a dynamic optical scattering photometer (for example, DL-8000, Otsuka Electronics Co., Ltd.).

In addition, when the volume content of the inorganic particle (B-3) is out of the range of Equation 1, that is, V>0.65×D50+12.1, the volume content of the inorganic particle (B-3) is so large as to deteriorate mechanical strength of the composition.

On the other hand, a lower limit of the volume content of the inorganic particle (B-3) in the composition of an example embodiment is not particularly limited but greater than or equal to about 0.1 volume %.

The number median diameter and volume content of the inorganic particle (B-3) included in the composition of an example embodiment may be measured in a method described in Examples.

Hereinafter, components of the organic-inorganic hybrid composition according to an example embodiment are described in detail.

[Thermoplastic Resin (A-3)]

The thermoplastic resin (A-3) is not particularly limited but may be for example α-olefin polymer such as low density polyethylene, linear low density polyethylene, high density polyethylene, homopolypropylene, random copolymer polypropylene, block copolymer polypropylene, isotactic polypropylene, syndiotactic polypropylene, hemiisotactic polypropylene, poly butene, stereoblock polypropylene, poly-3-methyl-1-butene, poly-3-methyl-1-pentene, poly-4-methyl-1-pentene, and the like, an α-olefin copolymer such as a block or random copolymer of ethylene-propylene, impact copolymer polypropylene, an ethylene-methyl methacrylate copolymer, an ethylene-methyl acrylate copolymer, an ethylene-ethylacrylate copolymer, an ethylene-butyl acrylate copolymer, an ethylene-vinyl acetate copolymer and the like, a polyolefin resin such as polyolefin thermoplastic elastomer; a polystyrene resin such as polystyrene, impact resistant polystyrene (HIPS), an acrylonitrile-styrene (AS) resin, an acrylonitrile-butadiene-styrene (ABS) resin, a metacrylic acid methyl-butadiene-styrene (MBS) resin, a heat resistant ABS resin, an acrylonitrile-acrylate-styrene (AAS) resin, a styrene-maleic anhydride (SMA) resin, a methacrylate-styrene (MS) resin, a styrene-isoprene-styrene (SIS) resin, an acrylonitrile-ethylene propylene rubber-styrene (AES) resin, a styrene-butadiene-butylene-styrene (SBBS) resin, a methyl methacrylate-acrylonitrile-butadiene-styrene (MABS) resin, and hydrogen-addition resin such as a styrene-ethylene-butylene-styrene (SEBS) resin where hydrogen is added to the double bond of a butadiene moiety or an isoprene moiety, a styrene-ethylene-propylene-styrene (SEPS) resin, a styrene-ethylene-propylene (SEP) resin, a styrene-ethylene-ethylene-propylene-styrene (SEEPS) resin, and the like; a halogen-containing resin such as poly vinyl chloride, poly vinylidene chloride, chlorinated polyethylene, chlorinated polypropylene, poly vinylidene fluoride, rubber chloride, a vinyl chloride-vinyl acetate copolymer, a vinyl chloride-ethylene copolymer, a vinyl chloride-chloride vinylidene copolymer, a vinyl chloride-chloride vinylidene-vinyl acetate terpolymer, a vinyl chloride-acrylic acid ester copolymer, a vinyl chloride-maleic acid ester copolymer, a vinyl chloride-cyclohexyl maleimide copolymer; a petroleum resin, a coumarone resin, poly vinyl acetate, an acrylic resin, polymethyl methacrylate, polyvinylalcohol, polyvinyl formal, polyvinyl butyral; a polyalkyleneterephthalate resin such as polyethylene terephthalate, polybutylene terephthalate, polycyclohexanedimethylene terephthalate and the like, an aromatic polyester resin such as a polyalkylene naphthalate resin such as polyethylene naphthalate, polybutylene naphthalate, and the like, a linear polyester resin such as polytetramethylene terephthalate, and the like, a polyester resin such as polyhydroxy butyrate, polycaprolactone, polybutylene succinate, polyethylene succinate, poly lactic acid, poly malic acid, poly glycolic acid, poly dioxane, poly (2-oxetanone), and the like; a polyamide resin such as polyphenylene oxide, poly caprolactam and polyhexamethylene adipamide and the like, a polycarbonate resin, a polycarbonate/ABS resin, a polyacetal resin, a polyphenylene sulfide resin, a polyurethane resin, a cellulose resin, a polyimide resin, a poly sulfone resin, a polyphenylene ether resin, a polyether ketone resin, a polyetheretherketone resin, a cycloolefin polymer, a liquid crystal polymer, and the like. These thermoplastic resins may be used alone or in a mixture of two or more.

In some example embodiments, among the thermoplastic resins, in terms of improved optical properties, at least one selected from the polycarbonate resin, polyolefin resin, the acrylic resin, the polyester resin, and the cycloolefin polymer may be desirable.

In addition, in terms of easily obtaining a composition satisfying the requirements 1 to 3, within a melting point range of the thermoplastic resin (A-3) from about +10° C. to about +30° C., when relationship of melt viscosity and shear rate and of the thermoplastic resin (A-3) is expressed as Equation (II), b obtained as a root approximation is greater than or equal to about −1 and less than about 0.

$$y=ax^b \tag{II}$$

(x is a shear rate (unit 1/s), y is a melt viscosity (unit Pa·s), and a is an integer)

The thermoplastic resin (A-3) may be may be commercial products and synthesized products synthesized by a conventional known method. Examples of the commercial products may be, for example, Panlite (registered trademark) series made by Teijin Ltd., Apel (registered trademark) series made by Mitsui Chemicals, Inc., and the like.

[Inorganic Particle (B-3)]

The inorganic particle (B-3) is not particularly limited but may be a metal oxide, a metal sulfide, a metal selenide, a metal telluride, and the like. In some example embodiments, in terms of easily obtaining effects of the example embodiment, the metal oxide is desirable and may be a metal oxide including at least one element selected from Si, Al, Ti, Zn, Sn, Zr, Y, Ce, Ba, Sr, C, B, La, Gd, Nb, Mg, Ca, and Ta.

Specific examples of the inorganic particle may be for example, zirconium oxide, yttrium oxide-addition zirconium oxide, lead zircornate, strontium titanate, tin titanate, tin oxide, bismuth oxide, niobium oxide, tantalum oxide, potassium tantalate, tungsten oxide, cerium oxide, lanthanum oxide, gallium oxide, silica, alumina, titanium oxide, zirconium oxide, barium titanate, and the like. The inorganic particulate may be used alone or in a combination of two or more.

In some example embodiments, when the organic-inorganic hybrid composition is used for an optical use, an inorganic particle having a high refractive index is desirable and an inorganic particle having a refractive index of greater than or equal to about 1.8 may be desirably used. Specifically, in some example embodiments, the inorganic particle may be desirably titanium oxide, barium titanate (refractive index=about 2.4), zirconium oxide (refractive index=about 2.1), or cerium oxide (refractive index=about 2.2). In some example embodiments, even though the titanium oxide mainly has two kinds of crystal structures of a rutile-type (refractive index=about 2.7) and an anatase-type (refractive index=about 2.5), the rutile-type titanium oxide may be desirable since the anatase-type titanium oxide has a high photocatalyst activity and is not desirable for an optical use. In addition, in order to reduce the photocatalyst activity of the titanium oxide, a titanium oxide particle coated with silica on the surface may be used.

As described above, in an example embodiment, a volume content of the inorganic particulate is determined by Equation (1) expressing relationship of a number median diameter (D50) and the volume content of the inorganic particulate in an organic-inorganic hybrid composition. An organic-inorganic hybrid composition including the volume content of the inorganic particles easily satisfies the requirements (1) to (2) and thus may have excellent formability and optical properties. In other words, an example embodiment provides an organic-inorganic hybrid composition including the thermoplastic resin (A-3) and the inorganic particulate (B-3), and the inorganic particulate (B-3) has a number median diameter of greater than about 1 nm and less than about 20 nm, and relationship of the number median diameter and the volume content of the inorganic particulate (B-3) in the organic-inorganic hybrid composition satisfies Equation (1).

$$V \leq 0.65 \times (D50) + 12.1 \tag{1}$$

(V is a volume content (unit, %) of the inorganic particle (B-3) of the organic-inorganic hybrid composition and D50 is a number median diameter (unit, nm) of the inorganic particle (B-3))

In addition, a composition of an example embodiment including the volume content of the inorganic particulate (B-3) may be less contracted during molding, and in addition, peeling property of the composition from a mold is improved.

In some example embodiments, an inorganic particle having a high refractive index is desirable and an inorganic particle having a refractive index of greater than or equal to about 1.8, greater than or equal to about 1.9, or greater than or equal to about 2.0 may be desirably used. By using such an inorganic particle, a resin composition having a high refractive index may be obtained. In some example embodiments, the higher the refractive index of the inorganic particle is, the better, but it may be generally less than or equal to about 3.0. The desirable range of the refractive index of the inorganic particulate may be greater than or equal to about 1.8 and less than or equal to about 3.0, for example greater than or equal to about 1.9 and less than or equal to about 3.0, considering a balance with Abbe number. The refractive index of the inorganic particulate may be for example calculated by measuring a refractive index difference of inorganic particulate dispersions having a different concentration from each other.

In addition, an Abbe number of inorganic particulate may be greater than or equal to about 20 in terms of improving optical properties. An upper limit of the Abbe number of inorganic particulate is not particularly limited but may be less than or equal to about 80.

Meanwhile, Abbe number of the inorganic particle may be measured according to the method described in examples.

The inorganic particle may be prepared using known methods.

In addition, the inorganic particle may be commercial products which may be solvent dispersion. These commercial products may be SZR-W, SZR-CW, SZR-M, SZR-K (zirconium oxide dispersion, Sakai Chemical Industry Co., Ltd.); Thai Nok (registered trademark) RA-6, NRA-10M (titanium oxide dispersion, Taki Chemical Co., Ltd.), and the like.

The composition according to an example embodiment may include optionally an additive such as an antioxidant, an ultraviolet (UV) absorber, an anti-light stabilizer, a heat stabilizer, a plasticizer, colorant, a blowing agent, a flame retardant, a flame-retardant aid, a release agent, a plasticizer, an impact resistance improving agent, a reinforcing agent, a dispersing agent, an antistatic agent, a forming agent, an antibacterial agent, other resins, an elastomer, and the like. The composition according to an example embodiment may include optionally an additive such as an antioxidant, an ultraviolet (UV) absorber, an anti-light stabilizer, a heat stabilizer, a plasticizer, colorant, a blowing agent, a flame retardant, a flame-retardant aid, a release agent, a plasticizer, an impact resistance improving agent, a reinforcing agent, a dispersing agent, an antistatic agent, a forming agent, an antibacterial agent, other resins, an elastomer, and the like.

[Method of Manufacturing Organic-Inorganic Hybrid Composition]

The method of preparing the composition of an example embodiment is not particularly limited but may include a method of melting and kneading the thermoplastic resin, the inorganic particulate, and if necessary an additive.

An apparatus used for the melting and kneading may include a close and seal-type roll mixing-milling apparatus such as a labo plastomill, a brabender, a banbury mixer, a kneader, a roll, and the like or a disposition-type roll mixing-milling apparatus. In addition, a continuous melting-kneading apparatus such as a monoaxial extruder, a biaxial extruder, and the like may be used.

The thermoplastic resin and the inorganic particulate may be simultaneously added or divisively added step by step and then, kneaded. Herein, as for the melting-kneading apparatus such as an extruder and the like, components added step by step may be added from a middle of a cylinder. In addition, after kneading the thermoplastic resin in advance, the other components (for example, the inorganic particulate, the additive, the like) except for the thermoplastic resin are added thereto and additionally melt and kneaded. Herein, these components may be simultaneously added or divisively added step by step and then, kneaded. The divisive addition may adopt a method of dividing one component into several portions and adding them several times, a method of simultaneously adding one component and then, adding other components step by step, or a combination thereof.

The inorganic particulate may be added as powder or in an agglomeration state. Otherwise, the inorganic particulate may be added in a dispersion state in a liquid. When the inorganic particulate is added in a dispersion state, an agglomerated particle is dispersed to a primary particle in advance and then, added. In addition, after the kneading, degasing may be performed.

As described above, the organic-inorganic hybrid composition according to an example embodiment may have a high refractive index. Specifically, the organic-inorganic hybrid composition of am example embodiment may have a refractive index of greater than or equal to about 1.60 and less than or equal to about 2.00. The refractive index may be measured according to the method described in examples.

When the organic-inorganic hybrid composition of an example embodiment is injection-molded to obtain an article, a resin temperature may be, for example, greater than or equal to about 200° C. and less than or equal to about 300° C., a molding temperature may be greater than or equal to about 50° C. and less than or equal to about 150° C., and an extrusion speed (a screw speed) may be greater than or equal to about 10 mm/sec and less than or equal to about 100 mm/sec.

The method of obtaining the article may provide a three dimensional article, a sheet, a container pipe, and the like, and particularly, a fine article having a thin region (for example, resin lens) may be efficiently obtained by making the most use of excellent fluidity. The injection molding may including pelleting the composition through extrusion molding in the former step. The pelleting may use, for example, a monoaxial extruder having a unimelt-type screw, a biaxial extruder, a triaxial extruder, a kneader-type roll mixing mill, and the like.

The pellet is sufficiently dried and then, may be for example used for the injection molding to obtain an article (particularly, an optical component) having a desired shape.

The organic-inorganic hybrid composition obtained in this way according to an example embodiment may have particularly optical properties. A 0.5 mm-thick article using the organic-inorganic hybrid composition of an example embodiment may have a haze of less than about 3, for example less than or equal to about 2. A 0.5 mm-thick article using the organic-inorganic hybrid composition of the present embodiment may have a yellow index (YI) of less than or equal to about 5, for example less than or equal to about 3. In addition, a 0.5 mm-thick article using the organic-inorganic hybrid composition of an example embodiment may have a total light transmittance of greater than or equal to about 70%, for example greater than or equal to about 80% or greater than or equal to about 90%.

Meanwhile, a 0.5 mm-thick article may be manufactured by a method described in examples and a haze value, a yellow index (YI), and total light transmittance of the obtained article may be measured according to the method described in examples.

<Article and Optical Component>

An example embodiment provides an article including the organic-inorganic hybrid composition. Another example embodiment of the present disclosure relates to an optical component including the organic-inorganic hybrid composition. A shape of the article is not particularly limited but any type, for example, lens-type (spherical lens, nonspherical lens, fresnel lens, and the like), film-type, sheet-type, plate-type, bar-type, fiber-type, prism-type, and the like. The article may be manufactured, for example, in a well-known method such as an injection molding method, a compression molding method, an extrusion method, a transfer method, a blow method, a pressure method, a coating method (a spin coating method, a roll coating method, a curtain coating method, a dip coating method, a casting method, and the like) and the like, but the composition of an example embodiment is particularly appropriate for the injection molding. Before forming the article, a kneader such as a Henschel mixer, a kneader, a banbury mixer, an extruder, and the like may be used to mix raw materials. When the injection molding is adopted, a cylinder temperature may be, for example, greater than or equal to about 150° C. and less than or equal to about 300° C. and a molding temperature of greater than or equal to about 50° C. and less than or equal to about 100° C.

The optical component may be appropriately used as an optical component transmitting light (a passive optical component) in a display (for example, a display for a smart phone, a liquid crystal display, a plasma display, and the like), an imaging system (for example, a camera, a video, and the like), an optical pickup, a projector, an optical fiber communication equipment (for example, an optical amplifier and the like), a head lamp for a vehicle, and the like. These optical components may include, for example, lens, a film, an optical waveguide, a prism, a prism sheet, a panel, an optical disk, a sealant of LED, and the like. These optical components may have, if necessary, various functional layers such as an anti-reflection layer, a light absorption layer, a hard coating layer, an antiglare layer, and the like.

EXAMPLES

Hereinafter, the present disclosure is illustrated in detail by using Examples but is not limited thereto. On the other hand, "part by unit" indicates "part by weight" unless it is particularly specified.

<Evaluation Method>

(number average molecular weight (Mn), weight average molecular weight (Mw))

A measurement sample is prepared by dissolving a polymer in tetrahydrofuran (THF) to have a concentration of 0.1 wt % and filtering the solution with a polytetrafluoro ethylene membrane filter having a diameter of 0.2 μm. A number average molecular weight and a weight average molecular weight of the sample are measured through gel permeation chromatography (GPC) of tetrahydrofuran as a moving phase with a differential refractometer as a detector. Monodisperse polystyrene is used as a standard material of a molecular weight.

(Glass Transition Temperature (Tg))

A glass transition temperature (Tg) of the sample is measured with a differential scanning calorimeter (DSC) by increasing a temperature up to about 300° C. at a temperature increase rate of about 10° C./min, maintaining the sample there for about 10 minutes, cooling it down to about 25° C. at a temperature decrease rate of about 10° C./min, maintaining there for about 10 minutes, and then, increasing the temperature up to about 300° C. at a temperature increase rate of about 10° C./min. After the measurement is complete, the sample is cooled to room temperature (about 25° C.) at about 10° C./min.

(Measurement of Refractive Index and Abbe Number)

A refractive index and an Abbe number of the composition are measured in the following method. DMF is added to the composition to prepare sol having a solid concentration of about 10 wt %, and the sol is cast on a polyimide film. Then, the cast membrane is dried to obtain a film (a thickness of about 200 μm±about 10 μm). A refractive index of the obtained transparent film at a wavelength of about 473 nm, about 594 nm, and about 657 nm is measured with a prism coupler (Model 2010, Metricon Corp.). The measurements are used to calculate a refractive index at a C ray (about 656.3 nm), a D ray (about 587.6 nm), and an F ray (about 486.1 nm). The refractive index at these three wavelengths is used to calculate the Abbe number (vd). A refractive index and an Abbe number of a resin are measured and calculated based on those of the composition.

Synthesis of Each Component

Synthesis Example 1: Preparation of Zirconium Oxide Particulate (Dn50=3 nm)/Benzoic Acid (Surface-Treatment Agent)/DMF Dispersion 100.00 parts by weight of a zirconium oxide/methanol/ acetic acid dispersion (a number median diameter of a primary particle (Dn50): 3 nm, a refractive index of zirconium oxide: 2.1, a solid content (zirconium oxide): 30 wt %, SZR-M, Sakai Chemical Industry Co., Ltd.) and 6.00 parts by weight of benzoic acid (hereinafter, referred to be "BA") as a particle dispersing agent (a surface-treatment agent) are put in a separable flask equipped with an agitator and a thermometer and then, stirred at 35° C. for 5 hours. Subsequently, the dispersion is concentrated in an evaporator, and methanol and acetic acid are distilled and removed to obtain white powder. In addition, the obtained powder is washed with hexane and filtered to remove surplus acetic acid and BA and obtain white powder. The obtained powder is dispersed in N,N-dimethyl formamide (DMF) to prepare a DMF dispersion having 30 wt % of a sum (solid content) of zirconium oxide particulates/benzoic acid.

Synthesis Example 2: Synthesis of Triazine Ring-Containing Polymer [1]

2.00 g (8.46 mmol) of 2-anilino-1,3,5-triazine-4,6-dithiol (Zisnet AF, Sankyo Kasei Co., Ltd.) is put in a 100 mL flask, 14 mL of pure water is added thereto, 1.69 mL of a 10 M NaOH aqueous solution is added thereto, and the mixture is heated at 70° C. On the other hand, 2.23 g (8.46 mmol) of dibromop-xylene is dissolved in 15 mL of nitrobenzene, and the obtained solution is added to the aqueous solution. 123 mg of bromidehexadecyltrimethyl ammonium is added thereto, and the mixture is fervently stirred at 70° C. for 24 hours. The reaction solution is added to methanol in a dropwise fashion and reprecipitated to obtain a white triazine ring-containing polymer [1]. The obtained triazine ring-containing polymer [1] has a number average molecular weight: 60000, a weight average molecular weight: 125000, Tg: 125° C., a refractive index (nd, 587.6 nm): 1.729, and an Abbe number (vd): 22.0.

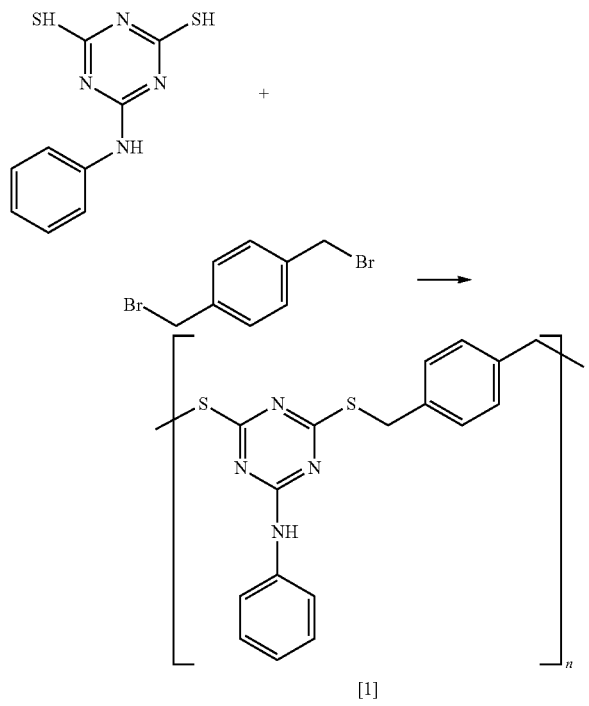

[1]

Example 1

1.0 parts by weight of the triazine ring-containing polymer [1] according to Synthesis Example 2 is dissolved in 9.0 parts by weight of DMF, 3.0 parts by weight of the DMF dispersion having 30 wt % of a sum (a solid content) of zirconium oxide particulate/benzoic acid according to Synthesis Example 1 is added thereto, and the mixture is stirred at room temperature for 1 hour to obtain an organic-inorganic hybrid composition in a sol state. A film obtained by casting the sol and drying it has a refractive index (nd) of 1.750 and an Abbe number (vd) of 26.5.

Synthesis Example 3: Preparation of Zirconium Oxide Particulate (Dn50=8 nm)/Benzoic Acid (Surface-Treatment Agent)/DMF Dispersion A DMF dispersion including a zirconium oxide particulate and benzoic acid is prepared according to the same method as Synthesis Example 1 except for changing a particle diameter (a number median diameter) of a zirconium oxide/methanol/acetic acid dispersion from 3 nm into 8 nm (a refractive index of zirconium oxide: 2.1, a solid content (zirconium oxide) of 30 wt %, SZR-GM, Sakai Chemical Industry Co., Ltd.).

Example 2

An organic-inorganic hybrid composition in a sol state is obtained by dissolving 1.0 part by weight of the triazine ring-containing polymer [1] according to Synthesis Example 2 in 9.0 parts by weight of DMF, adding 3.0 parts by weight of the DMF dispersion having 30 wt % of a sum (a solid content) of zirconium oxide particulate/benzoic acid according to Synthesis Example 3, and stirring the mixture at room temperature for 1 hour. A film obtained by casting the sol and drying it has a refractive index (nd) of 1.756 and an Abbe number (vd) of 26.8.

Synthesis Example 4: Preparation of Zirconium Oxide Particulate (Dn50=3 nm)/3-Thiophene Carbonic Acid (Surface-Treatment Agent)/DMF Dispersion A DMF dispersion including zirconium oxide particulates and 3-thiophene carbonic acid is prepared according to the same method as Synthesis Example 1 by using 3-thiophene carbonic acid instead of the benzoic acid as a surface-treatment agent.

Example 3

An organic-inorganic hybrid composition in a sol state is obtained by dissolving 1.0 part by weight of the triazine ring-containing polymer [1] according to Synthesis Example 2 in 9.0 parts by weight of DMF, adding 3.0 parts by weight of the DMF dispersion having 30 wt % of a sum (a solid content) of zirconium oxide particulate/3-thiophene carbonic acid according to Synthesis Example 4, and stirring the mixture at room temperature for 1 hour. A film obtained by drying a cast film of the sol has a refractive index (nd) of 1.753 and Abbe number (vd) of 25.2.

Synthesis Example 5: Preparation of Zirconium Oxide Particulate (Dn50=3 nm)/Phenylphosphonic Acid (Surface-Treatment Agent)/DMF Dispersion A DMF dispersion including zirconium oxide particulates and phenylphosphonic acid is prepared according to the same method as Synthesis Example 1 except for using phenylphosphonic acid instead of the benzoic acid as a surface-treatment agent.

Example 4

An organic-inorganic hybrid composition in a sol state is obtained by dissolving 1.0 part by weight of the triazine ring-containing polymer [1] according to Synthesis Example 2 in 9.0 parts by weight of DMF, adding 3.0 parts by weight of the DMF dispersion having 30 wt % of a sum (a solid content) of zirconium oxide particulate/phenylphosphonic acid according to Synthesis Example 5, and stirring the mixture at room temperature for 1 hour. A film obtained by casting the sol and drying it has a refractive index (nd) of 1.751 and an Abbe number (vd) of 24.8.

Synthesis Example 6: Synthesis of Triazine Ring-Containing Polymer [2]

1.80 g (7.61 mmol) of 2-anilino-1,3,5-triazine-4,6-dithiol (Zisnet AF, Sankyo Kasei Co., Ltd.) and 0.24 g (0.846 mmol) of 2-(p-carboxyl anilino)-1,3,5-triazine-4,6-dithiol are put in a 100 mL flask, 14 mL of pure water is added thereto, 1.78 mL of a 10 M NaOH aqueous solution is added thereto, and the mixture is heated at 70° C. On the other hand, 2.23 g (8.46 mmol) of dibromom-xylene is dissolved in 15 mL of nitrobenzene, and the obtained solution is added to the aqueous solution. 23 mg of bromide hexadecyltrimethyl ammonium is added thereto, and the obtained mixture is fervently stirred at room temperature for 24 hours. The reaction solution is added to methanol in a dropwise fashion and reprecipitated to obtain a white triazine ring-containing polymer [2]. The obtained triazine ring-containing polymer [2] has a number average molecular weight: 20000, a weight average molecular weight: 50000, Tg: 122° C., a refractive index (nd, 587.6 nm): 1.730, and an Abbe number: 22.0.

Synthesis Example 7

1.0 g (4.23 mmol) of 4,4'-thiobis benzene thiol (DongKyeung Co., Ltd.) and 1.14 g (4.23 mmol) of dibromopxylene are dissolved in 5 mL of NMP in a 50 mL flask. 584 mg (4.23 mmol) of potassium carbonate is added thereto, and the obtained mixture is fervently stirred at 100° C. for 24 hours. The reaction solution is added to water in a dropwise fashion and reprecipitated to obtain a white polymer [3]. The obtained polymer [3] has a number average molecular weight: 5000, a weight average molecular weight: 12000, Tg: 150° C., a refractive index (nd, 587.6 nm): 1.705, and an Abbe number: 17.5.

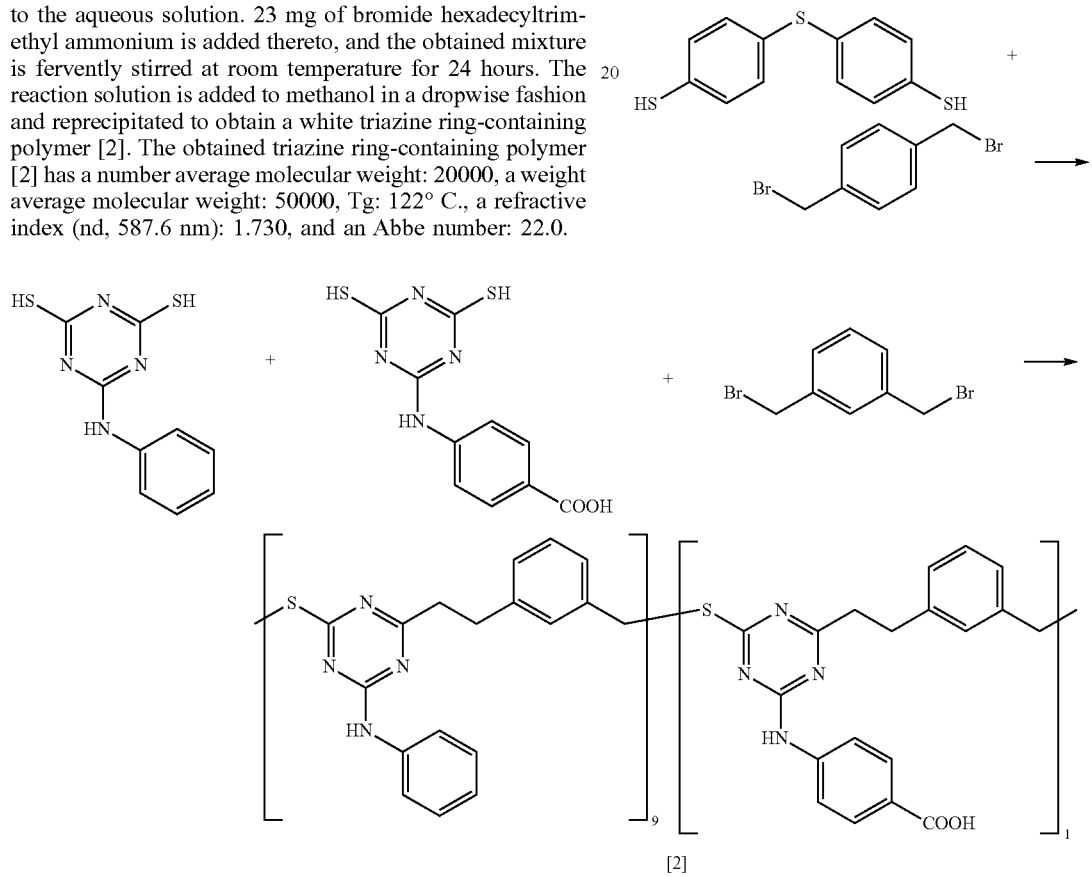

Example 5

An organic-inorganic hybrid composition in a sol state is obtained by dissolving 1.0 part by weight of the triazine ring-containing polymer [2] according to Synthesis Example 6 in 9.0 parts by weight of NMP, adding 3.0 parts by weight of the DMF dispersion having 30 wt % of a sum (a solid content) of zirconium oxide particulate/phenylphosphine according to Synthesis Example 4, and stirring the mixture at room temperature for 1 hour. A film obtained by casting the sol and drying it has a refractive index (nd) of 1.750 and an Abbe number (vd) of 24.9.

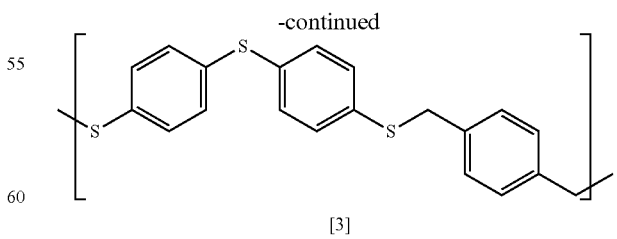

Comparative Example 1

An organic-inorganic hybrid composition as sol is obtained by dissolving 1.0 part by weight of the polymer [3]

according to Synthesis Example 7 to 9.0 parts by weight of DMF, adding 3.0 parts by weight of the DMF dispersion having 30 wt % of a sum (a solid content) of zirconium oxide particulate/phenylphosphine according to Synthesis Example 5, and stirring the mixture at room temperature for 1 hour. A film is obtained by casting the sol on a polyimide film but becomes opaque (murky) while a solvent therein is volatilized.

sodium D ray (nD, a wavelength: 589 nm) with "DM-M4" made by Atago Co., Ltd. A refractive index of a resin is also measured based on that of the composition.

(Measurement of Transmittance)

Transmittance (at a wavelength: 380 to 780 nm) is measured by using the film as that used to manufacture the refractive index with a haze meter, NDH 5000W made by Suga Test Instrument Co., Ltd.

TABLE 1

| | Triazine ring-containing polymer (A) | | | | Inorganic participate (B) | | Surface-treatment agent | Organic-inorganic hybrid composition | |
|---|---|---|---|---|---|---|---|---|---|
| | Polymer | Tg (° C.) | Refractive index nd | Abbe Number vd | Kinds | Dn50 (nm) | (C) Kinds | Refractive index nd | Abbe Number vd |
| Example 1 | 1 | 125 | 1.729 | 22.0 | ZrO$_2$ | 3 | benzoic acid | 1.750 | 26.5 |
| Example 2 | 1 | 125 | 1.729 | 22.0 | ZrO$_2$ | 8 | benzoic acid | 1.756 | 26.8 |
| Example 3 | 1 | 125 | 1.729 | 22.0 | ZrO$_2$ | 3 | 3-thiophenecarbonic acid | 1.753 | 25.2 |
| Example 4 | 1 | 125 | 1.729 | 22.0 | ZrO$_2$ | 3 | phenylphosphonic acid | 1.751 | 24.8 |
| Example 5 | 2 | 122 | 1.730 | 22.0 | ZrO$_2$ | 3 | phenylphosphonic acid | 1.750 | 24.9 |
| Comparative Example 1 | 3 | 150 | 1.705 | 17.5 | ZrO$_2$ | 3 | phenylphosphonic acid | film becomes opaque | |

As aforementioned, an organic-inorganic hybrid composition according to an example embodiment has a high refractive index and excellent formability and is particularly appropriate for lens for a smart phone and the like.

[Example of Organic-Inorganic Hybrid Composition Having Heat Resistance]

Hereinafter, an example embodiment of an organic-inorganic hybrid composition having a high heat resistance is illustrated by using Examples and Comparative Examples.

<Evaluation Method>

(number average molecular weight (Mn), weight average molecular weight (Mw))

A thermoplastic resin is dissolved in tetrahydrofuran (THF) to have a concentration of 0.1 wt %, and the solution is filtered with a polytetrafluoro ethylene membrane filter having a diameter of 0.2 μm to obtain a measurement sample. A number average molecular weight and a weight average molecular weight of the sample are measured though gel permeation chromatography (GPC) by using tetrahydrofuran as a mobile phase with a differential refractometer as a detector. Mondisperse polystyrene is used as a standard material of a molecular weight.

(Glass Transition Temperature (Tg))

A glass transition temperature of the sample is measured with a differential scanning calorimeter (DSC) by increasing a temperature up to 300° C. at a temperature increase rate of 10° C./min, maintaining the sample there for 10 minutes, cooling it down to 25° C. at a temperature decrease rate of 10° C./min, and maintaining it there for 10 minutes, and then increasing the temperature up to 300° C. at a temperature increase rate of 10° C./min. After the measurement is complete, the sample is cooled to room temperature (25° C.) at 10° C./min.

(Measurement of Refractive Index)

A refractive index of a composition is measured in the following method. Dichloro methane is added to the composition to prepare sol having a solid concentration of 10 wt %, and the sol is cast on a polyimide film. Then, the cast film is dried to obtain a film (a thickness of 200 μm±10 μm). The obtained film is used to measure a refractive index of a (Measurement of YI)

YI (ASTM E313-73/ASTM D1925) is measured by using the same film as used to measure the refractive index and a spectrum colorimeter, CM-3610A made by Konica Minolta, Inc. (at a wavelength: 360 nm to 740 nm).

(Checkerboard Scale Peeling Test)

Sol is prepared by adding dichloro methane to the composition to have a solid concentration of 5 wt % and spin-coated (1,000 rpm×30 seconds) on a SUS substrate. Subsequently, the film is dried on a hot plate at 35° C. for 5 minutes and also, at 50° C. for 10 minutes, and then, the dried film is put with the substrate in an oven and heated at 150° C. for 3 hours. Then, a checkerboard scale peeling test is performed according to JIS K5600-5-6: 1999 at 23° C. under relative humidity (RH) of 50%. The film is crosscut into 100 masses of 10 mass×10 mass by every 1 mm, and a condition/shape of the film remaining after peeling off a cellophane tape is examined with naked eyes and evaluated as follows. On the other hand, the peeled tape is made by Nichiban Co., Ltd.:

A: the number of remaining mass is in a range of less than or equal to 10

B: the number of remaining mass is in a range of greater than or equal to 11 to less than or equal to 25

C: the number of remaining mass is in a range of greater than or equal to 26 to less than or equal to 50

D: the number of remaining mass is in a range of greater than or equal to 51

When the number of remaining mass is less than or equal to 25 (i.e., A or B), the film may be practically used for injection molding without any problem, but considering productivity of a product, washing a mold, and the like, the number of remaining mass may be less than or equal to 10 (A).

(Heat Resistance Test)

A YI variation ratio is calculated according to Calculation Equation 1 by putting the sample after measuring YI (initial YI) in the above method in an oven at 250° C., heating it for 15 minutes, and measuring YI (YI after heating).

YI variation ratio=(YI after heading/initial YI)×100 (%)                                     Calculation Equation 1:

The heat resistance is evaluated as follows:

A: A YI variation ratio is less than 50%

B: A YI variation ratio is greater than or equal to 50% and less than 100%

C: A YI variation ratio is greater than or equal to 100%

D: YI after heating is not obtained due to deterioration of a film.

Since the composition requires high heat resistance in order to be applied to lens for a camera of a smart phone and the like, a YI variation ratio after heating may be less than 50% (i.e., A).

(Strength Test)

Dichloro methane is to the composition to prepare sol having a solid concentration of 10 wt %, and the sol is dried at 80° C. for 5 hours and also, at 50° C. for 8 hours and then, ground with a jet mill to obtain powder of the composition. 2.5 g of the powder is compression-molded (a pressure: 10 MAaPa) into a size of 30 mm (length), 30 mm (width), and 1.5 mm (thickness). The compression-molded sample is disposed on a SUS substrate, and an iron ball having a diameter of 10 mm is dropped from 200 mm high. The sample is examined with naked eyes and evaluated as follows:

A: no scratch

B: some scratches on the surface but no crack (split)

C: crack (split)

A film having a scratch (B) on the surface may be used for injection molding with no problem, but a film having no scratch (A) may be better if the film is possibly scratched by an extruding pin during the injection molding.

are distilled and removed therefrom to obtain white powder. In addition, the powder is washed with hexane and filtered to remove surplus acetic acid and TA and thus obtain white powder. The obtained powder is dispersed in dichloro methane to prepare a dichloro methane dispersion having 10 wt % of a sum (a solid content) of zirconium oxide particulate/3-thiophene carbonic acid.

Synthesis Example B2: Preparation of Zirconium Oxide Particulate/Benzoic Acid (Surface-Treatment Agent)/Dichloro Methane Dispersion A dichloro methane dispersion including zirconium oxide particulates and benzoic acid is prepared according to the same method as Synthesis Example B1 except for using benzoic acid instead of the 3-thiophene carbonic acid as a surface-treatment agent.

Synthesis Example B3: Preparation of Zirconium Oxide Particulate/Phenylethanethiol (Surface-Treatment Agent)/Dichloro Methane Dispersion A dichloro methane dispersion including zirconium oxide particulates and phenylethanethiol is prepared according to the same method as Synthesis Example B1 except for using phenylethanethiol instead of the 3-thiophene carbonic acid as a surface-treatment agent.

Synthesis Example B4: Preparation of Zirconium Oxide Particulate/Dichloro Methane Dispersion A zirconium oxide/methanol/acetic acid dispersion (a refractive index of zirconium oxide: 2.1, a solid content: 20 wt %, SZR-M, Sakai Chemical Industry Co., Ltd.) is concentrated in an evaporator, washed with hexane, and filtered to obtain white powder (zirconium oxide powder). The powder is dispersed in dichloro methane to prepare a dichloro methane dispersion having 10 wt % of zirconium oxide particulates.

TABLE 2

| | | Synthesis Example B1 | Synthesis Example B2 | Synthesis Example B3 | Synthesis Example B4 |
|---|---|---|---|---|---|
| Component (B-1) | zirconium oxide | 20 parts by weight | 20 parts y weight | 20 parts by weight | 20 parts by weight |
| Component (C-1) | 2-thiophene carbonic acid | 4 parts by weight | | | |
| | benzoic acid | | 4 parts by weight | | |
| | phenylethanethiol | | | 4 parts by weight | |

Synthesis of Each Component

Synthesis Example B1: Preparation of Zirconium Oxide Particulate/3-Thiophene Carbonic Acid (Surface-Treatment Agent)/Dichloro Methane Dispersion 100.00 parts by weight of a zirconium oxide/methanol/acetic acid dispersion (a number median diameter of primary particles: 3 nm, a refractive index of zirconium oxide: 2.1, a solid content (zirconium oxide): 20 wt %, SZR-M, Sakai Chemical Industry Co., Ltd.) and 4.00 parts by weight of 3-thiophene carbonic acid (hereinafter, referred to be "TA") as a surface-treatment agent are put in a separable flask equipped with an agitator and a thermometer and then, stirred at 35° C. for 5 hours. Subsequently, the dispersion is concentrated in an evaporator, and methanol and acetic acid Synthesis Example B5: Synthesis of Carboxyl Group-Containing Polycarbonate 21.17 parts by weight (0.048 mol) of 9,9-bis(4-(2-hydroxy ethoxy)phenyl)fluorene (hereinafter, referred to be "BPEF"), 7.25 parts by weight (0.021 mol) of 9,9-bis-4-hydroxyphenylfluorene (hereinafter, referred to be "BPF"), 14.49 parts by weight (0.068 mol) of diphenyl carbonate, and $4.3 \times 10^{-3}$ parts by weight of zinc oxide (a particle diameter: greater than or equal to 1 μm, Wako Pure Chemical Industries, Ltd.) as a catalyst are put in a 100 ml reaction vessel equipped with an agitator and a discharger and heated up to 180° C. for 30 minutes under a nitrogen atmosphere and then, start to be stirred when the mixture becomes a melt state. The reaction vessel is heated up to 200° C., and after reducing a pressure in the reaction vessel and adjusting into 20 kPa, the reaction vessel is further heated up to 240° C.

Subsequently, a vacuum degree in the reaction vessel is increased up to 1 kPa, and the reactant therein is reacted for 1 hour. The reaction vessel is heated up to 270° C., the vacuum degree is increased up to 200 Pa, and the reactant is reacted for 1 hour to synthesize a polycarbonate precursor.

The entire amount of the polycarbonate precursor is dissolved in 345 parts by weight of γ-butyrolactone in a 1000 ml four-necked flask equipped with an agitator and a thermometer, and 0.30 parts by weight of pyromellitic anhydride as tetracarbonic dianhydride is added thereto Subsequently, 0.012 parts by weight of 4-dimethylaminopyridine as a catalyst is added thereto, and the mixture is reacted under a nitrogen atmosphere at 100° C. for 6 hours. Then, the reactant is cooled down to room temperature. The obtained polymer is added to 1 L of methanol in a dropwise fashion to precipitate a polymer precipitate. The precipitate is filtered to remove the catalyst and then, dried to obtain carboxyl group-containing polycarbonate as a pellet. The obtained polycarbonate has a number average molecular weight: 18,600, a weight average molecular weight: 37,500, Tg: 162° C., and a refractive index (nD, 589 nm): 1.652.

Synthesis Example B6: Synthesis of Carboxyl Group-Containing Polycarbonate

Carboxyl group-containing polycarbonate is synthesized according to the same method as Synthesis Example B5 except for using 0.75 parts by weight of pyromellitic anhydride based on that of the polycarbonate precursor. The obtained polycarbonate has a number average molecular weight: 21,400, a weight average molecular weight: 43,000, Tg: 168° C., and a refractive index (nD, 589 nm): 1.648.

Synthesis Example B7: Synthesis of Carboxyl Group-Containing Polycarbonate 30.05 parts by weight (0.069 mol) of BPEF, 0.11 parts by weight (0.001 mol) of 2,4-dihydroxy benzoic acid (hereinafter, referred to be "DHBA"), 14.84 parts by weight (0.069 mol) of diphenyl carbonate, and $4.5 \times 10^{-3}$ of zinc oxide (a particle diameter: greater than or equal to 1 μm, Wako Pure Chemical Industries, Ltd.) as a catalyst are put in a 100 ml reaction vessel equipped with an agitator and a discharger, heated up to 180° C. over 30 minutes under a nitrogen atmosphere, and then, start to be stirred when the mixture becomes a melt state. The reactant is heated up to 200° C., and after reducing a pressure in the reaction vessel and adjusting it into 20 kPa, and then, the reaction vessel is further heated up to 240° C. Subsequently, a vacuum degree in the reaction vessel is increased up to 1 kPa, and then, the reactant is reacted for 1 hour. The reaction vessel is increased up to 270° C., the vacuum degree is increased up to 200 Pa, and the reactant is reacted for 3 hours. 300 g of the obtained polymer is dissolved in dichloro methane, and the solution is added to 1 L of methanol in a dropwise fashion to precipitate a polymer precipitate. After filtering and removing the catalyst, the rest is dried to obtain carboxyl group-containing polycarbonate as a pellet. The obtained polycarbonate has a number average molecular weight: 20,800, a weight average molecular weight: 38,900, Tg: 153° C., and a refractive index (nD, 589 nm): 1.632.

Synthesis Example B8: Synthesis of Carboxyl Group-Containing Polycarbonate 16.21 parts by weight (0.037 mol) of BPEF, 12.95 parts by weight (0.037 mol) of BPF, 0.34 parts by weight (0.002 mol) of DHBA, 16.28 parts by weight (0.076 mol) of diphenyl carbonate, and $4.5 \times 10^{-3}$ parts by weight of zinc oxide (a particle diameter: greater than or equal to 1 μm, Waco Pure Chemical Industries, Ltd.) as a catalyst are put in a 100 ml reaction vessel equipped with an agitator and a discharger, heated up to 180° C. over 30 minutes under a nitrogen atmosphere and then, starts to be stirred when the mixture becomes a melt state. The reaction vessel is heated up to 200° C., and after reducing a pressure therein and adjusting it into 20 kPa, and then, the reaction vessel is further heated up to 240° C. A vacuum degree therein is heated up to 1 kPa, and the reactant is reacted for 1 hour. The reaction vessel keeps being heated up to 270° C., and the vacuum degree is increased up to 200 Pa, and the reaction is performed for 3 hours. The obtained polymer is dissolved in 300 g of dichloro methane, and the solution is added to 1 L of methanol in a dropwise fashion to precipitate a polymer precipitate. After filtering and removing the catalyst, the polymer precipitate is dried to obtain carboxyl group-containing polycarbonate as a pellet. The obtained polycarbonate has a number average molecular weight: 18,200, a weight average molecular weight: 37,400, Tg: 178° C., and a 589 nm refractive index (nD): 1.656.

Synthesis Example B9: Synthesis of Carboxyl Group-Containing Polycarbonate 27.37 parts by weight (0.078 mol) of BPF, 0.37 parts by weight (0.002 mol) of DHBA, 17.26 parts by weight (0.081 mol) of diphenyl carbonate, $4.5 \times 10^{-3}$ parts by weight of zinc oxide (a particle diameter: greater than or equal to 1 μm, Waco Pure Chemical Industries, Ltd.) as a catalyst are put in a 100 ml reaction vessel equipped with an agitator and a discharger and heated up to 180° C. under a nitrogen atmosphere over 30 minutes and then, starts to be stirred when the mixture becomes a melt state. The reaction vessel is heated up to 200° C., and after reducing a pressure therein and adjusting it into 20 kPa, and the reaction vessel is further heated up to 240° C. Subsequently, a vacuum degree therein is increased up to 1 kPa, and the reactant is reacted for 1 hour. The reaction vessel is continuously heated up to 270° C., and the vacuum degree is increased up to 200 Pa, and then, the reaction is performed for 3 hours. 300 g of the obtained polymer is dissolved in dichloro methane, and the solution is added to 1 L of methanol in a dropwise fashion to precipitate a polymer precipitate. After filtering and removing the catalyst, the precipitate is dried to obtain carboxyl group-containing polycarbonate as a pellet. The obtained polycarbonate has a number average molecular weight: 9,200, a weight average molecular weight: 19,300, Tg: 185° C., and a refractive index (nD, 589 nm): 1.672.

Synthesis Example B10: Comparative Example 28.06 parts by weight (0.064 mol) of BPEF, 1.35 parts by weight (0.009 mol) of DHBA, 15.59 parts by weight (0.073 mol) of diphenyl carbonate, $4.5 \times 10^{-3}$ parts by weight of zinc oxide (a particle diameter: greater than or equal to 1 μm, Waco Pure Chemical Industries, Ltd.) as a catalyst are put in a 100 ml reaction vessel equipped with an agitator and a discharger and heated up to 180° C. under a nitrogen atmosphere over 30 minutes and then, starts to be stirred when the mixture becomes a melt state. The reaction vessel is heated up to 200° C., and after reducing a pressure therein and adjusting it into 20 kPa, the reaction vessel is further heated up to 240° C. Subsequently, a vacuum degree therein is increased up to 1 kPa, and a reaction is performed for 1 hour. The reaction vessel is continuously heated up to 270° C., the vacuum degree is increased up to 200 Pa, and then, the reaction is performed for 3 hours. The obtained polycarbonate is not dissolved in dichloro methane due to a gel-type material massively produced therein and thus not manufactured into a uniform pellet.

Synthesis Example B11: Synthesis of Polycarbonate without Carboxyl Group 15.67 parts by weight (0.036 mol) of BPEF, 12.52 parts by weight (0.036 mol) of BPF, 15.32 parts by weight (0.072 mol) of diphenyl carbonate, and $4.5 \times 10^{-3}$ parts by weight of zinc oxide (a particle diameter: greater than or equal to 1 μm, Waco Pure Chemical Industries, Ltd.) as a catalyst are put in a 100 ml reaction vessel equipped with an agitator and a discharger and heated up to 180° C. under a nitrogen atmosphere over 30 minutes and then, starts to be stirred when the mixture becomes a melt state. The reaction vessel is heated up to 200° C., and after reducing a pressure therein and adjusting it into 20 kPa, and then, the reaction vessel is heated again up to 240° C. Subsequently, a vacuum degree therein is increased up to 1 kPa, and a reaction is performed for one hour. The reaction vessel is continuously heated up to 270° C., the vacuum degree is increased up to 200 Pa, and the reaction is performed for 3 hours. The obtained polymer is dissolved in 300 g of dichloro methane, the solution is added to 1 L of methanol in a dropwise fashion to precipitate a polymer precipitate, and after filtering and removing the catalyst, the polymer precipitate is dried to obtain polycarbonate. The obtained polycarbonate has a number average molecular weight: 17,600, a weight average molecular weight: 34,100, Tg: 162° C., and a refractive index (nD, 589 nm): 1.653.

Synthesis Example B12: Synthesis of Polycarbonate without Carboxyl Group 21.17 parts by weight (0.048 mol) of BPEF, 7.25 parts by weight (0.021 mol) of BPF, 14.49 parts by weight (0.068 mol) of diphenyl carbonate, and $4.3 \times 10^{-3}$ parts by weight of zinc oxide (a particle diameter: greater than or equal to 1 μm, Waco Pure Chemical Industries, Ltd.) as a catalyst are put in a 100 ml reaction vessel equipped with an agitator and a discharger and heated up to 180° C. under a nitrogen atmosphere over 30 minutes and then, starts to be stirred when the mixture becomes a melt state. The reaction vessel is heated up to 200° C., and after reducing a pressure therein and adjusting it into 20 kPa, the reaction vessel is further heated up to 240° C. Subsequently, a vacuum degree therein is increased up to 1 kPa, and a reaction is performed for one hour. The reaction vessel is heated up to 270° C., the vacuum degree is increased up to 200 Pa, and the reaction is performed for 1 hour. The obtained polymer is completely dissolved in 270 parts by weight of tetrahydrofuran (THF) in a 500 ml branch-type flask. Then, 2.7 ml of triethylamine is added thereto, and the mixture is cooled down to 0° C. under a nitrogen atmosphere. After the cooling, 1.8 ml of chloride phosphoryl is added thereto in a dropwise fashion over 30 minutes, and the mixture is stirred under ice cooling for 1 hour and then, heated up to room temperature and further stirred for 3 hours. Then, 10 ml of pure water is added thereto, and the mixture is added to 1 L of a methanol solution in a dropwise fashion to precipitate a polymer precipitate. After filtering and removing the catalyst, the polymer precipitate is dried to obtain phosphoric acid group-containing polycarbonate. The obtained polycarbonate has a number average molecular weight: 17,800, a weight average molecular weight: 35,900, Tg: 162° C., and a refractive index (nD, 589 nm): 1.650.

Synthesis Example B13: Synthesis of Carboxyl Group-Containing Vinyl Polymer 80.09 parts by weight (0.76 mol) of styrene, 2.7 parts by weight (0.01 mol) of β-carboxylethyl acrylate, and 70 parts by weight of toluene are put in a 300 ml reaction vessel equipped with a nitrogen inlet, an agitator, and a cooling tube, nitrogen is substituted for 30 minutes while the mixture is stirred, and oxygen in the solvent is removed. Subsequently, 0.80 parts by weight of azobis isobutyronitrile (AIBN) is added thereto while stirred, and the obtained mixture is heated up to 70° C. under a nitrogen atmosphere for 30 minutes and then, stirred for 8 hours to obtain a polymer. The polymer is added to 2 L of a methanol solution in a dropwise fashion to precipitate a polymer precipitate. After filtering and removing the catalyst, its rest is dried to obtain a carboxyl group-containing vinyl polymer. The obtained polymer has a number average molecular weight: 15,400, a weight average molecular weight: 35,600, Tg: 100° C., a refractive index (nD, 589 nm): 1.576.

TABLE 3

| | Synthesis Example B5 | Synthesis Example B6 | Synthesis Example B7 | Synthesis Example B8 | Synthesis Example B9 | Synthesis Example B10 | Synthesis Example B11 | Synthesis Example B12 | Synthesis Example B13 |
|---|---|---|---|---|---|---|---|---|---|
| BPEF (g) | 21.17 | 21.17 | 30.05 | 16.21 | | 28.06 | 15.67 | 21.17 | |
| BPF (g) | 7.25 | 7.25 | | 12.95 | 27.37 | | 12.52 | 7.25 | |
| DHBA (g) | | | 0.11 | 0.34 | 0.37 | 1.35 | | | |
| Diphenyl Carbonate (g) | 14.49 | 14.49 | 14.84 | 16.28 | 14.68 | 15.59 | 15.32 | 14.49 | |
| Pyromellitic anhydride (g) | 0.3 | 0.75 | | | | | | | |
| Phosphoryl chloride (ml) | | | | | | | | 1.8 | |
| Styrene (g) | | | | | | | | | 80.09 |
| β-carboxylethyl-acrylate (g) | | | | | | | | | 0.27 |
| AIBN (g) | | | | | | | | | 0.8 |
| m/n | 0.02 | 0.04 | 0.01 | 0.03 | 0.03 | 0.14 | — | — | 0.01 |
| Mn | 18600 | 21400 | 20800 | 18200 | 9200 | immeasurable | 17600 | 17800 | 15400 |

TABLE 3-continued

|  | Synthesis Example B5 | Synthesis Example B6 | Synthesis Example B7 | Synthesis Example B8 | Synthesis Example B9 | Synthesis Example B10 | Synthesis Example B11 | Synthesis Example B12 | Synthesis Example B13 |
|---|---|---|---|---|---|---|---|---|---|
| Mw | 37500 | 43000 | 38900 | 37400 | 19300 | immeasurable | 34100 | 35900 | 35600 |
| Tg (° C.) | 162 | 168 | 153 | 178 | 185 | immeasurable | 162 | 162 | 100 |
| Refractive index | 1.652 | 1.648 | 1.632 | 1.656 | 1.672 | Immeasurable | 1.653 | 1.650 | 1.576 |

Example B1

An organic-inorganic hybrid composition as sol is prepared by dissolving 0.85 parts by weight of the carboxyl group-containing polycarbonate according to Synthesis Example B5 in 7.65 parts by weight of dichloro methane, adding thereto 1.50 parts by weight of the dichloro methane dispersion having 10 wt % of a sum (a solid content) of zirconium oxide particulate/3-thiophene carbonic acid according to Synthesis Example B1, and stirring the mixture at room temperature for 1 hour. The sol is respectively evaluated according to the methods. The results are shown in Table.

Examples B2 to B9 and Comparative Examples B1 to B4

An organic-inorganic hybrid composition is obtained according to the same method as Example B1 except for changing a mixing ratio of a resin and an inorganic particulate-containing dispersion as shown in the following table. The results are shown in Table B.

TABLE 4

|  |  | Example B1 | Example B2 | Example B3 | Example B4 | Example B5 | Example B6 | Example B7 |
|---|---|---|---|---|---|---|---|---|
| Component (B-1) + Component (C-1) (parts by weight) | Synthesis Example B1 | 15 | 50 | 80 | 50 | 50 | 50 | 50 |
|  | Synthesis Example B2 |  |  |  |  |  |  |  |
|  | Synthesis Example B3 |  |  |  |  |  |  |  |
|  | Synthesis Example B4 |  |  |  |  |  |  |  |
| Component (A-1) (parts by weight) | Synthesis Example B5 | 85 | 50 | 20 |  |  |  |  |
|  | Synthesis Example B6 |  |  |  | 50 |  |  |  |
|  | Synthesis Example B7 |  |  |  |  | 50 |  |  |
|  | Synthesis Example B8 |  |  |  |  |  | 50 |  |
|  | Synthesis Example B9 |  |  |  |  |  |  | 50 |
|  | Synthesis Example B10 |  |  |  |  |  |  |  |
|  | Synthesis Example B11 |  |  |  |  |  |  |  |
|  | Synthesis Example B12 |  |  |  |  |  |  |  |
|  | Synthesis Example B13 |  |  |  |  |  |  |  |
|  | Refractive index | 1.665 | 1.724 | 1.796 | 1.718 | 1.715 | 1.711 | 1.738 |
|  | Transmittance (%) | 86 | 84 | 82 | 84 | 83 | 82 | 80 |
|  | Checkerboard scale peeling test | A | A | A | A | B | A | A |
|  | Heat resistance test | A | A | A | A | A | A | A |
|  | Strength test | A | A | B | A | A | A | B |

|  |  | Example B8 | Example B9 | Comparative Example B1 | Comparative Example B2 | Comparative Example B3 | Comparative Example B4 |
|---|---|---|---|---|---|---|---|
| Component (B-1) + Component (C-1) (parts by weight) | Synthesis Example B1 |  |  | 50 | 50 | 50 |  |
|  | Synthesis Example B2 | 50 |  |  |  |  |  |
|  | Synthesis Example B3 |  | 50 |  |  |  |  |
|  | Synthesis Example B4 |  |  |  |  |  | 50 |
| Component (A-1) (parts by weight) | Synthesis Example B5 | 50 | 50 |  |  |  | 50 |
|  | Synthesis Example B6 |  |  |  |  |  |  |
|  | Synthesis Example B7 |  |  |  |  |  |  |

TABLE 4-continued

| | | | | | | |
|---|---|---|---|---|---|---|
| Synthesis Example B8 | | | | | | |
| Synthesis Example B9 | | | | | | |
| Synthesis Example B10 | | | 50 | | | |
| Synthesis Example B11 | | | | 50 | | |
| Synthesis Example B12 | | | | | 50 | |
| Synthesis Example B13 | | | | | | |
| Refractive index | 1.720 | 1.714 | Opaque/Immeasurable | 1.723 | 1.642 | Opaque/Immeasurable |
| Transmittance (%) | 84 | 80 | 84 | 50 | 82 | 48 |
| Checkerboard scale peeling test | A | B | B | D | B | C |
| Heat resistance test | A | A | B | B | D | C |
| Strength test | B | A | B | C | C | C |

[Example of Organic-Inorganic Hybrid Composition Having Low Yellowing]

Hereinafter, an example embodiment of an organic-inorganic hybrid composition having Low Yellowing is illustrated by using Examples and Comparative Examples.

(number average molecular weight (Mn), weight average molecular weight (Mw))

A measurement sample is prepared by dissing a thermoplastic resin in tetrahydrofuran (THF) to have a concentration of 0.1 wt % and filtering the solution through a polytetrafluoro ethylene membrane filter having a diameter of 0.2 µm. A number average molecular weight and a weight average molecular weight of the sample are measured through gel permeation chromatography (GPC) by using tetrahydrofuran as a mobile phase and a differential refractometer as a detector. Monodisperse polystyrene is used as a standard material of a molecular weight.

(Glass Transition Temperature (Tg))

A glass transition temperature of the sample is measured with a differential scanning calorimeter (DSC) by increasing a temperature up to 300° C. at a temperature increase rate of 10° C./min, maintaining the sample for 10 minutes, cooling it down to 25° C. at a temperature decrease rate of 10° C./min, and maintaining it for 10 minutes, and then increasing the temperature up to 300° C. at a temperature increase rate of 10° C./min. After the measurement is complete, the sample is cooled to room temperature (25° C.) at 10° C./min.

Example C1

Particulate Synthesis Example 1: Synthesis of Zirconium Oxide Particulate Dichloro Methane Dispersion 1

100.00 parts by weight of a zirconium oxide/methanol/acetic acid dispersion (a solid content of 30 wt %, a volume median diameter of 3 nm, a refractive index of zirconium oxide: 2.1, SZR-M, Sakai Chemical Industry Co., Ltd.) and 4.00 parts by weight of phenylphosphonic acid (a refractive index: 1.52) as a surface-modifying agent are put in a separable flask equipped with an agitator and a thermometer and stirred at 35° C. for 5 hours. Subsequently, the obtained dispersion is concentrated by an evaporator, until its solid content becomes 90 wt % to obtain a transparent mixture. In addition, the obtained mixture is washed with hexane and filtered to remove surplus acetic acid and phenylphosphonic acid to obtain white powder. The obtained powder is dispersed in dichloro methane to prepare a zirconium oxide particulate dichloro methane dispersion 1 having 15 wt % (a solid content) of zirconium oxide particulate/phenylphosphonic acid.

Polymer Synthesis Example 1: Synthesis of Polycarbonate Polymer 200.82 parts by weight (0.463 mol) of 9,9-bis(4-(2-hydroxy ethoxy)phenyl)fluorine (BPEF), 97.18 parts by weight (0.454 mol) of diphenyl carbonate, and 0.03 parts by weight of zinc oxide (a particle diameter: greater than or equal to 1 µm, Wako Pure Chemical Industries, Ltd.) as a catalyst are put in a 500 ml reaction vessel equipped with an agitator and a discharger and then, heated up to 180° C. under a nitrogen atmosphere over 30 minutes and starts to be stirred when the mixture becomes a melt state. The reaction vessel is heated up to 200° C., and after reducing a pressure therein and adjusting it into 20 kPa, the reaction vessel is heated up to 240° C. again. Continuously, a vacuum degree therein is increased up to 1 kPa, and a reaction is performed for 1 hour. The temperature is increased up to 270° C., the vacuum degree is increased up to 200 Pa, and the reaction is performed for 1 hour to synthesize a polycarbonate polymer.

The polymer is added to 1 L of methanol in a dropwise fashion to precipitate a polymer precipitate. After filtering and removing the catalyst, its rest is dried to obtain polycarbonate as a pellet.

The obtained polycarbonate has a number average molecular weight: 17,800, a weight average molecular weight: 35,900, Tg: 162° C., a refractive index (nD, 589 nm): 1.650, and a SP value: 26.77. On the other hand, a refractive index of a resin is equally measured based on that of a composition except for using no inorganic particulate.

<Preparation of Organic-Inorganic Hybrid Composition 1>

An organic-inorganic hybrid composition 1 is prepared by dissolving 5 parts by weight of the polycarbonate polymer according to Polymer Synthesis Example 1 in 50 parts by weight of dichloro methane, adding 50 parts by weight of the zirconium oxide particulate dichloro methane dispersion 1 (a solid content: 15 wt %) according to Particulate Synthesis Example 1 thereto in a dropwise fashion at room temperature for 1 hour, and stirring the mixture for 1 hour. The resin composition includes 15 vol % of a solid content of zirconium oxide particulates surface-treated with phenylphosphonic acid.

Example C2

Particulate Synthesis Example 2: Synthesis of Zirconium Oxide Particulate Dichloro Methane Dispersion 2

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of a diphenyl phosphinic acid (a refractive index: 1.60) as a surface-modifying agent are put in a separable flask equipped with an agitator and a thermometer and stirred at 35° C. for 5 hours. Subsequently, the dispersion is concentrated by an evaporator until it has a solid content of 90% to obtain a transparent mixture. In addition, the mixture is washed by hexane and filtered to remove surplus acetic acid and diphenyl phosphinic acid and obtain white powder. The powder is dispersed in dichloro methane to prepare a zirconium oxide particulate dichloro methane dispersion 2 having 15% (a solid content) of zirconium oxide particulate/diphenyl phosphinic acid.

An organic-inorganic hybrid composition 2 is obtained according to the same as Example C1 except for using the zirconium oxide particulate dichloro methane dispersion 2 instead of the zirconium oxide particulate dichloro methane dispersion 1.

Example C3

Particulate Synthesis Example 3: Synthesis of Zirconium Oxide Particulate Dichloro Methane Dispersion 3

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of benzoic acid (a refractive index: 1.56) as a surface-modifying agent are put in a separable flask equipped with an agitator and a thermometer and stirred at 35° C. for 5 hours. Subsequently, the dispersion is concentrated by an evaporator until the solid content becomes 90% to obtain a transparent mixture. In addition, the mixture is washed with hexane and filtered to remove surplus acetic acid and benzoic acid and obtain white powder. The powder is dispersed in dichloro methane to prepare a zirconium oxide particulate dichloro methane dispersion 3 having 15% of a sum (a solid content) of zirconium oxide particulate/benzoic acid.

The zirconium oxide particulate dichloro methane dispersion 3 instead of the zirconium oxide particulate dichloro methane dispersion 1 is equally used as in Example C1 to prepare an organic-inorganic hybrid composition 3.

Example C4

Particulate Synthesis Example 4: Synthesis of Zirconium Oxide Particulate Dichloro Methane Dispersion 4

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of dimethyl phosphinic acid (a refractive index: 1.39) as a surface-modifying agent are put in a separable flask equipped with an agitator and a thermometer and stirred at 35° C. for 5 hours. Then, the dispersion is concentrated by an evaporator until the solid content becomes 90% to obtain a transparent mixture. In addition, the mixture is washed with hexane and filtered to remove surplus acetic acid and dimethyl phosphinic acid to obtain white powder. The obtained powder is dispersed in dichloro methane to prepare a zirconium oxide particulate dichloro methane dispersion 4 having 15% of a sum (a solid content) of zirconium oxide particulate/dimethyl phosphinic acid.

The zirconium oxide particulate dichloro methane dispersion 4 instead of the zirconium oxide particulate dichloro methane dispersion 1 is equally used as Example C1 to prepare an organic-inorganic hybrid composition 4.

Example C5

Polymer Synthesis Example 2: Synthesis of Phosphonic Acid Group-Containing Polycarbonate 22.05 parts by weight (0.050 mol) of 9,9-bis(4-(2-hydroxyethoxy)phenyl)fluorene (BPEF), 7.55 parts by weight (0.022 mol) of 9,9-bis-4-hydroxyphenylfluorene (BPF), 15.40 parts by weight (0.072 mol) of diphenyl carbonate, and $4.5 \times 10^{-3}$ parts by weight of zinc oxide (a particle diameter: greater than or equal to 1 μm, Wako Pure Chemical Industries, Ltd.) as a catalyst are put in a 100 ml reaction vessel equipped with an agitator and a discharger and then, heated up to 180° C. under a nitrogen atmosphere over 30 minutes and starts to be stirred when the mixture becomes a melt state. The reaction vessel is heated up to 200° C., and after reducing a pressure therein and adjusting it into 20 kPa, the reaction vessel is heated up to 240° C. again. Subsequently, a vacuum degree therein is increased up to 1 kPa, and a reaction is performed for 1 hour. The reaction vessel is continuously heated up to 270° C., the vacuum degree is increased up to 200 Pa, and the reaction is performed for 1 hour to synthesize polycarbonate. The synthesized polycarbonate is completely dissolved in 270 parts by weight of tetrahydrofuran (THF) in a 500 ml branch-type flask. Subsequently, 2.7 ml of tetraethyl amine is added thereto, and the mixture is cooled down to 0° C. under a nitrogen atmosphere. After the cooling, 1.8 ml of chloride phosphoryl is added thereto in a dropwise fashion over 30 minutes, and the mixture is stirred under ice cooling for one hour, heated up to room temperature, and stirred for 3 hours to synthesize a polycarbonate polymer.

Subsequently, 10 ml of pure water is added thereto, and the obtained mixture is added to 1 L of a methanol solution in a dropwise fashion to precipitate a polymer precipitate. After filtering and removing the catalyst, its rest is dried to obtain aphosphonic acid group-containing polycarbonate as a pellet.

The obtained polycarbonate has a number average molecular weight: 18,600, a weight average molecular weight: 37,500, Tg: 150° C., a refractive index (nD, 589 nm): 1.64, and a SP value: 27.20.

An organic-inorganic hybrid composition 5 is obtained by dissolving 5 parts by weight of the polycarbonate polymer according to Polymer Synthesis Example 2 in 50 parts by weight of dichloro methane, adding 50 parts by weight of the zirconium oxide particulate dichloro methane dispersion 2 (a solid content of 15%) according to Particulate Synthesis Example 2 thereto in a dropwise fashion at room temperature over one hour, and stirring the mixture for 1 hour.

Comparative Example C1

Particulate Synthesis Example 5: Synthesis of Zirconium Oxide Particulate Dichloro Methane Dispersion 5

100.00 parts by weight of an zirconium oxide/methanol/acetic acid dispersion (a solid content of 30%, a volume reference median diameter of 3 nm, a refractive index of zirconium oxide: 2.1, SZR-M, Sakai Chemical Industry Co., Ltd.) and 4.00 parts by weight of 1,4-phenylenediamine (a refractive index: 1.634) as a surface-modifying agent are put in a separable flask equipped with an agitator and a thermometer and stirred at 35° C. for 5 hours. Subsequently, the dispersion is concentrated by an evaporator until its solid content becomes 90% to obtain a transparent mixture. In addition, the mixture is washed with hexane and filtered to remove surplus acetic acid and 1,4-phenylenediamine to obtain white powder. The powder is dispersed in dichloro methane to prepare a zirconium oxide particulate dichloro methane dispersion 5 having 15% of a sum (a solid content) of zirconium oxide particulate/1,4-phenylenediamine.

The zirconium oxide particulate dichloro methane dispersion 5 instead of the zirconium oxide particulate dichloro methane dispersion 1 is equally used as Example C1 to obtain an organic-inorganic hybrid composition 6.

Comparative Example C2

Particulate Synthesis Example 6: Synthesis of Zirconium Oxide Particulate Dichloro Methane Dispersion 6

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of 2-phenylethanethiol (a refractive index: 1.56) as a surface-modifying agent are put in a separable flask equipped with an agitator and a thermometer and stirred at 35° C. for 5 hours. Subsequently, the dispersion is concentrated by an evaporator until the solid content becomes 90% to prepare a transparent mixture. In addition, the mixture is washed with hexane and filtered to remove surplus acetic acid and 2-phenylethanethiol to obtain white powder. The powder is dispersed in dichloro methane to prepare a zirconium oxide particulate dichloro methane dispersion 6 having 15% of a sum (a solid content) of zirconium oxide particulate/2-phenylethanethiol.

The zirconium oxide particulate dichloro methane dispersion 6 instead of the zirconium oxide particulate dichloro methane dispersion 1 is equally used as Example C1 to obtain an organic-inorganic hybrid composition 7.

Comparative Example C3

Particulate Synthesis Example 7: Synthesis of Zirconium Oxide Particulate Dichloro Methane Dispersion 7

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of biphenyl-4-carbonic acid (a refractive index: 1.61) as a surface-modifying agent are put in a separable flask equipped with an agitator and a thermometer and stirred at 35° C. for 5 hours. Subsequently, the dispersion is concentrated by an evaporator until the solid content becomes 90% to obtain a transparent mixture. In addition, the mixture is washed with hexane and filtered to remove surplus acetic acid and biphenyl-4-carbonic acid to obtain white powder. The powder is dispersed in dichloro methane to prepare a zirconium oxide particulate dichloro methane dispersion 7 having 15% of a sum (a solid content) of zirconium oxide particulate/biphenyl-4-carbonic acid.

The zirconium oxide particulate dichloro methane dispersion 7 instead of the zirconium oxide particulate dichloro methane dispersion 1 is equally used as Example C1 to prepare an organic-inorganic hybrid composition 8.

Comparative Example C4

Particulate Synthesis Example 8: Synthesis of Zirconium Oxide Particulate Dichloro Methane Dispersion 8

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of phenyl phosphonic acid (a refractive index: 1.52) are put in a separable flask equipped with an agitator and a thermometer and stirred at 35° C. for 5 hours. Then, the dispersion is concentrated by an evaporator until the solid content becomes 90% to obtain a transparent mixture. In addition, the mixture is washed with hexane and filtered to remove surplus acetic acid and phenyl phosphonic acid to obtain white powder. The powder is dispersed in dichloro methane to prepare a zirconium oxide particulate dichloro methane dispersion 8 having 15% of a sum (a solid content) of zirconium oxide particulate/phenyl phosphonic acid.

The zirconium oxide particulate dichloro methane dispersion 8 instead of the zirconium oxide particulate dichloro methane dispersion 1 is equally used as Example C1 to prepare an organic-inorganic hybrid composition 9.

Comparative Example C5

Particulate Synthesis Example 9: Synthesis of Zirconium Oxide Particulate Dichloro Methane Dispersion 9

100.00 parts by weight of a zirconium oxide/methanol/acetic acid dispersion (a solid content: 30%, a volume reference median diameter: 3 nm, a refractive index of zirconium oxide: 2.1, SZR-M, Sakai Chemical Industry Co., Ltd.) and 4.00 parts by weight of 4-methyl benzoic acid (a refractive index: 1.51) as a surface-modifying agent are put in a separable flask equipped with an agitator and a thermometer and stirred at 35° C. for 5 hours. Subsequently, the dispersion is concentrated by an evaporator until the solid content becomes 90% to obtain a transparent mixture. In addition, the mixture is washed with hexane and filtered to remove surplus acetic acid and 4-methyl benzoic acid and obtain white powder. The powder is dispersed in dichloro methane to obtain a zirconium oxide particulate dichloro methane dispersion 9 having 15% of a sum (a solid content) of zirconium oxide particulate/4-methyl benzoic acid.

The zirconium oxide particulate dichloro methane dispersion 9 instead of the zirconium oxide particulate dichloro methane dispersion 1 is equally used as Example C1 to obtain an organic-inorganic hybrid composition 10.

Comparative Example C6

Particulate Synthesis Example 10: Synthesis of Zirconium Oxide Particulate Dichloro Methane Dispersion 10

100.00 parts by weight of a zirconium oxide/methanol/acetic acid dispersion (a solid content of 30%, a volume reference median diameter of 3 nm, a refractive index of zirconium oxide: 2.1, SZR-M, Sakai Chemical Industry Co., Ltd.) and a surface-modifying agent solution obtained by dissolving 4.00 parts by weight of benzene sulfonic acid (a refractive index: 1.56) as a surface-modifying agent in 20.00 parts by weight of dichloro methane are put in a separable flask equipped with an agitator and a thermometer and stirred at 35° C. for 5 hours. Subsequently, the dispersion is concentrated by an evaporator until the solid content becomes 90% to obtain a transparent mixture. In addition, the mixture is washed by hexane and filtered to remove surplus acetic acid and benzene sulfonic acid to obtain white powder. The powder is dispersed in dichloro methane to prepare a zirconium oxide particulate dichloro methane dispersion 10 having 15% of a sum (a solid content) of zirconium oxide particulate/benzene sulfonic acid.

The zirconium oxide particulate dichloro methane dispersion 10 instead of the zirconium oxide particulate dichloro methane dispersion 1 is equally used as Example C1 to obtain an organic-inorganic hybrid composition 11.

(Evaluation Method: Measurement of Refractive Index)

Dichloro methane is added to each organic-inorganic hybrid resin composition to respectively prepare sol having a solid concentration of 10%, and the sol is cast on a polyimide substrate. Subsequently, the sol is cast and dried at 35° C. to obtain a film (a thickness: 0.5 mm). The film is measured regarding a refractive index of a sodium D ray (nD, a wavelength: 589 nm) with a multiwavelength Abbe refractometer (DR-M4, Atago Co., Ltd.).

(Evaluation Method: Measurement of Haze and Total Light Transmittance)

Haze and total light transmittance are measured by heating the film formed in the same method as used to measure the refractive index at 250° C. for 15 minutes in the air and using Hazemeta NDH5000 made by Nippon Denshoku Industries Co., Ltd. Measurement wavelength: 380 to 780 nm Greater than or equal to 80% of total light transmittance is sufficient, and greater than or equal to 85% of total light transmittance is more sufficient. As for haze, less than or equal to 3% (a lower limit of 0%) is sufficient, less than or equal to 2% is more sufficient, and less than or equal to 1% is much more sufficient. On the other hand, the heating at 250° C. for 15 minutes in the air is to imitate an injection molding.

The results are shown in the following table.

TABLE 5

| | Modifying agent | | | | | Evaluation result | | |
|---|---|---|---|---|---|---|---|---|
| | Compound | pKa1 | SP value | polymer | SP Value difference | Haze (%) | Total light transmittance (%) | nD |
| Example C1 | Phenylphosphonic acid | 2.00 | 25.15 | Synthesis Example 1 | 2.05 | 1.4 | 86 | 1.689 |
| Example C2 | Diphenylphosphonic acid | 2.30 | 24.98 | Synthesis Example 1 | 2.22 | 1.5 | 86 | 1.696 |
| Example C3 | Benzoic acid | 4.21 | 25.44 | Synthesis Example 1 | 1.75 | 2.7 | 85 | 1.689 |
| Example C4 | Dimethylphosphonic acid | 2.30 | 28.11 | Synthesis Example 1 | 1.75 | 1.7 | 86 | 1.657 |
| Example C5 | Diphenylphosphonic acid | 2.30 | 24.98 | Synthesis Example 2 | 2.22 | 0.7 | 88 | 1.697 |
| Comparative Example C1 | 1,4-phenylenediamine | 6.31 | 25.84 | Synthesis Example 1 | 1.36 | 2.0 | 78 | 1.634 |
| Comparative Example C2 | 2-phenylethanethiol | 10.16 | 20.58 | Synthesis Example 1 | 6.62 | 90 | 60 | immeasurable |
| Comparative Example C3 | Biphenyl-4-carboxylic acid (BCA) | 4.19 | 22.98 | Synthesis Example 1 | 4.22 | 6.2 | 73 | 1.687 |
| Comparative Example C4 | Phenylphosphonic acid | 1.85 | 23.27 | Synthesis Example 1 | 3.92 | 13.4 | 60 | Immeasurable |
| Comparative Example C5 | 4-methylbenzoic acid p-toluic acid | 4.37 | 22.51 | Synthesis Example 1 | 4.69 | 6.5 | 70 | 1.686 |
| Comparative Example C6 | Benzenesulfonic acid | 2.55 | 21.37 | Synthesis Example 1 | 5.83 | 13.4 | 60 | Immeasurable |

Referring to the results, the resin compositions according to Examples C1 to C5 have a high refractive index and simultaneously, high transparency but low yellowing (high total light transmittance). On the other hand, the resin composition of Comparative Example C1 having pKa beyond 6.00 shows total light transmittance of less than 80%. The reason is yellowing caused by decomposition of an organic surface-modifying agent. In addition, the resin composition of Comparative Example C4 having pKa of less than 2.00 shows total light transmittance of less than 80% since haze is sharply deteriorated, and a refractive index is immeasurable. In addition, the resin compositions of Comparative Examples C3 and C5 to C6 having a SP difference of greater than 4 has sharply deteriorated transparency, and in Comparative Examples C2, C4, and C6, the transparency is too much deteriorated to measure a refractive index.

On the other hand, in Examples C1, C2, C4, and C5 using a modifying agent having pKa of less than or equal to 4.00, the transparency is much improved. In addition, when a modifying agent having an aromatic ring group is used in Examples C1, C2, and C5, transparency is much further improved.

[Example of Organic-Inorganic Hybrid Composition Having Formability and Optical Properties]

Hereinafter, an example embodiment of an organic-inorganic hybrid composition having excellent formability and optical properties is illustrated by using Examples and Comparative Examples.

Example D1

100.0 parts by mass of a zirconium oxide methanol acetic acid dispersion (a solid content: 30 mass %, SZR-M, Sakai Chemical Industry Co., Ltd.) and 2.00 parts by mass of benzoic acid as a surface-modifying agent are put in a separable flask equipped with an agitator and a thermometer and stirred at 35° C. for 5 hours. The obtained liquid is dispersed again in dichloro methane to prepare a zirconium oxide particulate dichloro methane dispersion having 10 mass % of a solid content.

A polycarbonate resin (Tg=130° C., Panlite AD5503, Teijin Ltd.) as a thermoplastic resin is dissolved in dichloro methane to have a solid content of 10 mass % to prepare a solution A-3, and the obtained zirconium oxide particulate dichloro methane dispersion (a solid content of 10 mass %) B-3 is added in a dropwise fashion to the solution A-3 in a mass ratio of 1/2 over one hour. After stirring the mixture for 1 hour, the resultant is cast on a polyimide film as a substrate, dried at room temperature of 25° C. for 30 minutes, and further dried on a hot plate at 80° C. for 1 hour, and a film obtained therefrom is ground by using a small grinder.

The ground film is melt, kneaded, and pelleted in a 30 mm biaxial extruder at 270° C. to obtain a desired organic-inorganic hybrid composition.

On the other hand, when extruded in the extruder, air is carefully prevented from being mingled into a kneaded product and making an oxidization condition, and a volatile component is removed from a vent by reducing a pressure to prepare the desired organic-inorganic hybrid composition.

Subsequently, the obtained organic-inorganic hybrid composition (pellet) is molded at a resin temperature of 270° C., a mold temperature of 80° C., and a screw speed of 30 Mm/sec under an injection pressure of 100 MPa in an injection molder (ROBOSHOTS-2000i30A, Fanuc Corp.) to obtain a 10 mm-long, 5 mm-wide, and 0.2 to 0.5 mm-thick rectangular-shaped article (a side gate).

On the other hand, in the used polycarbonate resin, b of Equation (II) is −0.83.

A refractive index of zirconium oxide is about 2.1 and an Abbe number thereof is about 36.

Example D2

A rectangular shape article is obtained according to the same method as Example D1 except for using 100.0 parts by mass of a cerium oxide methanol acetic acid dispersion instead of the zirconium oxide methanol acetic acid dispersion as a dispersion including an inorganic particle.

A refractive index of cerium oxide is about 2.2, and an Abbe number thereof is about 50.

Example D3

A rectangular-shaped article is obtained according to the same method as Example D2 except for using a polyolefin resin (a cikroolefin polymer, Tg=100° C., Apel APL5014CL, Kumho Mitsui Chemicals Inc.) instead of the polycarbonate resin as a thermoplastic resin.

Meanwhile, in the used polyolefin resin, b of Equation (II) is 0.11.

Example D4

A rectangular-shaped article is obtained according to the same method as Example D3 except for using 100.0 parts of mass of a barium titanate methanol acetic acid dispersion instead of the zirconium oxide methanol acetic acid dispersion as a dispersion including an inorganic particle. A refractive index of barium titanate is about 2.4, and an Abbe number thereof is about 50.

Comparative Example D1

An organic-inorganic hybrid composition is prepared according to the same method as Example D1 except for changing a mass ratio of an amount of the zirconium oxide particulate dichloro methane dispersion B (a solid content of 10 mass %) relative to that of A-3 into 2. This composition is used to perform an injection molding experiment in the same method as Example D1 but not discharged and thus fails in obtaining an article and resultantly, evaluating total light transmittance, haze, a refractive index, an Abbe number, and YI.

Comparative Example D2

A composition is obtained according to the same method as Example D2 except for changing a mass ratio of an amount of the cerium oxide methanol acetic acid dispersion relative to that of A-3 into 2/3. This composition is used to perform an injection molding experiment in the same method as Example D1 but not discharged and thus fails in obtaining an article and resultantly, evaluating total light transmittance, haze, a refractive index, an Abbe number, and YI.

Comparative Example D3

A composition is obtained according to the same method as Example D3 except for changing a mass ratio of an amount of the cerium oxide methanol acetic acid dispersion relative to that of A-3 into 2/3. This composition is used to perform an injection molding experiment as Example D1 and thus formed into an article, but a part of the article is stained and thus fails in evaluating a refractive index, an Abbe number, and YI.

Comparative Example D4

A rectangular-shaped article is obtained according to the same method as Example D3 except for using no inorganic particle.

Comparative Example D5

A rectangular-shaped article is obtained according to the same method as Example D1 except for using a polyester resin as a thermoplastic resin but no inorganic particle.

<Evaluation Method>
(Melt Viscosity)

Rheometer MCR302 (Anton Paar GmbH) is used to measure relationship between a shear rate and melt viscosity at a melting point +20° C. of a thermoplastic resin. The measurement result is used to obtain B of Equation (I) as a root approximation.

(Number Median Diameter of Inorganic Particle of Organic-Inorganic Hybrid Resin Composition)

A focused ion beam (FIB) is used to slice the article into 100 nm or so, and the slice is examined and measured with a transmissive electron microscope.

(Volume Content of Inorganic Particle)

First of all, a thermoplastic resin and an inorganic particle composition is respectively examined by ICP light emitting spectrometry (high frequency inductively coupled plasma emission spectrometry), FT-IR (measuring a thermoplastic resin), an X-ray diffraction (XRD) (measuring inorganic particles), an energy dispersive X ray analysis (measuring inorganic particles), and the like. Subsequently, specific gravities of each material and the composition are measured by using SD-200L made by M&K Co., Ltd, and their volume contents are calculated.

(Injection Molding Property)

An article after the injection molding is examined with naked eyes and evaluated according to the following reference. ○: is practically used:
  ○: secure a desired shape
  Δ: is possible for injection molding but has a shape problem.
  x: is impossible for injection molding (Total Light Transmittance and Haze)

Total light transmittance and haze of the 0.5 mm-thick article are measured by using a hazemeter ("NDH5000" Nippon Denshoku Industries Co., Ltd.).

(Measurement of Refractive Index and Abbe Number)

A refractive index of the 0.5 mm-thick article is measured by using "DM-M4" made by Atago Co., Ltd.

In addition, Abbe numbers of the 0.5 mm thick article and inorganic particles are obtained by using "DM-M4" made by Atago Co., Ltd. to measure a refractive index at 3 wavelengths (C ray, D ray, F ray) and using the measurements according to the following equation:

Abbe number=$nD-1/(nF-nC)$ nC: a refractive index (a wavelength of 656 nm) measured at a C-ray, nD: a refractive index (a wavelength of 589 nm) measured at a D-ray, and nF: a refractive index (a wavelength of 486 nm) at an F-ray.

(Measurement of YI)

YI of the 0.5 mm-thick article is measured by using Hazemeta "NDH5000W" made by Nippon Denshoku Industries Co., Ltd.

The compositions and evaluation results of Example D and Comparative Example D are shown in Table 1. On the other hand, "—" indicates impossible to evaluate in Table 1.

TABLE 6

|  | Thermoplastic resin kinds | Inorganic particle | | | | Properties of composition | |
|---|---|---|---|---|---|---|---|
|  |  | kinds | D50 (nm) | Volume content (volume %) | Whether the Equation (1) is satisfied*[1] | Melt viscosity @1000 (1/sec) | B of Equation (I) |
| Example D1 | polycarbonate | ZrO$_2$ | 3 | 6 | ○ | 320 | −0.50 |
| Example D2 | polycarbonate | CeO$_2$ | 8 | 4 | ○ | 545 | −0.14 |
| Example D3 | polyolefin | CeO$_2$ | 8 | 8 | ○ | 83 | −1.95 |
| Example D4 | polyolefin | BaTiO$_3$ | 5 | 5 | ○ | 146 | −1.38 |
| Comparative Example D1 | polycarbonate | ZrO$_2$ | 3 | 3 | x | 320 | −3.80 |
| Comparative Example D2 | polycarbonate | CeO$_2$ | 8 | 8 | ○ | 2980 | −0.63 |
| Comparative Example D3 | polyolefin | CeO$_2$ | 30 | 30 | ○ | 223 | −0.94 |
| Comparative Example D4 | polyolefin | — | — | — | — | 54 | −0.11 |
| Comparative Example D5 | polyester | — | — | — | — | 18 | −0.05 |

|  | Evaluation result | | | | |
|---|---|---|---|---|---|
|  | Molding Formability | Total light transmittance (%) | Haze value | Refractive index | Abbe number | YI |
| Example D1 | ○ | 98 | 0.3 | 1.63 | 33 | 1.0 |
| Example D2 | ○ | 97 | 0.9 | 1.60 | 32 | 0.2 |
| Example D3 | ○ | 90 | 2.8 | 1.68 | 44 | 2.3 |
| Example D4 | ○ | 92 | 1.7 | 1.67 | 39 | 1.8 |
| Comparative Example D1 | x (difficult to color and discharge) | — | — | — | — | — |
| Comparative Example D2 | x (impossible to discharge) | — | — | — | — | — |
| Comparative Example D3 | Δ (partly stained) | 75 | 28 | — | — | — |

TABLE 6-continued

| | | | | | | |
|---|---|---|---|---|---|---|
| Comparative Example D4 | o | 98 | 0.4 | 1.54 | 38 | 0.5 |
| Comparative Example D5 | o | 96 | 0.8 | 1.58 | 23 | 0.4 |

*[1] in relationship between D50 and a volume content, o is given when Equation (1) is satisfied, but x is given when Equation (1) is not satisfied.

As clearly shown in Table, the organic-inorganic hybrid composition of Example D shows excellent formability and optical properties. On the other hand, the organic-inorganic hybrid compositions of Comparative Examples D1 to D3 show deteriorated injection molding properties. Comparative Example D4 and D5 including a thermoplastic resin alone show a deteriorated refractive index. In addition, Comparative Example D5 shows deterioration of an Abbe number.

While this disclosure has been described in connection with what is presently considered to be practical example embodiments, it is to be understood that the invention is not limited to the disclosed example embodiments, but, on the contrary, is intended to cover various modifications and equivalent arrangements included within the spirit and scope of the appended claims.

What is claimed is:

1. An organic-inorganic hybrid composition comprising
   a polymer (A) including a triazine ring structure represented by General Formula (1) in a polymer main chain structure;

[General Formula (1)]

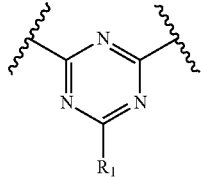

(1)

(wherein, in the formula, $R_1$ is a substituted or unsubstituted alkyl group, aryl group, aralkyl group, amino group, arylamino group, alkylthio group, or arylthio group)
   an inorganic particulate (B); and
   a surface-treatment agent (C) including an acidic functional group
   wherein the polymer (A) is a thermoplastic polymer having a glass transition temperature (Tg),
   a number median diameter (Dn50) of the inorganic particulate (B) is greater than or equal to about 1 nm and less than or equal to about 20 nm.

2. The organic-inorganic hybrid composition of claim 1, wherein a glass transition temperature (Tg) of the polymer (A) is greater than or equal to about 80° C. and less than or equal to about 200° C.

3. The organic-inorganic hybrid composition of claim 1, wherein the triazine ring structure is represented by General Formula (2)

[General Formula (2)]

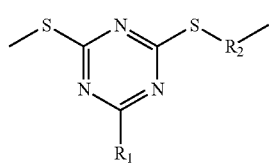

(2)

(wherein, in the formula, $R_2$ is independently a divalent group having an aromatic ring).

4. The organic-inorganic hybrid composition of claim 1, wherein the $R_1$ includes a carboxyl group.

5. The organic-inorganic hybrid composition of claim 3, wherein the $R_2$ is represented by the following formula

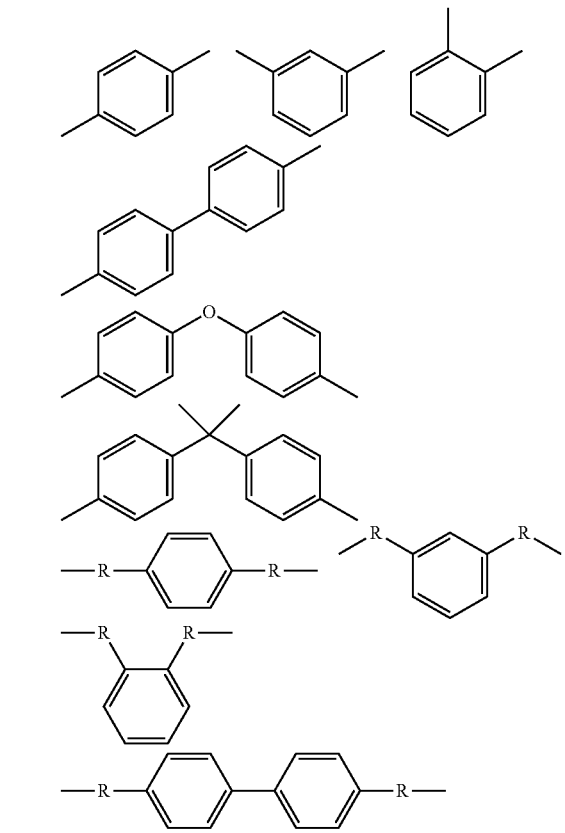

(wherein in formula, R is independently a substituted or unsubstituted alkylene group).

6. The organic-inorganic hybrid composition of claim 1, wherein the acidic functional group of the surface-treatment agent (C) is a carboxyl group.

7. The organic-inorganic hybrid composition of claim 1, wherein a refractive index of the inorganic particulate (B) is greater than or equal to about 1.8 and less than or equal to about 3.0.

8. The organic-inorganic hybrid composition of claim 1, wherein the inorganic particulate (B) includes at least one particle selected from zirconium oxide, titanium oxide, barium titanate, strontium titanate, and zinc oxide.

9. The organic-inorganic hybrid composition of claim 1, wherein an amount sum of the inorganic particulate (B) and the surface-treatment agent (C) is in a range of greater than or equal to about 5 wt % to less than about 80 wt % based on about 100 wt % of a sum of the polymer (A), the inorganic particulate (B), and the surface-treatment agent (C).

10. The organic-inorganic hybrid composition of claim 1, wherein a refractive index (nd) (587.6 nm) is greater than or equal to about 1.7.

11. An article comprising the organic-inorganic hybrid composition of claim 1.

12. An optical component comprising the organic-inorganic hybrid composition of claim 1.

* * * * *